(12) United States Patent
Chern et al.

(10) Patent No.: US 12,276,836 B2
(45) Date of Patent: Apr. 15, 2025

(54) OPTICAL WAVEGUIDE APPARATUS AND METHOD OF FABRICATION THEREOF

(71) Applicant: Taiwan Semiconductor Manufacturing Co., Ltd., Hsinchu (TW)

(72) Inventors: Chan-Hong Chern, Palo Alto, CA (US); Chih-Chang Lin, San Jose, CA (US); Min-Hsiang Hsu, Hsinchu (TW); Weiwei Song, Hsinchu (TW); Chewn-Pu Jou, Hsinchu (TW); Feng-Wei Kuo, Hsinchu County (TW); Huan-Neng Chen, Taichung (TW); Lan-Chou Cho, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

(21) Appl. No.: 18/078,793

(22) Filed: Dec. 9, 2022

(65) Prior Publication Data

US 2023/0111170 A1 Apr. 13, 2023

Related U.S. Application Data

(63) Continuation of application No. 17/212,934, filed on Mar. 25, 2021, now Pat. No. 11,531,159.

(60) Provisional application No. 63/041,149, filed on Jun. 19, 2020.

(51) Int. Cl.
*G02B 6/12* (2006.01)
*G02B 6/122* (2006.01)
*G02B 6/13* (2006.01)

(52) U.S. Cl.
CPC ....... *G02B 6/1228* (2013.01); *G02B 6/12002* (2013.01); *G02B 6/12004* (2013.01); *G02B 6/122* (2013.01); *G02B 6/13* (2013.01); *G02B 2006/12061* (2013.01)

(58) Field of Classification Search
CPC .................................................. G02B 6/1228
See application file for complete search history.

(56) References Cited

U.S. PATENT DOCUMENTS 10,429,582 B1 10/2019 Bian
10,746,923 B2 8/2020 Yu
11,092,740 B1 8/2021 Bian
(Continued)

FOREIGN PATENT DOCUMENTS

CN 107408589 A 11/2017
TW 201111819 A 4/2011

*Primary Examiner* — Michael Stahl
(74) *Attorney, Agent, or Firm* — HAYNES AND BOONE, LLP

(57) ABSTRACT

A semiconductor structure according to the present disclosure includes a buried oxide layer, a first dielectric layer disposed over the buried oxide layer, a first waveguide feature disposed in the first dielectric layer, a second dielectric layer disposed over the first dielectric layer and the first waveguide feature, a third dielectric layer disposed over the second dielectric layer, and a second waveguide feature disposed in the second dielectric layer and the third dielectric layer. The second waveguide feature is disposed over the first waveguide feature and a portion of the second waveguide feature vertically overlaps a portion of the first waveguide feature.

20 Claims, 79 Drawing Sheets

(56) References Cited

U.S. PATENT DOCUMENTS

| | | | |
|---|---|---|---|
| 2010/0040327 A1* | 2/2010 | Deki | G02B 6/305 |
| | | | 385/28 |
| 2015/0125111 A1 | 5/2015 | Orcutt | |
| 2016/0197111 A1 | 7/2016 | Coolbaugh | |
| 2016/0380121 A1 | 12/2016 | Suzuki | |
| 2017/0068051 A1 | 3/2017 | Watanuki | |
| 2017/0139142 A1 | 5/2017 | Patel | |
| 2018/0348430 A1 | 12/2018 | Ogawa | |
| 2019/0131772 A1* | 5/2019 | Caër | H01S 5/0424 |
| 2019/0310417 A1 | 10/2019 | Coolbaugh | |
| 2020/0013771 A1* | 1/2020 | Maggi | G02B 6/1228 |
| 2020/0026000 A1 | 1/2020 | Bian | |
| 2020/0088942 A1* | 3/2020 | Bian | G02B 6/125 |
| 2020/0166720 A1 | 5/2020 | Charles | |
| 2021/0072460 A1 | 3/2021 | Zhang | |
| 2021/0364695 A1 | 11/2021 | Shin | |
| 2023/0125733 A1* | 4/2023 | Thomas | G02B 6/136 |
| | | | 385/37 |

\* cited by examiner

OPTICAL WAVEGUIDE APPARATUS AND METHOD OF FABRICATION THEREOF

PRIORITY DATA

This is a continuation of U.S. patent application Ser. No. 17/212,934, filed Mar. 25, 2021, which claims priority to U.S. Provisional Patent Application No. 63/041,149 filed on Jun. 19, 2020, each of which is hereby incorporated herein by reference in its entirety.

BACKGROUND

Optical waveguides, which confine and guide electromagnetic waves, are used as components in integrated optical circuits that provide various photonic functions. Integrated optical waveguides typically provide functionality for signals imposed on optical wavelengths in the visible or infrared spectrum and, with sub-micron dimensions, have even been observed to provide functionality for signals imposed on optical wavelengths in the infrared spectrum. However, thermo-optic coefficients of conventional optical waveguides make them extremely sensitive to temperature variations, which can result in malfunction of integrated optical circuits. Though new materials having lower thermo-optic coefficients are being explored for optical waveguides, it has been observed that to achieve desired confinement and guiding applications, optical waveguides made from the new materials often require design changes (e.g., increasing dimensions and/or sizes) to the optical circuits in which the optical waveguides are integrated. Improvements in optical waveguides and fabrication of optical waveguides are thus needed to meet IC scaling demands.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Figure 1:
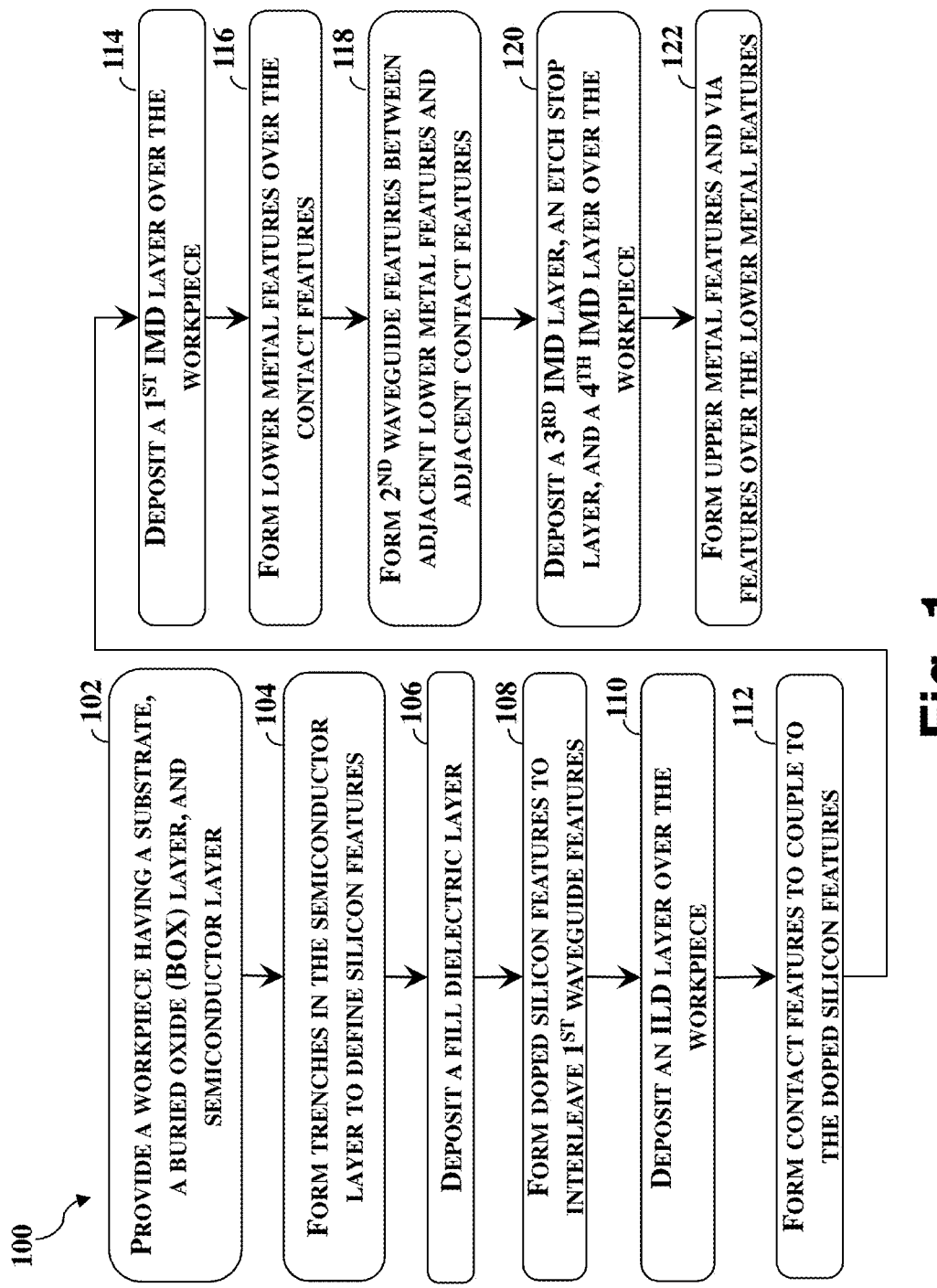
FIG. 1 illustrates a flow chart of a method for forming a semiconductor device having waveguide features, according to one or more aspects of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Further, when a number or a range of numbers is described with "about," "approximate," and the like, the term is intended to encompass numbers that are within a reasonable range considering variations that inherently arise during manufacturing as understood by one of ordinary skill in the art. For example, the number or range of numbers encompasses a reasonable range including the number described, such as within +/−10% of the number described, based on known manufacturing tolerances associated with manufacturing a feature having a characteristic associated with the number. For example, a material layer having a thickness of "about 5 nm" can encompass a dimension range from 4.25 nm to 5.75 nm where manufacturing tolerances associated with depositing the material layer are known to be +/−15% by one of ordinary skill in the art. Still further, the present disclosure may repeat reference numerals and/or letters in the various examples. This repetition is for the purpose of simplicity and clarity and does not in itself dictate a relationship between the various embodiments and/or configurations discussed.

Optical waveguides, which confine and guide electromagnetic waves, are used as components in integrated optical circuits that provide various photonic functions. Integrated optical waveguides typically provide functionality for signals imposed on optical wavelengths in the visible or infrared spectrum and, with sub-micron dimensions, have even been observed to provide functionality for signals imposed on optical wavelengths in the infrared spectrum. However, thermo-optic coefficients of conventional optical waveguides make them extremely sensitive to temperature variations, which can result in malfunction of integrated optical circuits. Though new materials having lower thermo-optic coefficients are being explored for optical waveguides, it has been observed that to achieve desired confinement and guiding applications, optical waveguides made from the new materials often require design changes (e.g., increasing dimensions and/or sizes) to the optical circuits in which the optical waveguides are integrated, resulting in increase of fabrication cost. Improvements in optical waveguides and fabrication of optical waveguides are thus needed to meet IC scaling demands.

For example, photonics devices for data-communication and tele-communication application employ light with a wavelength of 1310 nm (O-band) and 1550 nm (C-band), respectively. Silicon waveguides with sub-micron dimensions are able to confine infrared light (i.e., $\lambda > 700$ nm) due to its strong refractive index contrast to its cladding layer, which may be formed of silicon oxide. The refractive index of silicon is about 3.47 while the refractive index of silicon oxide is about 1.45. Using silicon as waveguide materials is not without its challenges. As silicon has a high thermo-optic coefficient ($dn/dT > 2.5 \times 10^{-4}$ $K^{-1}$), silicon is sensitive to temperature variation. In some cases, temperature changes may result in malfunction of silicon photonic devices. To combat the temperature sensitivity issues, silicon optical wave guide devices may require thermal tuning by use of a thermal heater or a feedback control mechanism. Such thermal tuning may be only one direction and require overhead margins as the temperature can only be increased, not decreased. Various low-thermo-optic coefficient materials have been proposed to be incorporated into temperature-sensitive optical devices. Silicon nitride is a low-thermo-optic coefficient material. Silicon nitride has a thermo-optic coefficient about $1.7 \times 10^{-5}$ $K^{-1}$, which is about one order of magnitude lower than that of silicon. Efficient light coupling between silicon photonics chip and silicon nitride waveguide may be implemented using spot size converters (i.e. optical edge couplers). Silicon nitride has a much lower refractive index between about 1.86 and 2.0 than silicon. For that reason, the thickness of a silicon nitride waveguide needs to be more than about 400 nm and about 600 nm to confine light in O-band (1310 nm) and C-band (1550 nm) applications. Additionally, to couple a silicon waveguide and a silicon nitride waveguide, the silicon waveguide and the silicon nitride have to be spaced apart by a spacing determined by the wavelength. For O-band and C-band applications, the spacing is about 200 nm. As the required thickness of silicon nitride waveguide and the required waveguide-to-waveguide spacing may not fit well with existing structure, implementation of silicon nitride waveguides in O-band or C-band applications may involve structural changes, which may be costly and undesirable. Implementation of silicon nitride waveguides allows improved routability and ready fabrication of silicon nitride ring oscillators, optical couplers, optical splitters, and optical combiners.

The various aspects of the present disclosure will now be described in more detail with reference to the figures. In that regard, FIGS. 1, 35, 44, and 66 are flowcharts illustrating methods 100, 300, 400, and 500 of forming a semiconductor device from a workpiece according to embodiments of the present disclosure. Methods 100, 300, 400, and 500 are merely examples and are not intended to limit the present disclosure to what is explicitly illustrated in methods 100, 300, 400, and 500. Additional steps can be provided before, during and after the methods 100, 300, 400, and 500, and some steps described can be replaced, eliminated, or moved around for additional embodiments of the methods. Not all steps are described herein in detail for reasons of simplicity. Methods 100, 300, 400 and 500 are described below in conjunction with FIGS. 2-34, 36-43, 45-65, and 67-68, which are fragmentary cross-sectional views of a workpiece 200 at different stages of fabrication according to embodiments of methods 100, 300, 400, and 500. Because the workpiece 200 is to be formed into an apparatus or a semiconductor structure after the fabrication processes, the workpiece 200 may also be referred an apparatus 200 or a semiconductor structure 200. Additionally, throughout the present disclosure, like reference numerals are used to denote like features, unless otherwise excepted.

Figure 2:
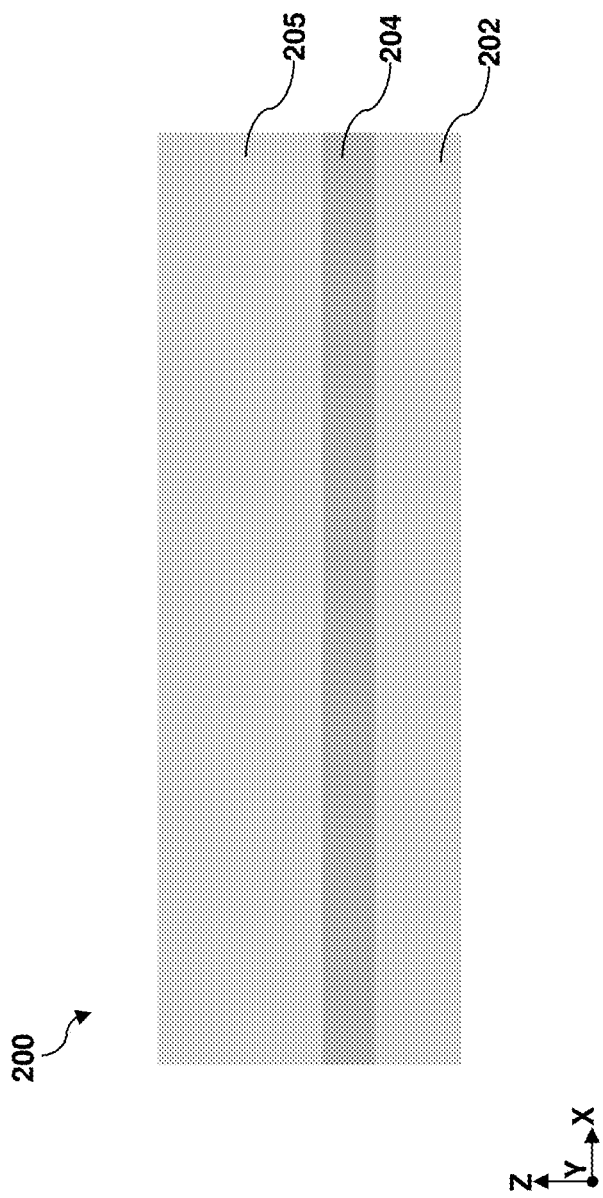
FIGS. 2-34 illustrate fragmentary cross-sectional views of a workpiece during a fabrication process according to the method of FIG. 1, according to one or more aspects of the present disclosure.

Referring to FIGS. 1 and 2, method 100 includes a block 102 where a workpiece 200 is provided. As shown in FIG. 2, the workpiece 200 includes a substrate 202, a buried oxide (BOX) layer 204 on the substrate 202, and a semiconductor layer 205 on the buried oxide layer 204. In one embodiment, the substrate 202 may be a silicon (Si) substrate. In some other embodiments, the substrate 202 may include other semiconductors such as germanium (Ge), silicon germanium (SiGe), or a III-V semiconductor material. Example III-V semiconductor materials may include gallium arsenide (GaAs), indium phosphide (InP), gallium phosphide (GaP), gallium nitride (GaN), gallium arsenide phosphide (GaAsP), aluminum indium arsenide (AlInAs), aluminum gallium arsenide (AlGaAs), gallium indium phosphide (GaInP), and indium gallium arsenide (InGaAs). The BOX layer 204 may include silicon oxide and the semiconductor layer 205 may include silicon (Si). In some implementations where the substrate 202 and the semiconductor layer 205 are formed of silicon (Si) and the BOX layer 204 is formed of silicon oxide, the substrate 202, the BOX layer 204, and the semiconductor layer 205 may be portions of a silicon-on-insulator (SOI) substrate.

Figure 3:
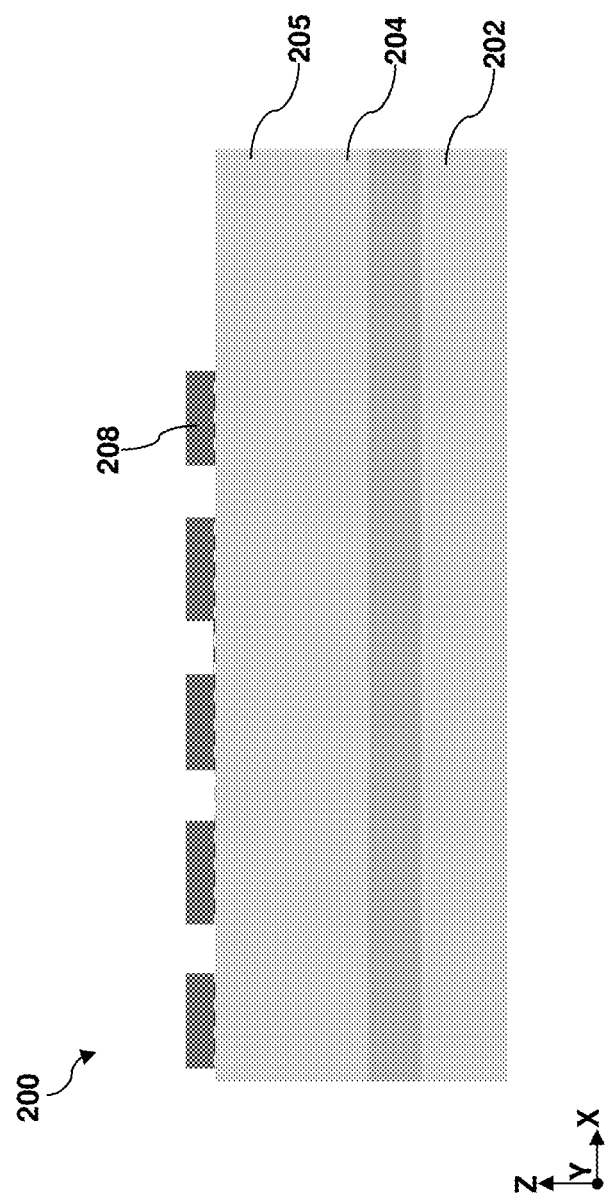
Figure 4:
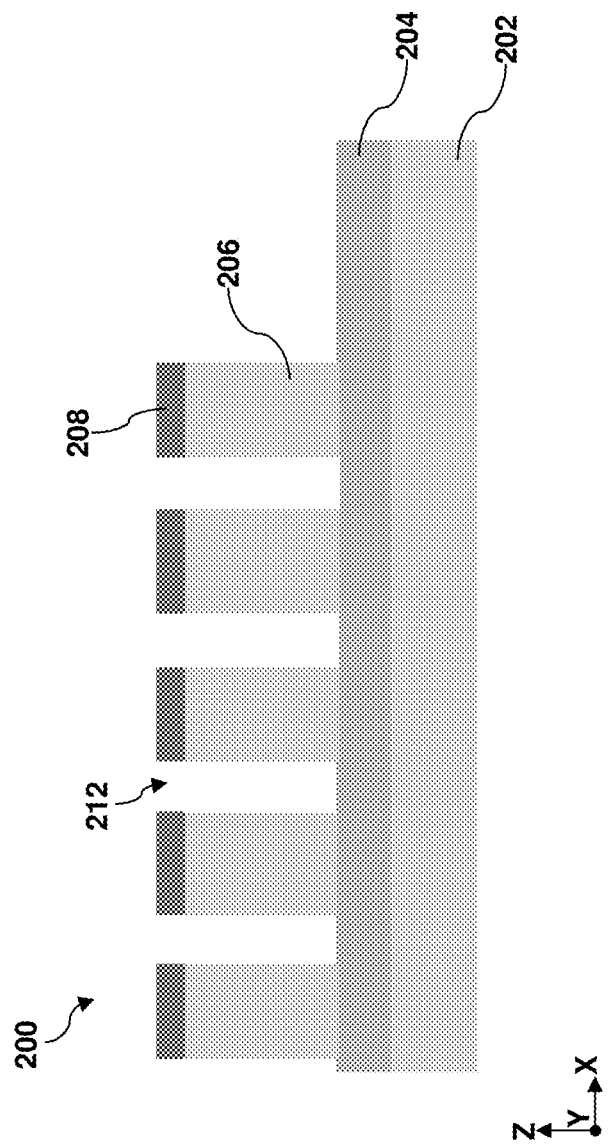

Referring to FIGS. 1 and 3-4, method 100 includes a block 104 where trenches 212 are formed in the semiconductor layer 205 to define silicon features 206. To define the silicon features 206, a first patterned hard mask 208 is formed over the semiconductor layer 205 as shown in FIG. 3. The first patterned hard mask 208 may be a single layer or a multi-layer and may include silicon oxide, silicon nitride, or a combination thereof. In an example process, a hard mask layer is blanketly deposited on the semiconductor layer 205 and is then patterned using photolithography and etch processes to form the first patterned hard mask 208. Referring to FIG. 4, the semiconductor layer 205 is etched using the first patterned hard mask 208 as an etch mask to form the trenches 212 that define the silicon features 206. In some embodiments, the etching at block 104 may include dry etching, reactive ion etching (RIE), and/or other suitable processes. As shown in FIG. 4, the silicon features 206 are disposed on the BOX layer 204 and are separated from one another by trenches 212. In some alternative embodiments illustrated in FIG. 68, a ridge-type or rib-type silicon features 206O may be formed. A method 500 to form the ridge-type silicon feature 206O will be described below.

Figure 5:
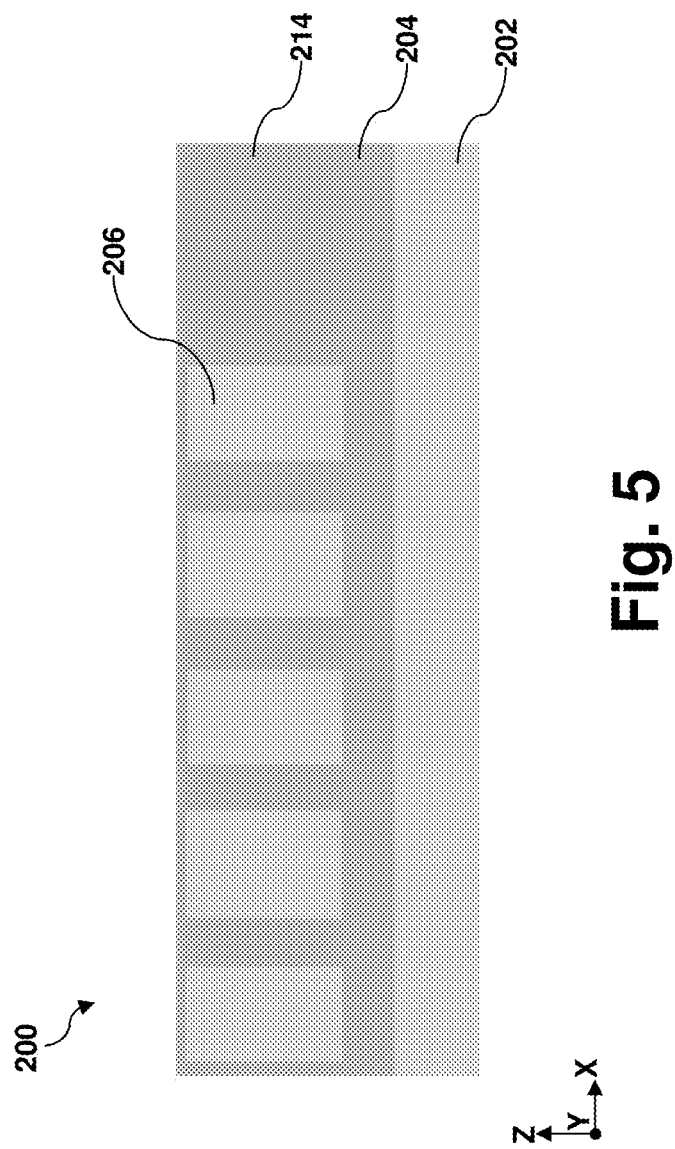

Referring to FIGS. 1 and 5, method 100 includes a block 106 where a fill dielectric layer 214 is deposited over the workpiece 200. The fill dielectric layer 214 may include silicon oxide or silicon-oxide-containing dielectric material. In some embodiments, the fill dielectric layer 214 may include tetraethylorthosilicate (TEOS) oxide, un-doped silicate glass, or doped silicon oxide such as borophosphosilicate glass (BPSG), fused silica glass (FSG), phosphosilicate glass (PSG), boron doped silicate glass (BSG), and/or other suitable dielectric materials and may be deposited using spin-on coating or flowable chemical vapor deposition (FCVD). In some other embodiments, the fill dielectric layer 214 may include silicon oxide and may be deposited using CVD, plasma-enhanced CVD (PECVD), or other suitable process. After the deposition of the fill dielectric layer 214, the workpiece 200 may be subject to a planarization process, such as a chemical mechanical polishing (CMP) process. After the planarization process, the silicon features 206 may remain covered by the fill dielectric layer 214, as shown in FIG. 5.

Figure 6:
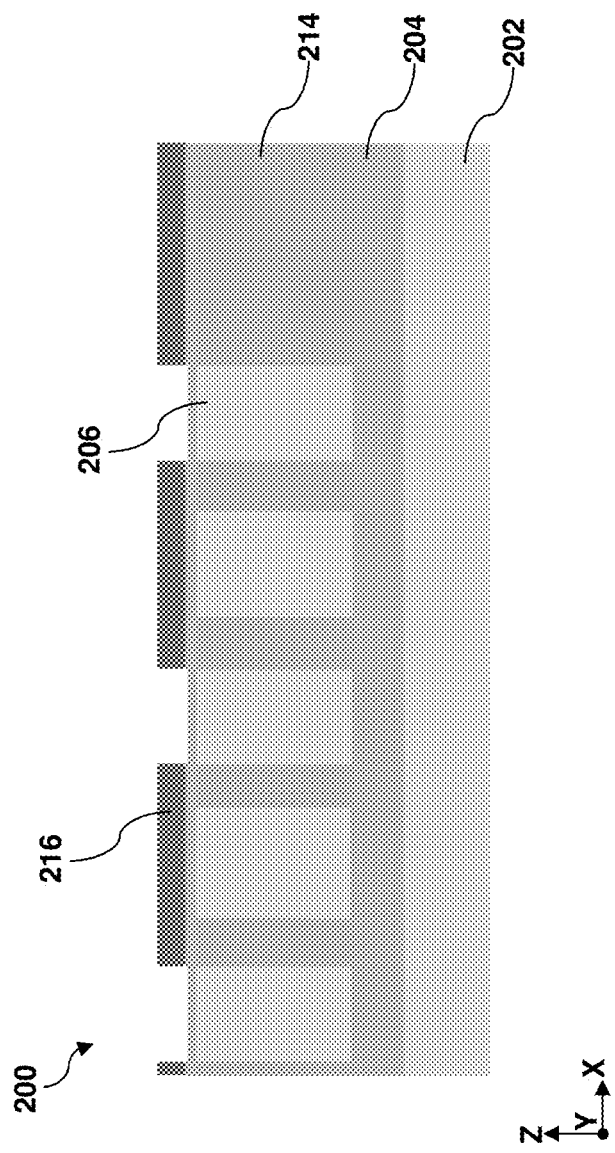
Figure 7:
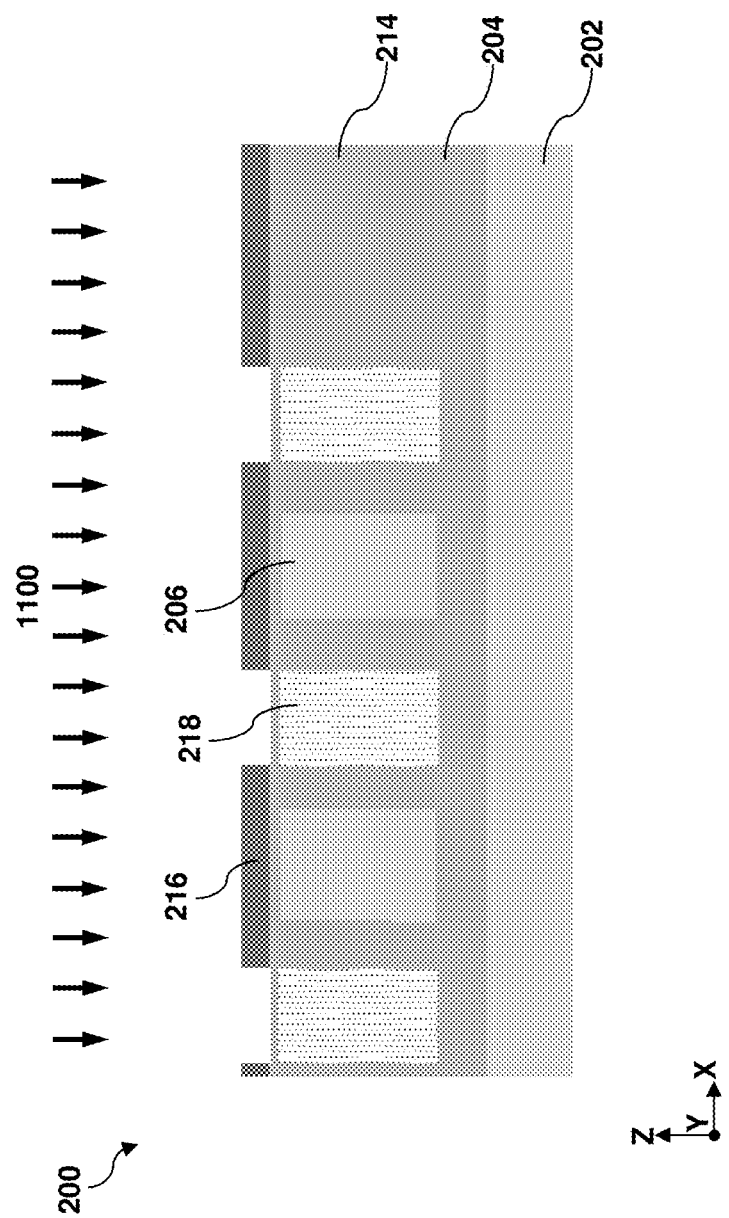

Referring to FIGS. 1 and 6-7, method 100 includes a block 108 where doped silicon features 218 are formed to interleave first waveguide features 206. Doped silicon features 218 provide electrical connection between electrical signal and the optical component when active waveguides are desired. Operations at block 108 determine whether a silicon feature 206 may be doped to become a doped silicon feature 218 or remain a silicon feature 206 to serve as the first waveguide features 206. Because a silicon feature 206 not doped at block 108 will serve as a waveguide, they may also be referred to a first waveguide feature 206 from block 108 forward. Block 108 forms a first implantation mask 216 (shown in FIG. 6) to expose a predetermined group of silicon features 206 and implements a first doping process 1100 (shown in FIG. 7) to selectively dope the predetermined group of silicon features 206 with an n-type dopant (such as phosphorus (P) or arsenic (As)) or a p-type dopant (such as boron (B) or boron difluoride ($BF_2$)), as required by the design of the apparatus 200. In some embodiments, the first implantation mask 216 may include silicon, silicon oxide, silicon nitride, a metal, a metal nitride, a metal oxide, or a metal silicide. In some alternative embodiments, the first implantation mask 216 may be a soft mask that includes polymeric materials. As shown in FIG. 7, the first doping process 1100 forms doped silicon features 218 that interleave the silicon features 206 covered by the first implantation mask 216. That is, each first waveguide feature 206 is adjacent to one or two doped silicon features 218. In some instances, because the first implantation mask 216 does not block all the ions from the first doping process 1100, the first waveguide features 206 may be partially doped near their top surfaces. In some embodiments, an anneal process may be performed to activate the dopants in the doped silicon features 218. After the first doping process 1100, the first implantation mask 216 is removed.

Figure 8:
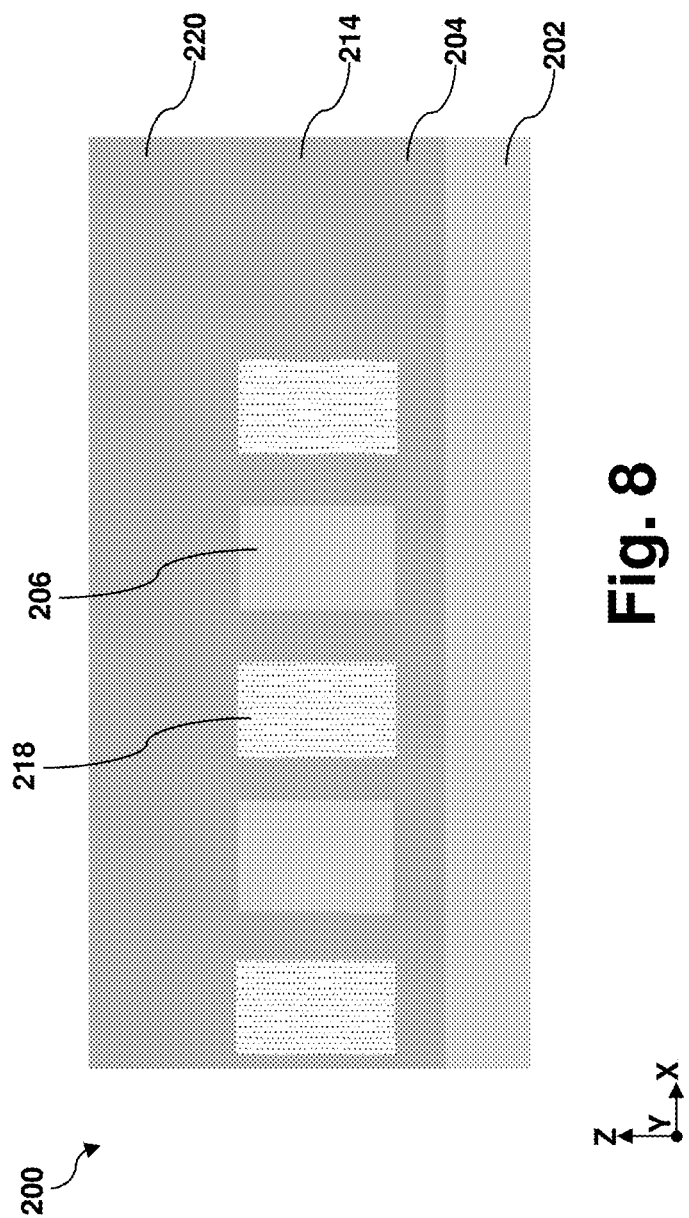

Referring to FIGS. 1 and 8, method 100 includes a block 110 where an interlayer dielectric (ILD) layer 220 is formed over the workpiece 200. The ILD layer 220 may include silicon oxide or silicon-oxide-containing dielectric material. In some embodiments, the ILD layer 220 may include tetraethylorthosilicate (TEOS) oxide, un-doped silicate glass, or doped silicon oxide such as borophosphosilicate glass (BPSG), fused silica glass (FSG), phosphosilicate glass (PSG), boron doped silicate glass (BSG), and/or other suitable dielectric materials and may be deposited using spin-on coating or flowable chemical vapor deposition (FCVD). In some other embodiments, the ILD layer 220 may include silicon oxide and may be deposited using CVD, plasma-enhanced CVD (PECVD), or other suitable process. In some instances, the ILD layer 220 may have a thickness (along the Z direction) between about 250 nm and about 350 nm.

Figure 9:
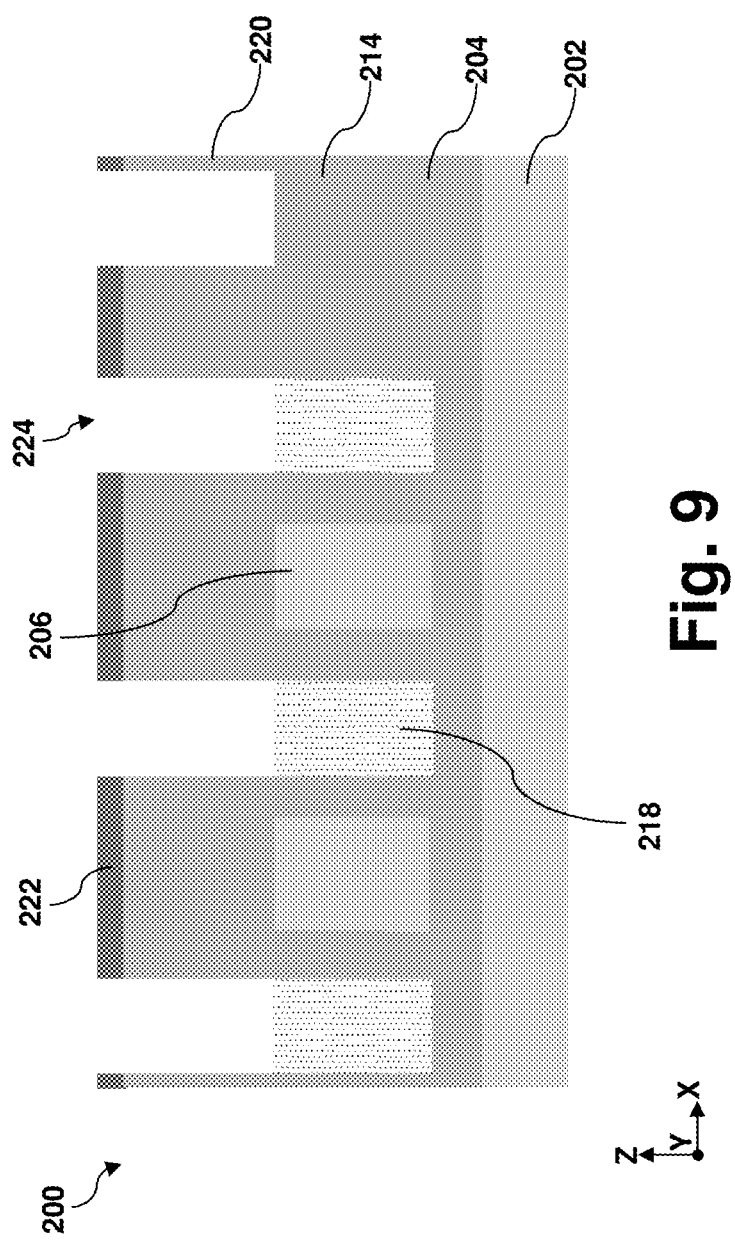
Figure 10:
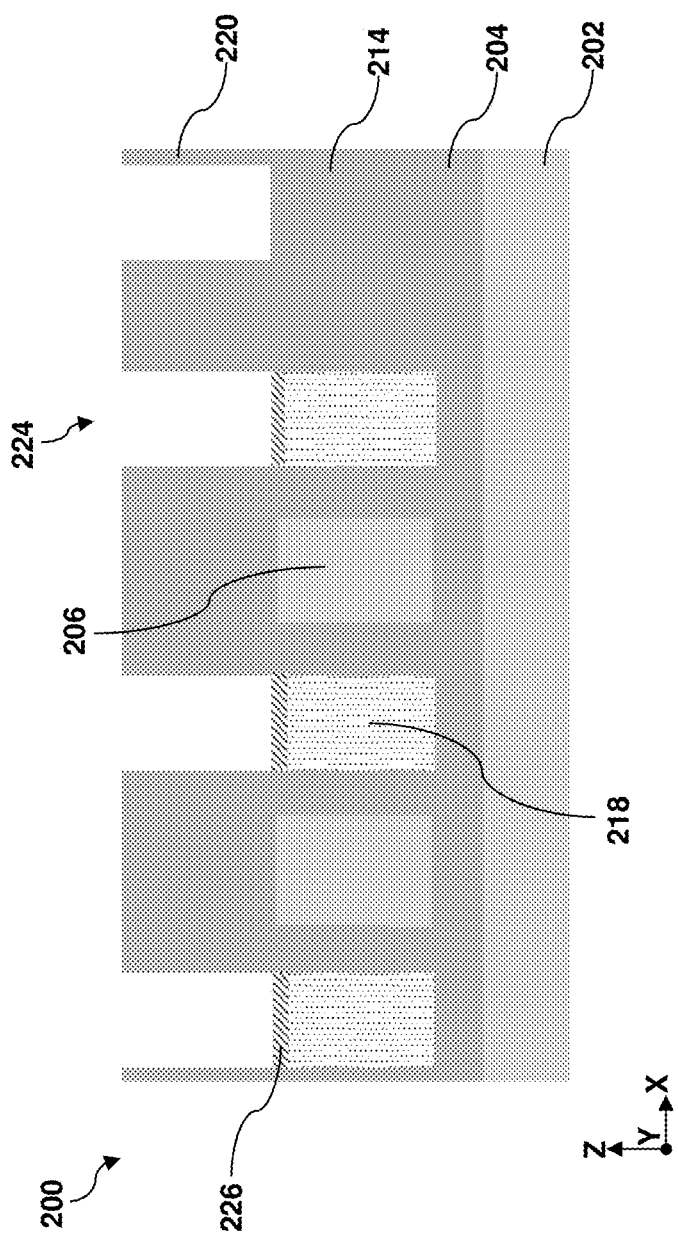
Figure 11:
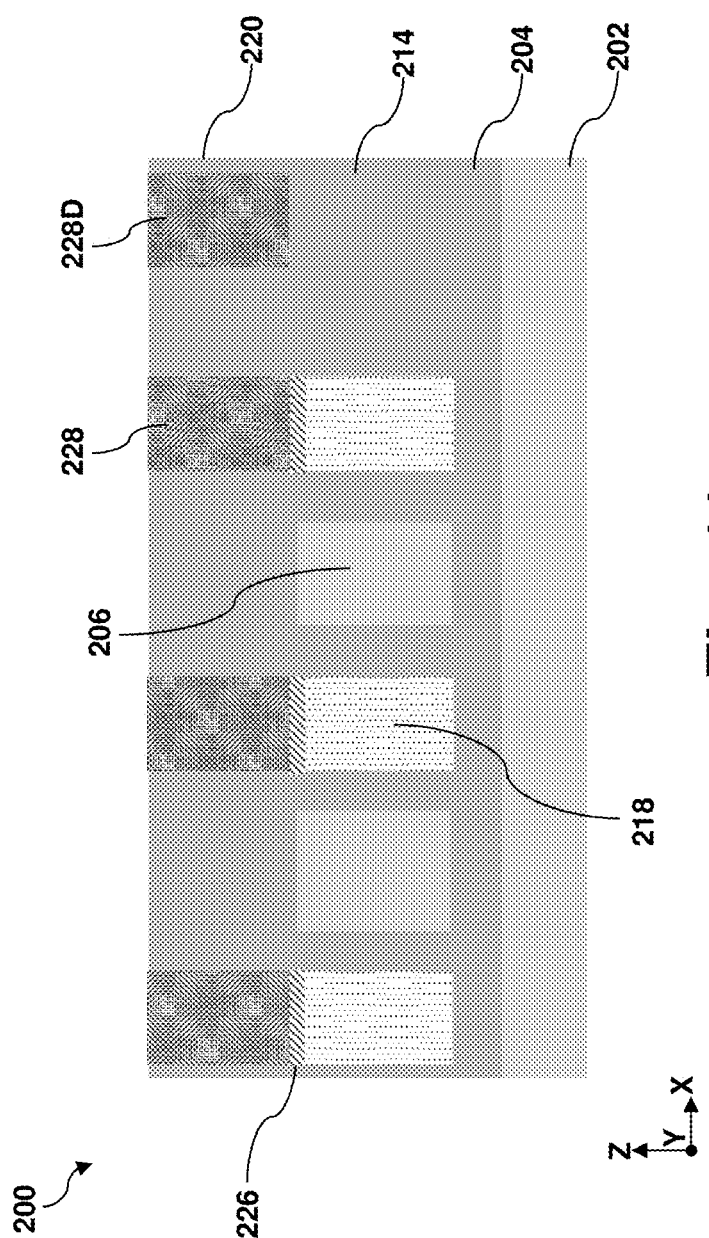

Referring to FIGS. 1 and 9-11, method 100 includes a block 112 where contact features 228 are formed to couple to the doped silicon features 218. In an example process, openings 224 are formed in the ILD layer 220 to expose the doped silicon features 218, as shown in FIG. 9. To form the openings 224, a second patterned hard mask 222 is formed over the ILD layer 220. Because the formation and composition of the second patterned hard mask 222 may be similar to those of the first patterned hard mask 208, detailed description of the second patterned hard mask 222 is omitted for brevity. Still referring to FIG. 9, the ILD layer 220 is then etched using the second patterned hard mask 222 as an etch mask until the doped silicon features 218 are exposed in the openings 224. Reference is made to FIG. 10. With the doped silicon features 218 exposed, a silicide layer 226 is formed on the exposed silicon features 218. In an example process, a metal precursor is deposited over the workpiece 200 and an anneal process is performed to bring about silicidation between the metal precursor and the doped silicon features 218 to form the silicide layer 226. A suitable metal precursor may include titanium (Ti), tantalum (Ta), nickel (Ni), cobalt (Co), or tungsten (W). The silicide layer 226 may include titanium silicide (TiSi), titanium silicon nitride (TiSiN), tantalum silicide (TaSi), tungsten silicide (WSi), cobalt silicide (CoSi), or nickel silicide (NiSi). In some implementations, the metal precursor that is not converted to the silicide layer 226 may be selectively removed. The silicide layer 226 functions to reduce contact resistance to the doped silicon features 218. After the formation of the silicide layer 226, a metal fill layer may be deposited into the openings 224 on the silicide layer 226. The metal fill layer may include titanium nitride (TiN), titanium (Ti), ruthenium (Ru), nickel (Ni), cobalt (Co), copper (Cu), molybdenum (Mo), tungsten (W), tantalum (Ta), or tantalum nitride (TaN). A planarization process may follow to remove excess metal fill layer over the first ILD layer 220, thereby forming the contact features 228 in the first ILD layer 220, as shown in FIG. 11. In some instances, the contact features 228 may have a thickness (along the Z direction) between about 350 nm and about 380 nm. Depending on the design, while some contact features 228 are physically disposed on and electrically coupled to underlying doped silicon features 218, some contact features 228 are not coupled to any doped silicon features 218 and are electrically floating. Such an electrically floating contact feature 228 may be referred to as a dummy contact feature. FIG. 11 illustrates a dummy contact feature 228D. The contact features 228 and dummy contact features 228D are situated in a first interconnect layer over doped silicon features 218. The dummy contact features 228D are either inserted into isolated areas (where there are less contact features) to reduce process loading effect or are inserted as isolation structures. The dummy contact features 228D do not perform any circuit functions and may be electrically floating. After the formation of the contact features 228 and the dummy contact features 228D, a planarization process, such as a chemical mechanical polishing (CMP) process, is performed to provide a planar top surface. After the CMP process, top surfaces of the first ILD layer 220, the contact features 228, and the dummy contact features 228D are coplanar.

Figure 12:
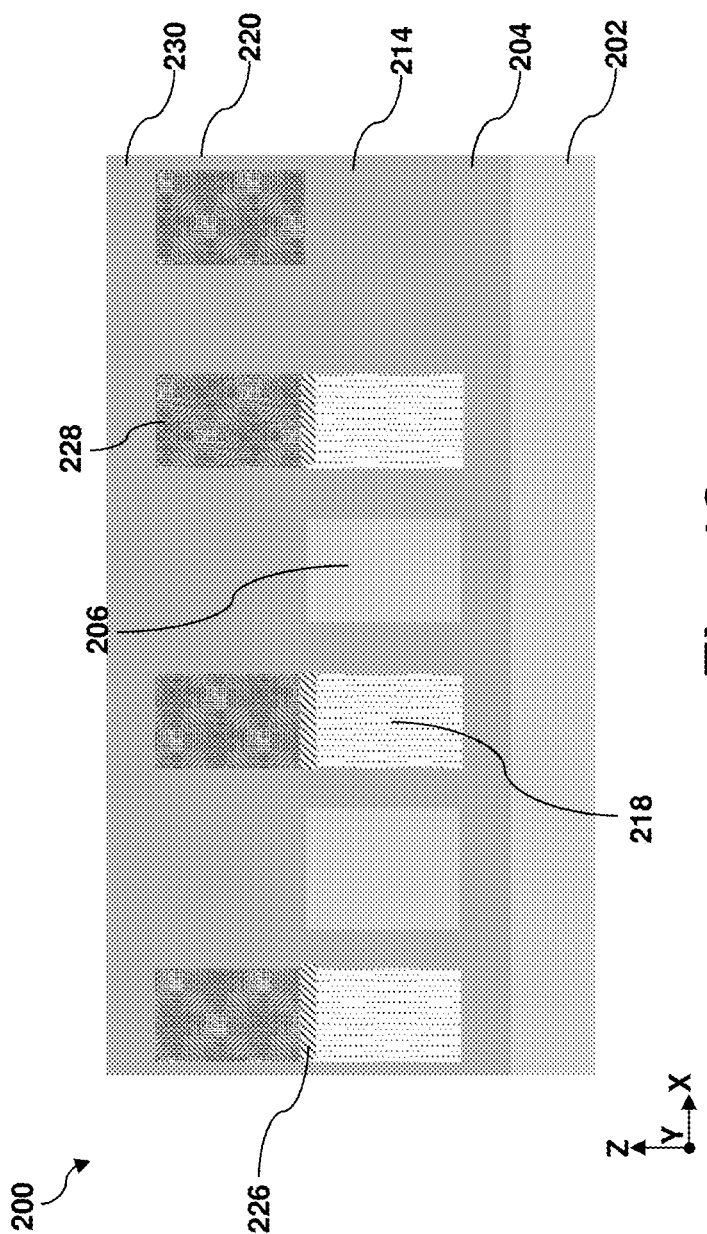

Referring to FIGS. 1 and 12, method 100 includes a block 114 where a first intermetal dielectric (IMD) layer 230 is deposited over the workpiece 200. The first IMD layer 230 may include silicon oxide or silicon-oxide-containing dielectric material. In some embodiments, the first IMD layer 230 may include tetraethylorthosilicate (TEOS) oxide, un-doped silicate glass, or doped silicon oxide such as borophosphosilicate glass (BPSG), fused silica glass (FSG), phosphosilicate glass (PSG), boron doped silicate glass (BSG), and/or other suitable dielectric materials and may be deposited using spin-on coating or flowable chemical vapor deposition (FCVD). In some other embodiments, the first IMD layer 230 may include silicon oxide and may be deposited using CVD, plasma-enhanced CVD (PECVD), or other suitable process. In some instances, the first IMD layer 230 may have a thickness (along the Z direction) between about 180 nm and about 200 nm. As shown in FIGS. 11 and 12, the first IMD layer 230 is disposed on the first ILD layer 220, the contact features 228 and the dummy contact features 228D.

Figure 13:
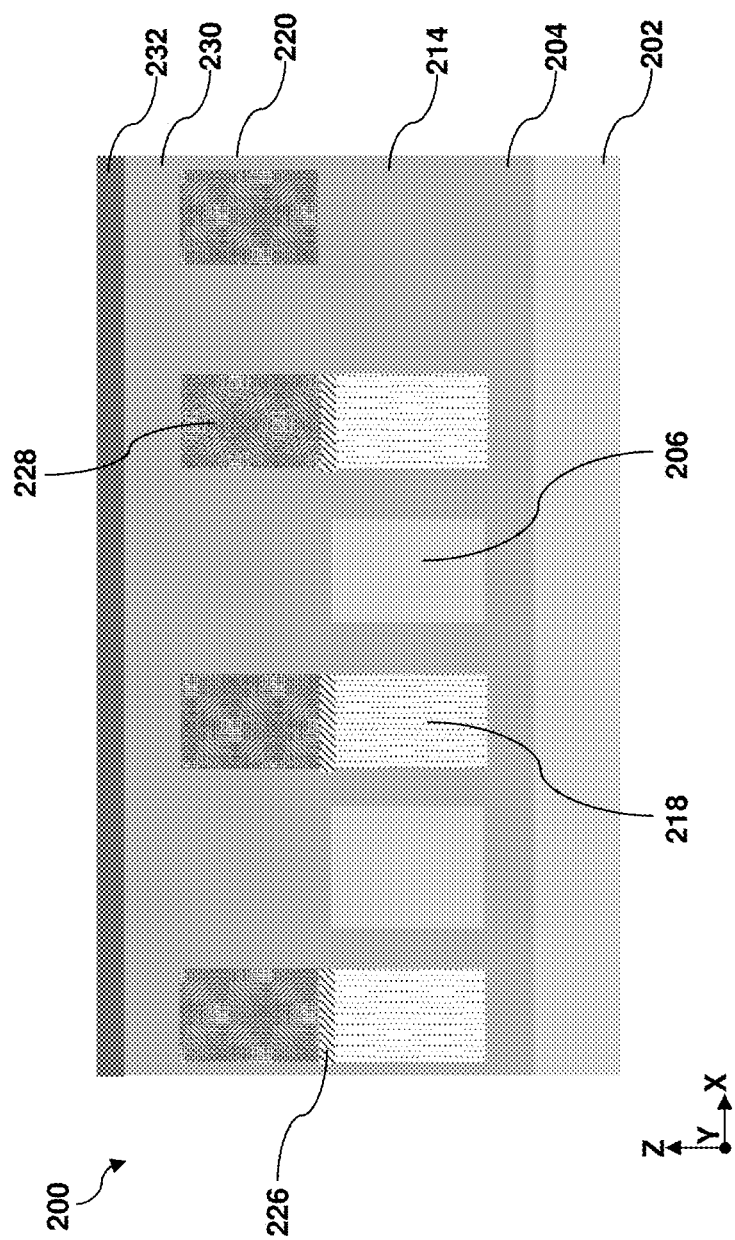
Figure 14:
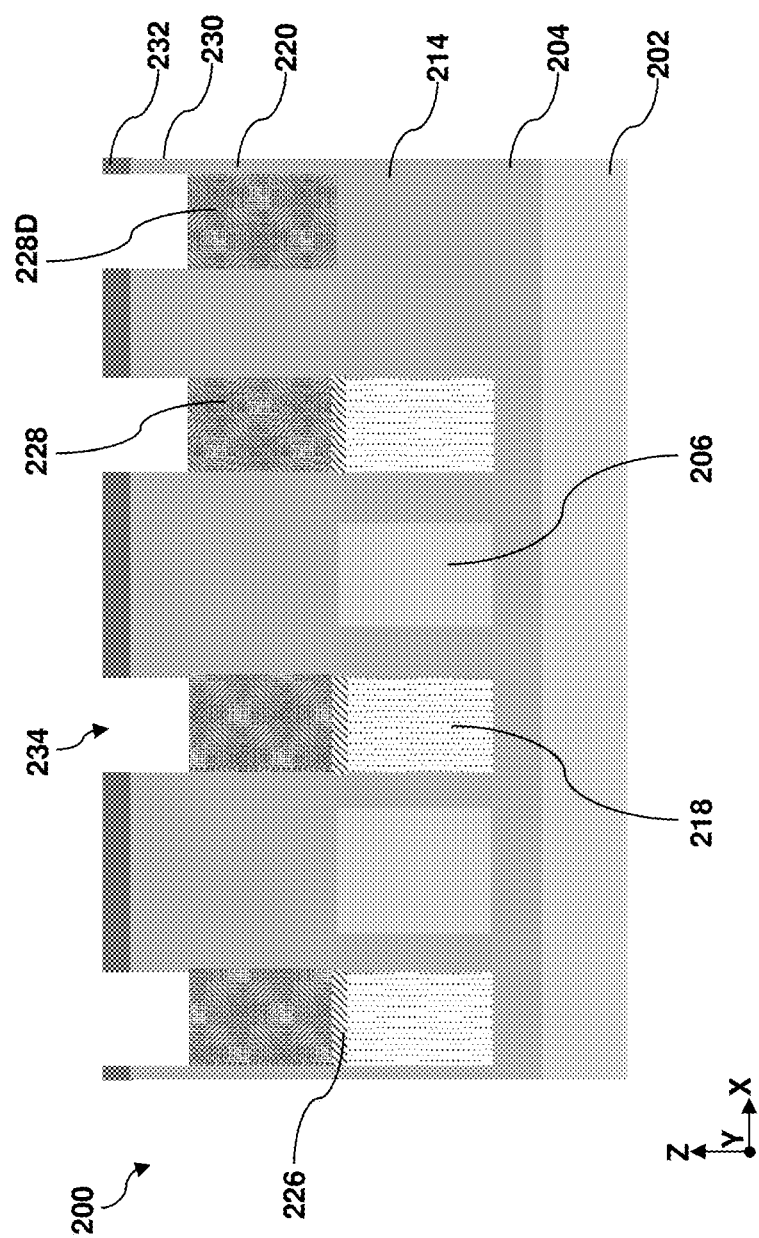
Figure 15:
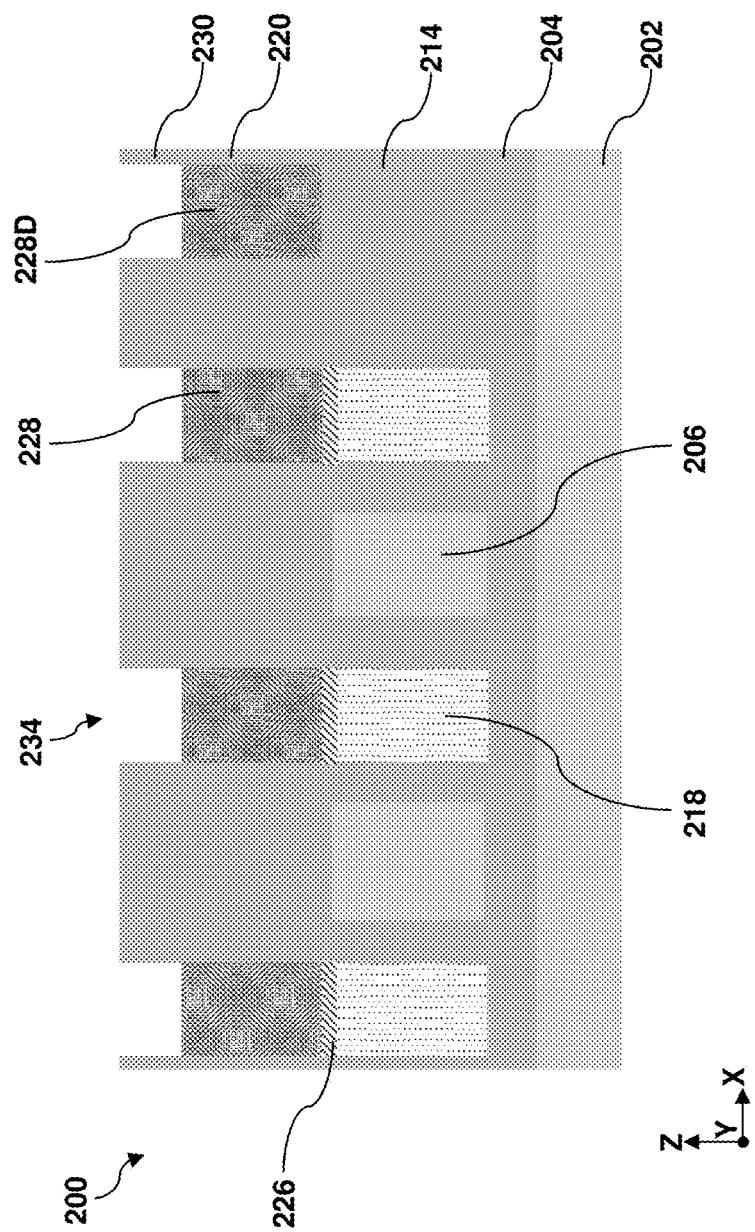
Figure 16:
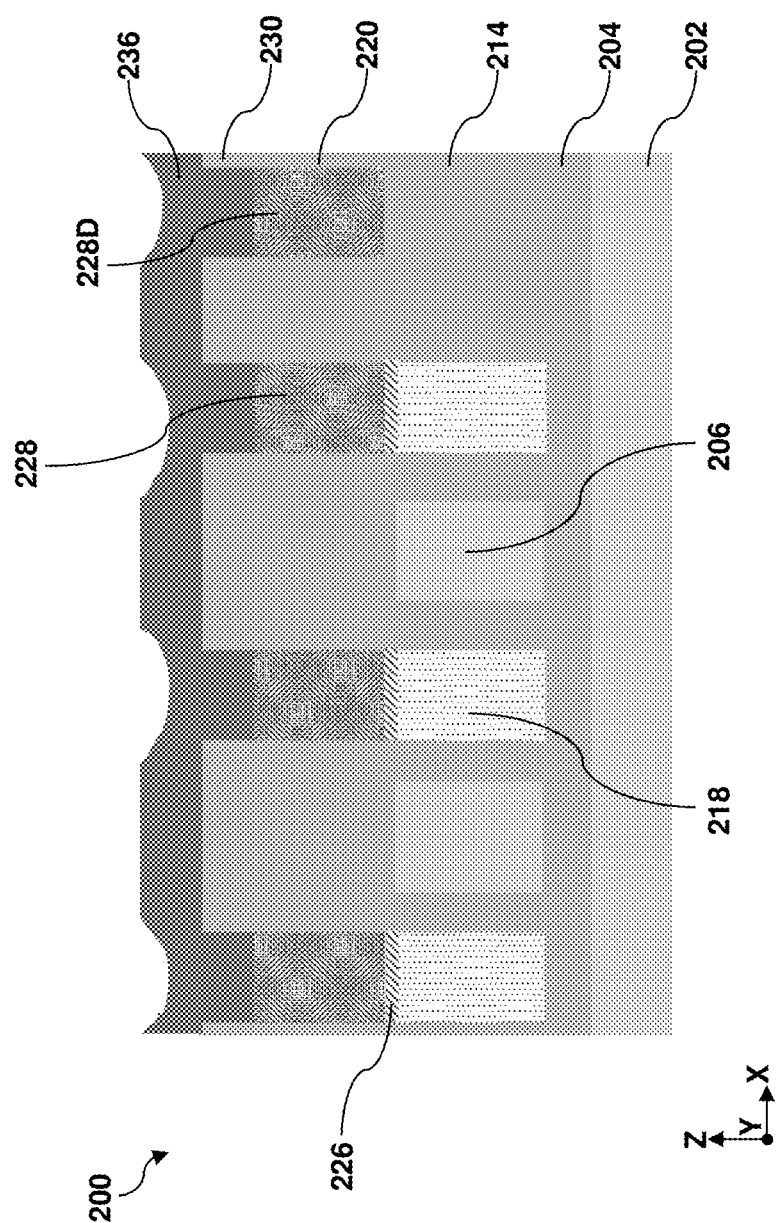
Figure 17:
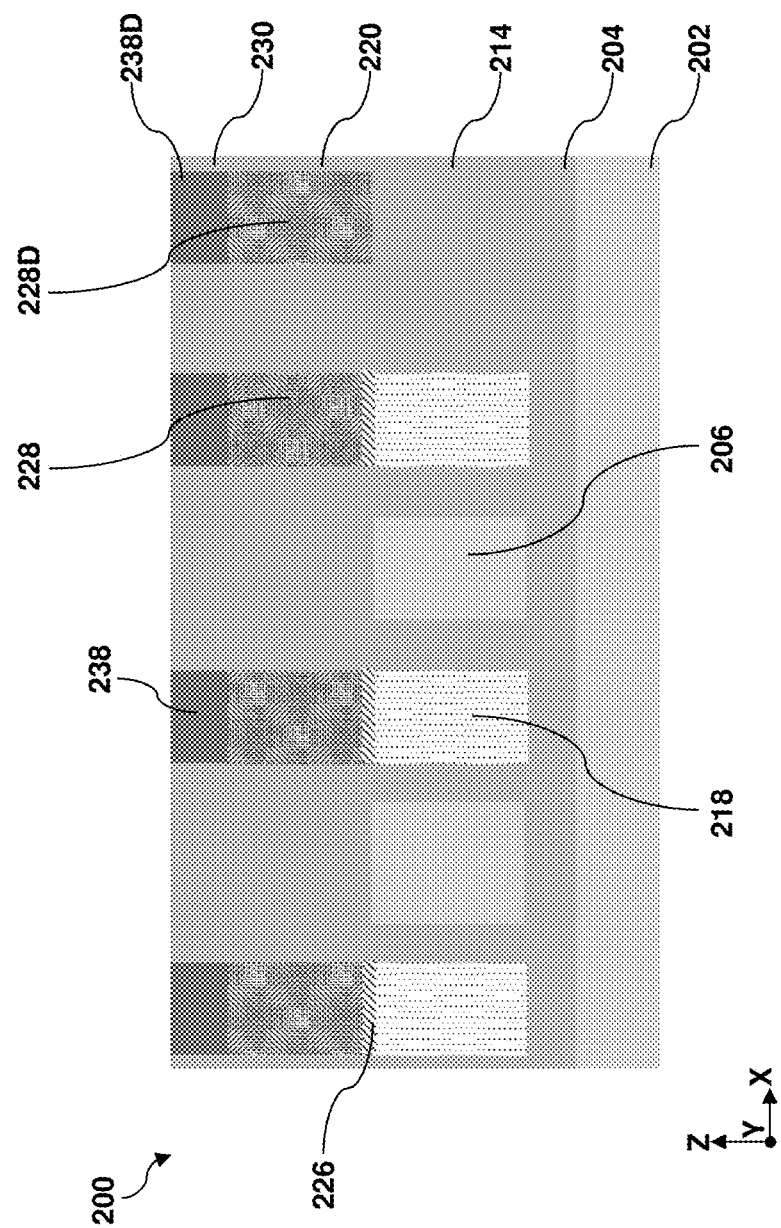

Referring to FIGS. 1 and 13-17, method 100 includes a block 116 where lower metal features 238 are formed over the contact features 228. Operations at block 116 may include formation of a third hard mask layer 232 (shown in FIG. 13), patterning the third hard mask layer 232 and etching the first IMD layer 230 (shown in FIG. 14), removal of the patterned hard mask 232 (shown in FIG. 15), depositing a metal fill layer 236 over the workpiece 200 (shown in FIG. 16), and planarizing the workpiece 200 to form the lower metal features 238 (shown in FIG. 17). Referring to FIGS. 13 and 14, the third hard mask layer 232 is deposited over the workpiece 200 and patterned to form the third patterned hard mask 232. As the formation and composition of the third patterned hard mask 232 are similar to those of the first patterned hard mask 208, detailed description of the third patterned hard mask 232 is omitted for brevity. In FIG. 14, the third patterned hard mask 232 is applied as an etch mask to etch the first IMD layer 230 to expose the contact features 228 (as well as dummy contact feature 228D) in openings 234. The third patterned hard mask 232 is then removed by a dry etch process selective to the third patterned hard mask 232, as shown in FIG. 15. Referring to FIG. 16, a metal fill layer 236 is deposited over the workpiece 200, including over the openings 234. The metal fill layer 236 may include titanium nitride (TiN), titanium (Ti), ruthenium (Ru), nickel (Ni), cobalt (Co), copper (Cu), molybdenum (Mo), tungsten (W), tantalum (Ta), or tantalum nitride (TaN). Referring to FIG. 17, a planarization process is then performed to remove excess metal fill layer 236 over the first IMD layer 230 to form the lower metal features 238 in the first IMD layer 230. A lower metal feature 238 disposed over and coupled to a dummy contact feature 228D does not serve any circuit function and may be referred to as a dummy lower metal feature 238D. The lower metal features 238 and dummy lower metal features 238D are situated in a second interconnect layer over the first interconnect layer where contact features 228 are situated. The dummy lower metal features 238D are either inserted into isolated areas (where there are less lower metal features) to reduce process loading effect or are inserted as isolation structures. The dummy lower metal features 238D do not perform any circuit functions and may be electrically floating.

Figure 18:
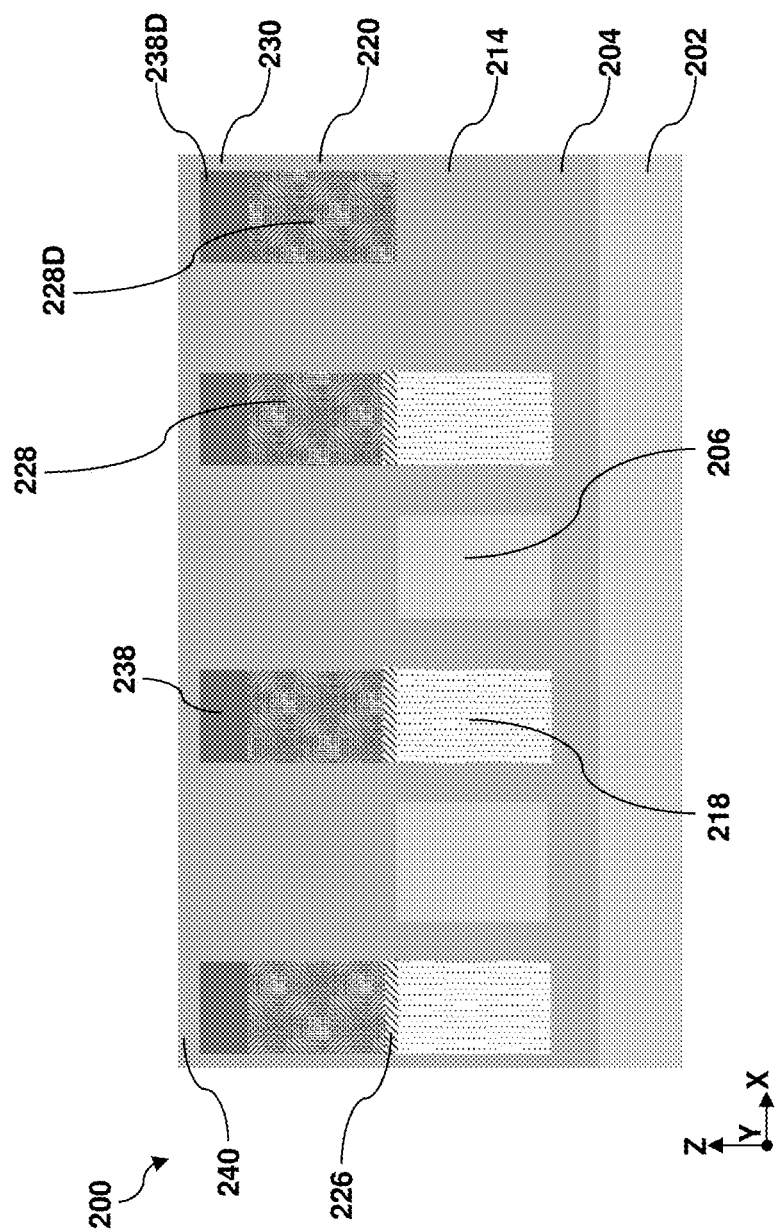
Figure 19:
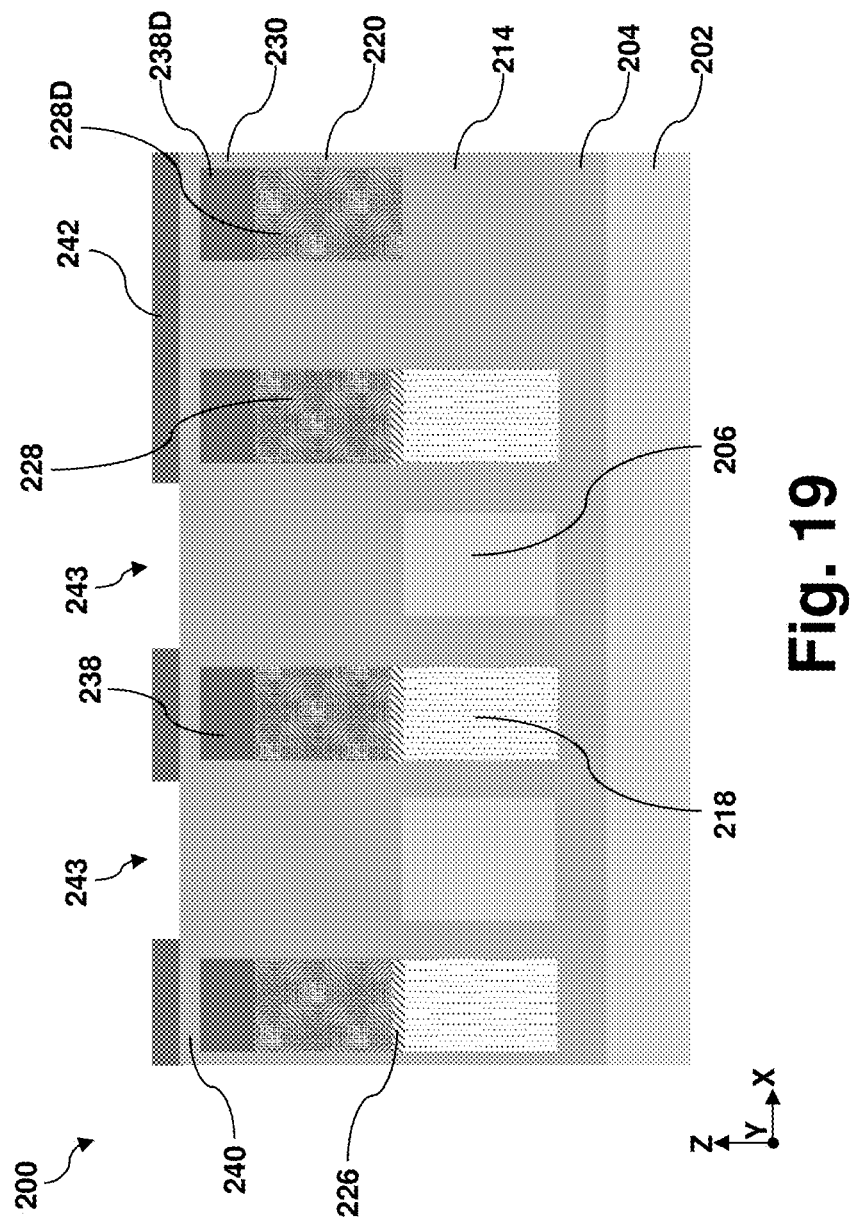
Figure 20:
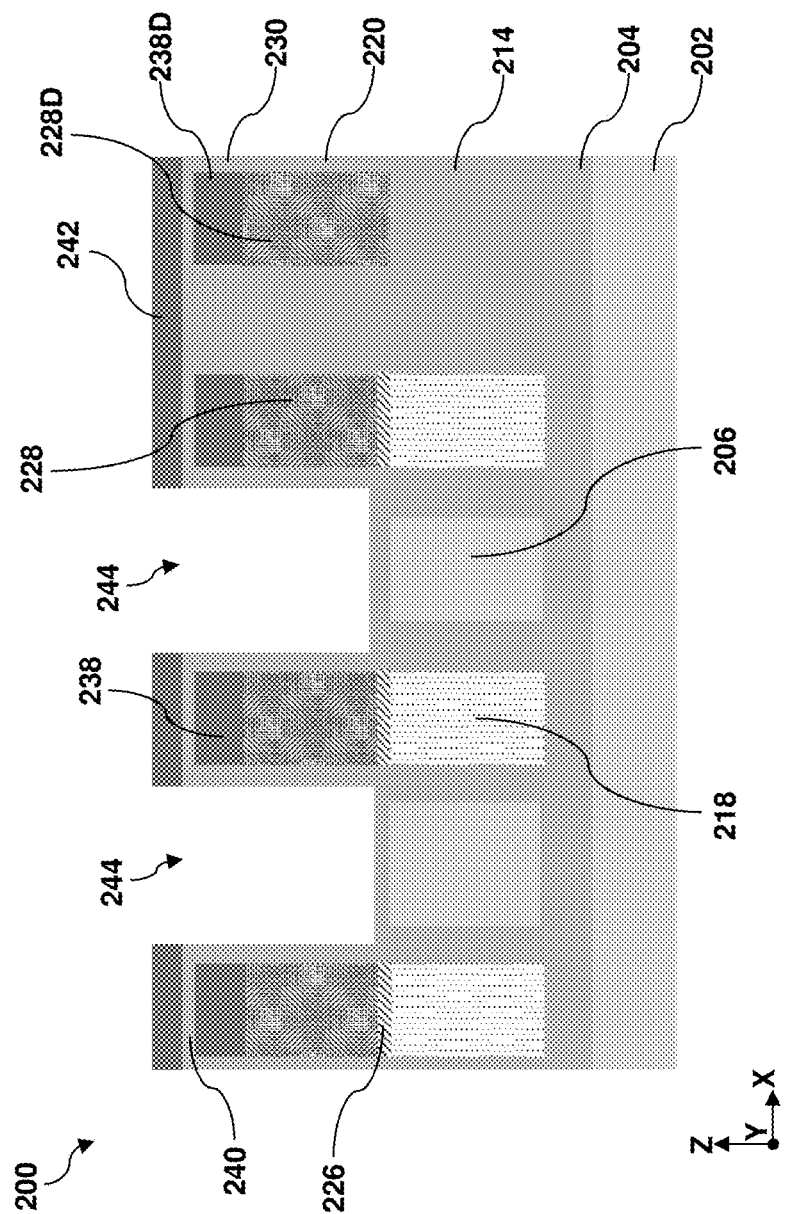
Figure 21:
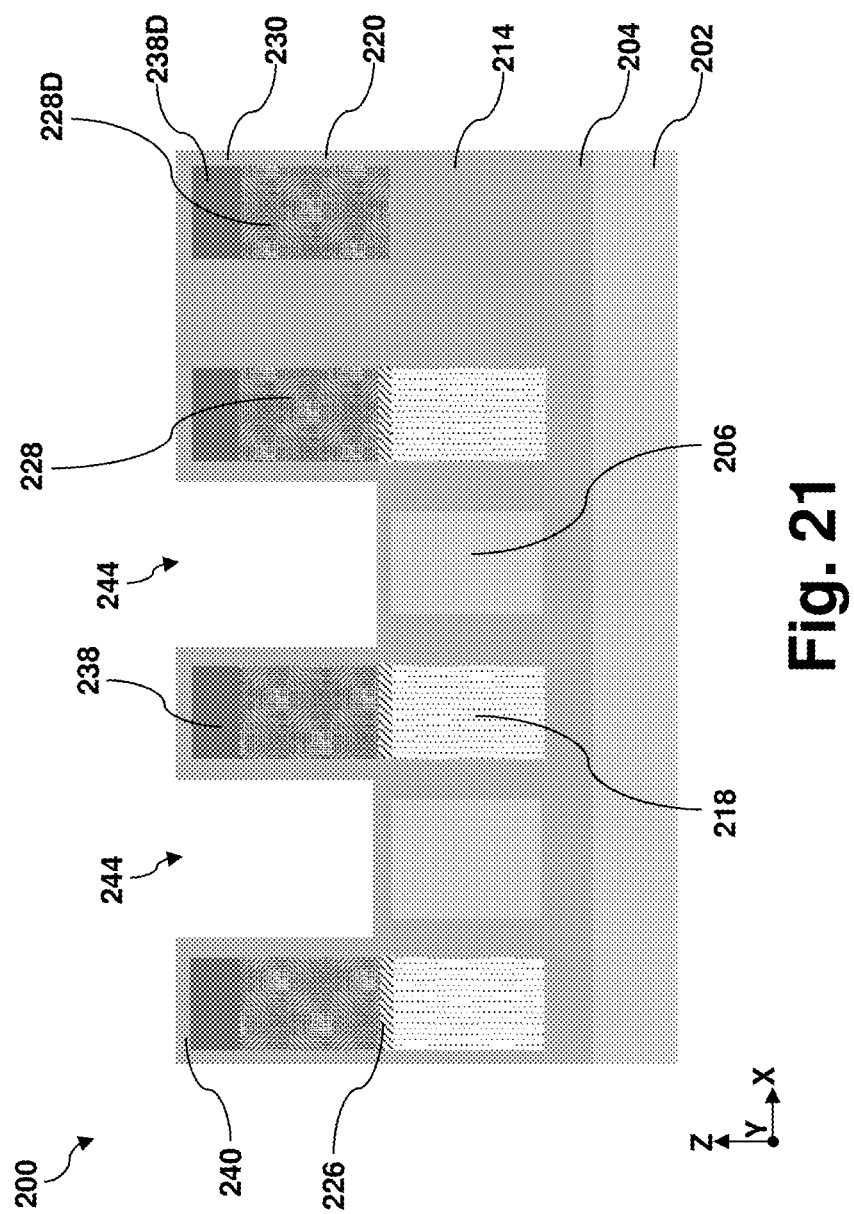
Figure 22:
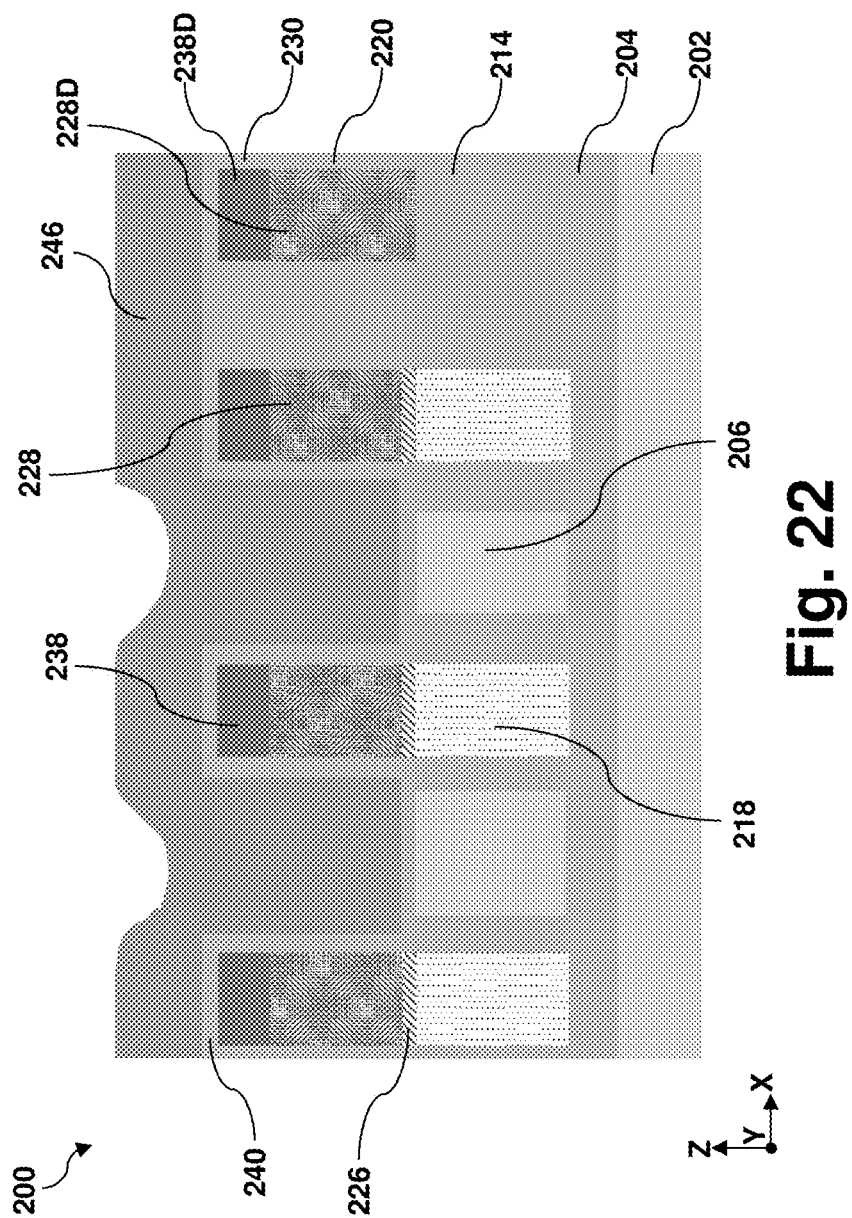
Figure 23:
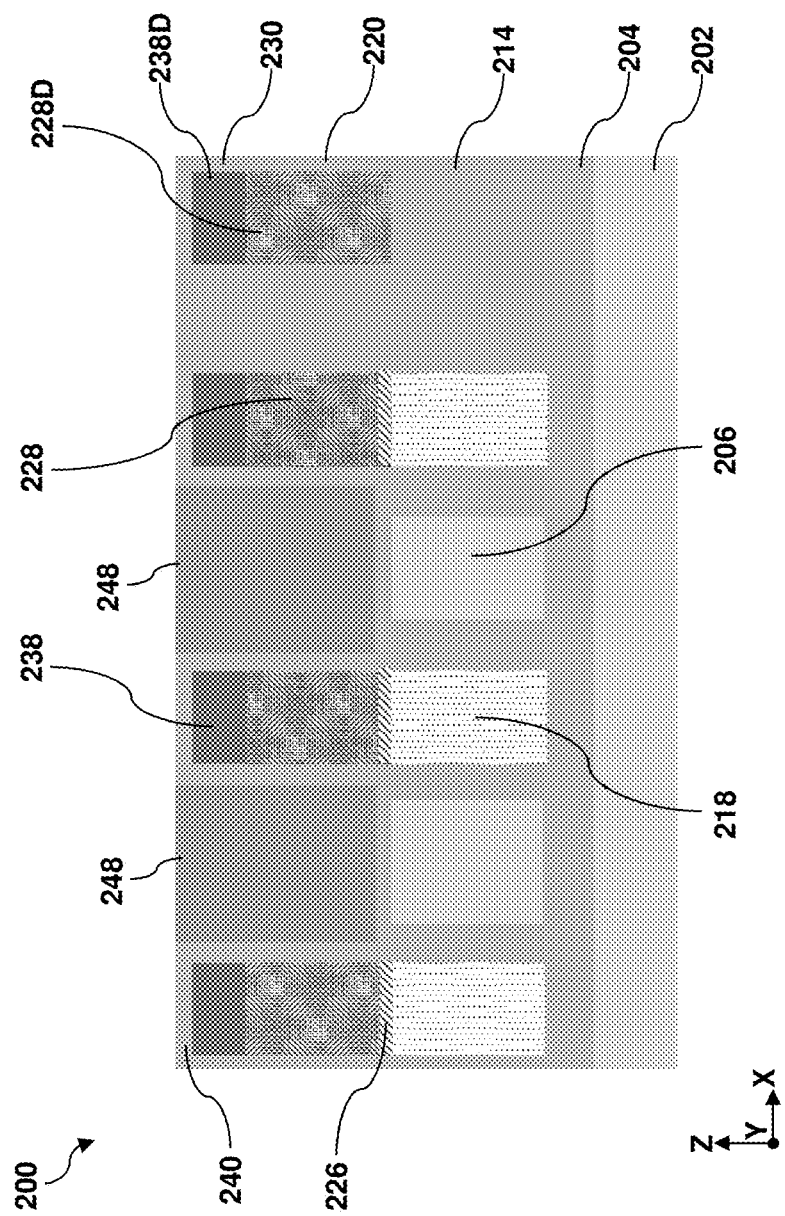

Referring to FIGS. 1 and 18-23, method 100 includes a block 118 where second waveguide features are formed between adjacent lower metal features 238 and adjacent contact features 228. Operations at block 118 include deposition of a second IMD layer 240 (shown in FIG. 18), formation of a fourth patterned hard mask 242 (shown in FIG. 19), formation of waveguide trenches 244 in the ILD layer 220, the first IMD layer 230 and the second IMD layer 240 (shown in FIG. 20), removal of the fourth patterned hard mask 242 (shown in FIG. 21), deposition of a waveguide material 246 over the workpiece 200 (shown in FIG. 22), and planarization of the workpiece 200 to form second waveguide features 248 (shown in FIG. 23). Referring to FIG. 18, the second IMD layer 240 is blanketly deposited over the workpiece 200. As the deposition and composition of the second IMD layer 240 are similar to those of the first IMD layer 230, detailed description of the second IMD layer 240 is omitted for brevity. As shown in FIG. 19, the fourth patterned hard mask 242 is formed over the workpiece 200. The formation and composition of the fourth patterned hard mask 242 may be similar to those of the first patterned hard mask 208. Detailed description of the fourth patterned hard mask 242 is therefore omitted for brevity. The fourth patterned hard mask 242 includes openings 243 directly over first waveguide features 206 while covering the lower metal features 238. Referring to FIG. 20, the fourth patterned hard mask 242 is applied as an etch mask to etch the second IMD layer 240, the first IMD layer 230, and the ILD 220 to form waveguide trenches 244. In the depicted embodiment, the waveguide trenches 244 do not extend through the ILD 220 or the fill dielectric layer 214. That is, the first waveguide features 206 are not exposed in the waveguide trenches 244. As shown in FIG. 21, the workpiece 200 is subject to an etch back process to remove the fourth patterned hard mask 242. With the fourth patterned hard mask 242 removed, the waveguide material 246 is deposited over the workpiece 200, including over the waveguide trenches 244, as illustrated in FIG. 22. The waveguide material 246 includes silicon nitride and may be deposited using CVD, FCVD, PECVD, spin-on coating, or a suitable method. Referring to FIG. 23, a planarization process, such a chemical mechanical polishing (CMP) process, may be performed to remove excess waveguide material over the second IMD layer 240, thereby forming and defining the second waveguide features 248.

Figure 24:
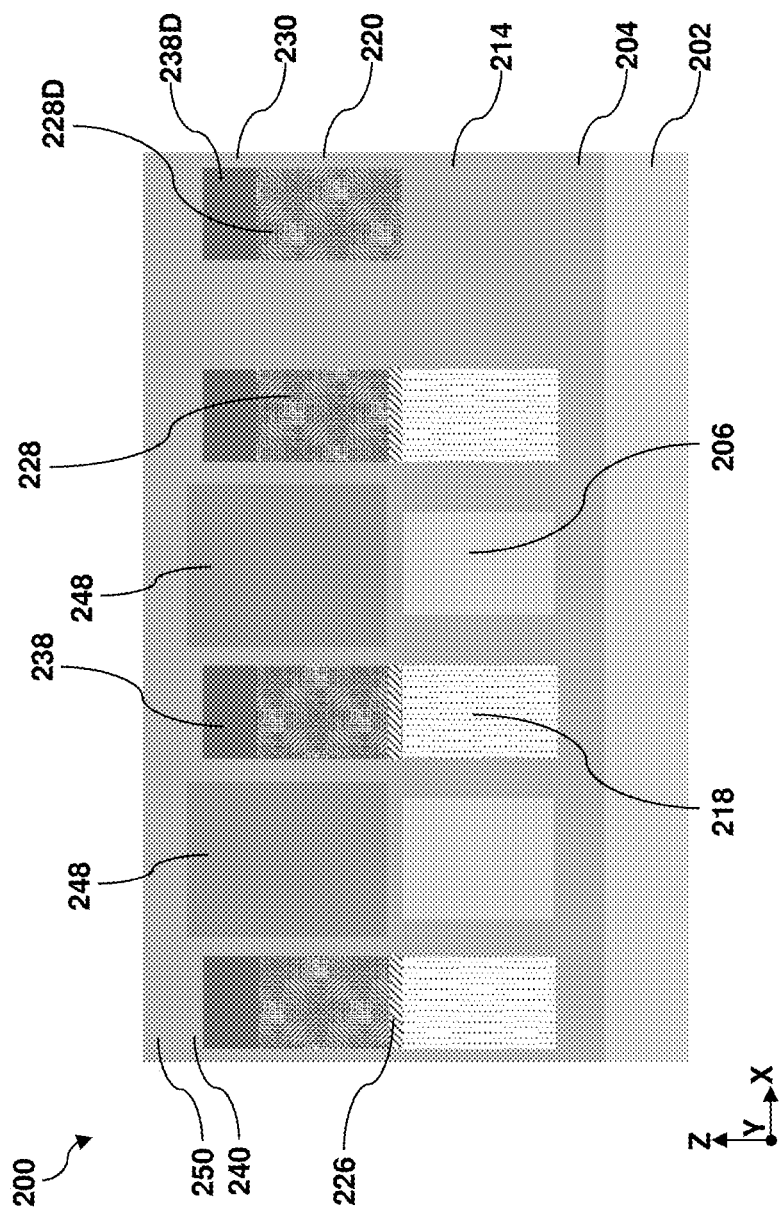
Figure 25:
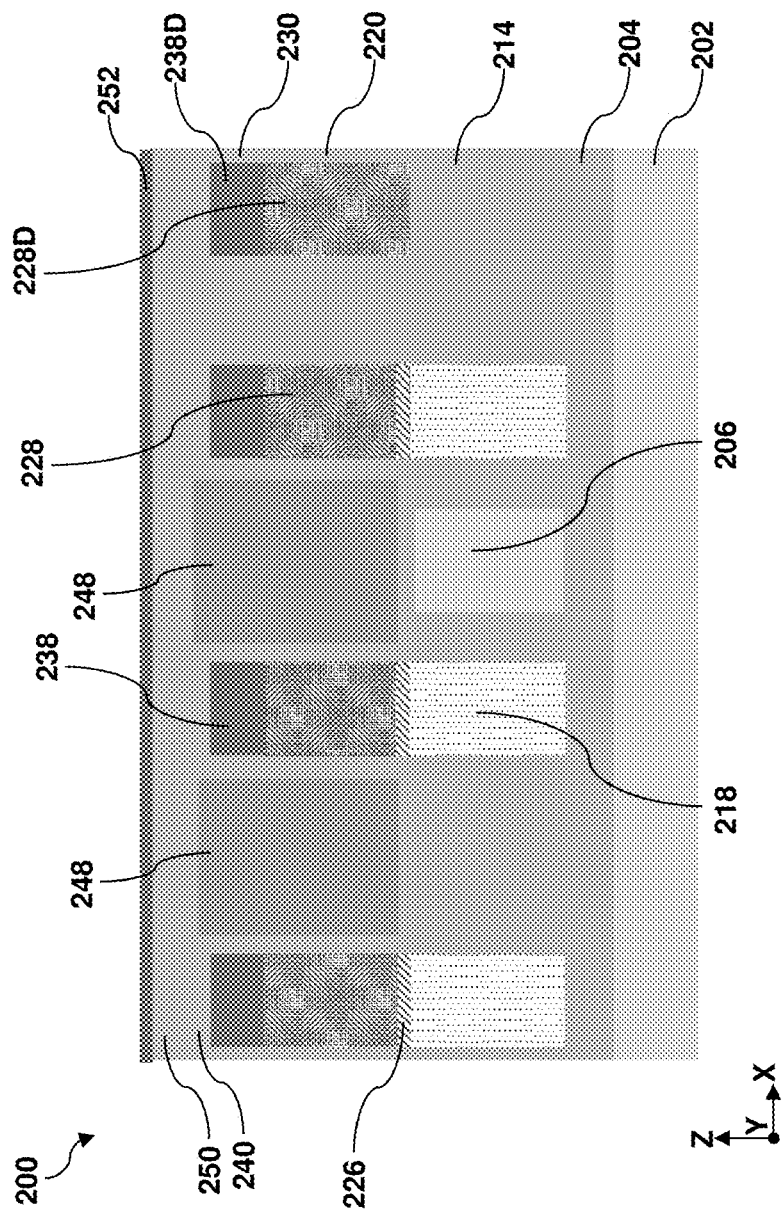
Figure 26:
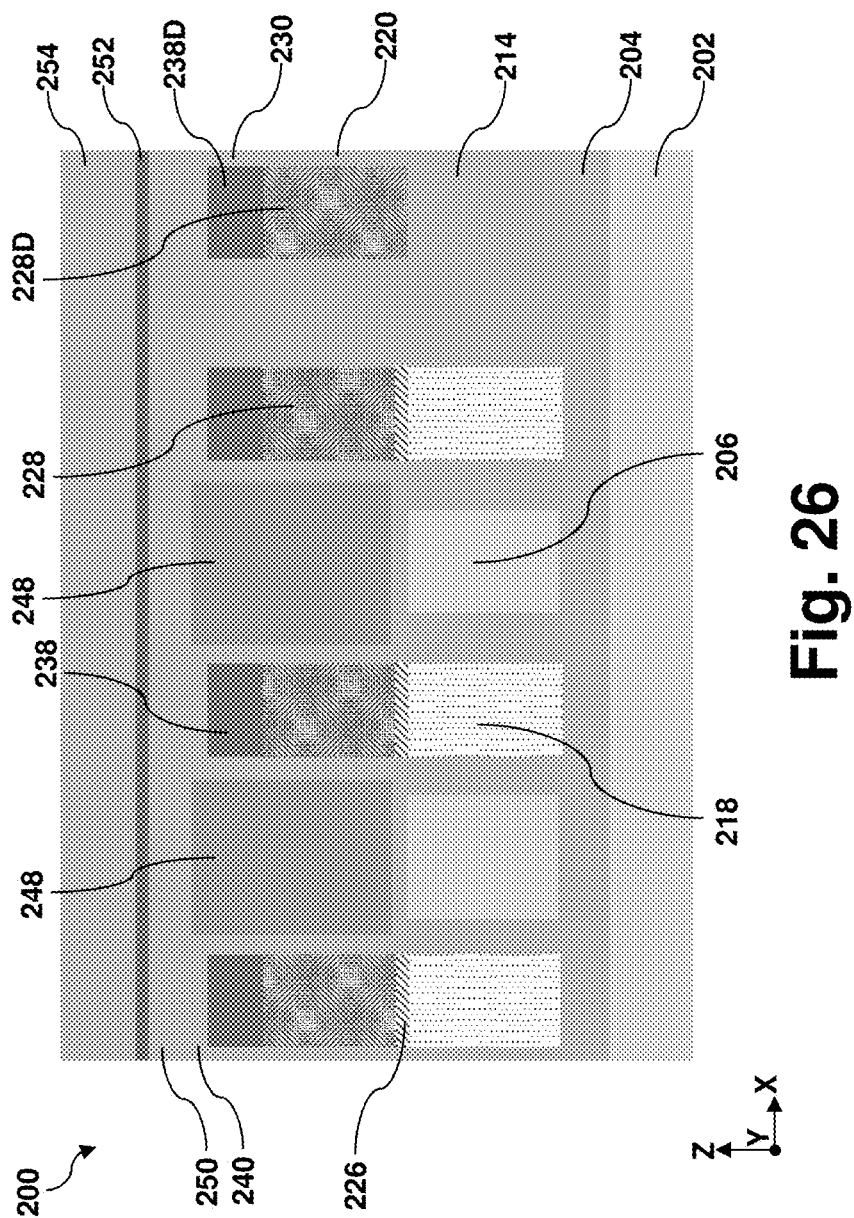

Referring to FIGS. 1 and 24-26, method 100 includes a block 120 where a third IMD layer 250, an etch stop layer (ESL) 252, and a fourth IMD layer 254 are deposited over the workpiece 200. Operations at block 120 include deposition of the third IMD layer 250 (shown in FIG. 24), deposition of the ESL 252 over the third IMD layer 250 (shown in FIG. 25), and deposition of the fourth IMD layer 254 over the ESL 252 (shown in FIG. 26). Referring to FIG. 24, the third IMD layer 250 is deposited over the workpiece 200, including over the second waveguide features 248 and the second IMD layer 240. As the deposition and composition of the third IMD layer 250 are similar to those of the first IMD layer 230, detailed description of the third IMD layer 250 is omitted for brevity. Then, as shown in FIG. 25, the ESL 252 is deposited over the third IMD layer 250. The ESL 252 may include silicon nitride, silicon oxynitride, and/or other suitable dielectric material and may be formed by CVD, ALD, PECVD, or other suitable deposition techniques. Referring to FIG. 26, the fourth IMD layer 254 is then deposited over the ESL 252. As the deposition and composition of the fourth IMD layer 254 are similar to those of the first IMD layer 230, detailed description of the fourth IMD layer 254 is omitted for brevity.

Referring to FIGS. 1 and 27-34, method 100 includes a block 122 where upper metal features 263 and via features 264 are formed over the lower metal features 238. Operations at block 122 include formation of a fifth patterned hard mask 256 (shown in FIG. 27), etching through the fifth patterned hard mask 256 to expose the lower metal features 238 (shown FIG. 28), removal of the fifth patterned hard mask 256 (shown in FIG. 29), deposition of a sixth hard mask layer 260 (shown in FIG. 30), patterning the sixth hard mask layer 260 to form the sixth patterned hard mask 260

Figure 33:
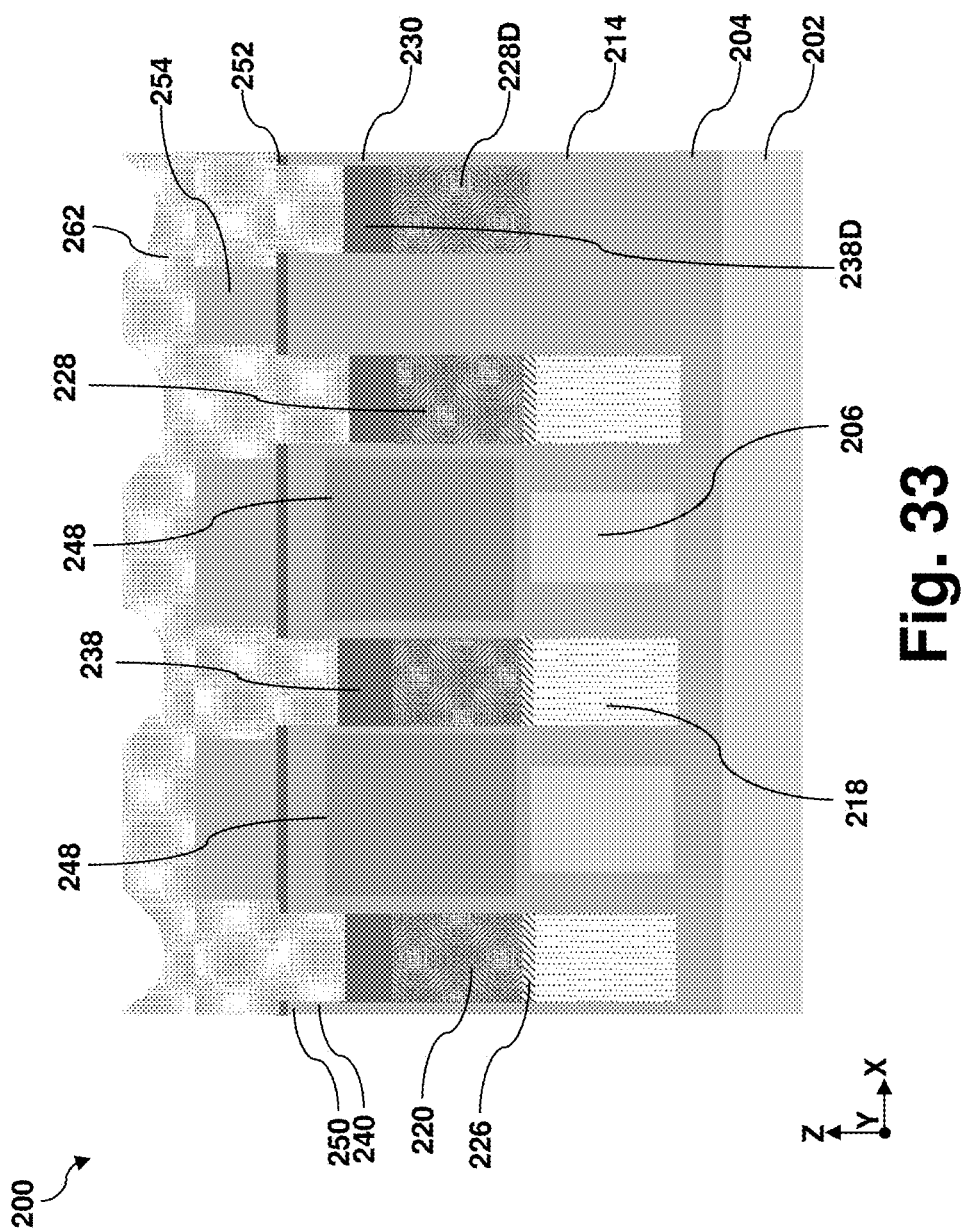
Figure 34:
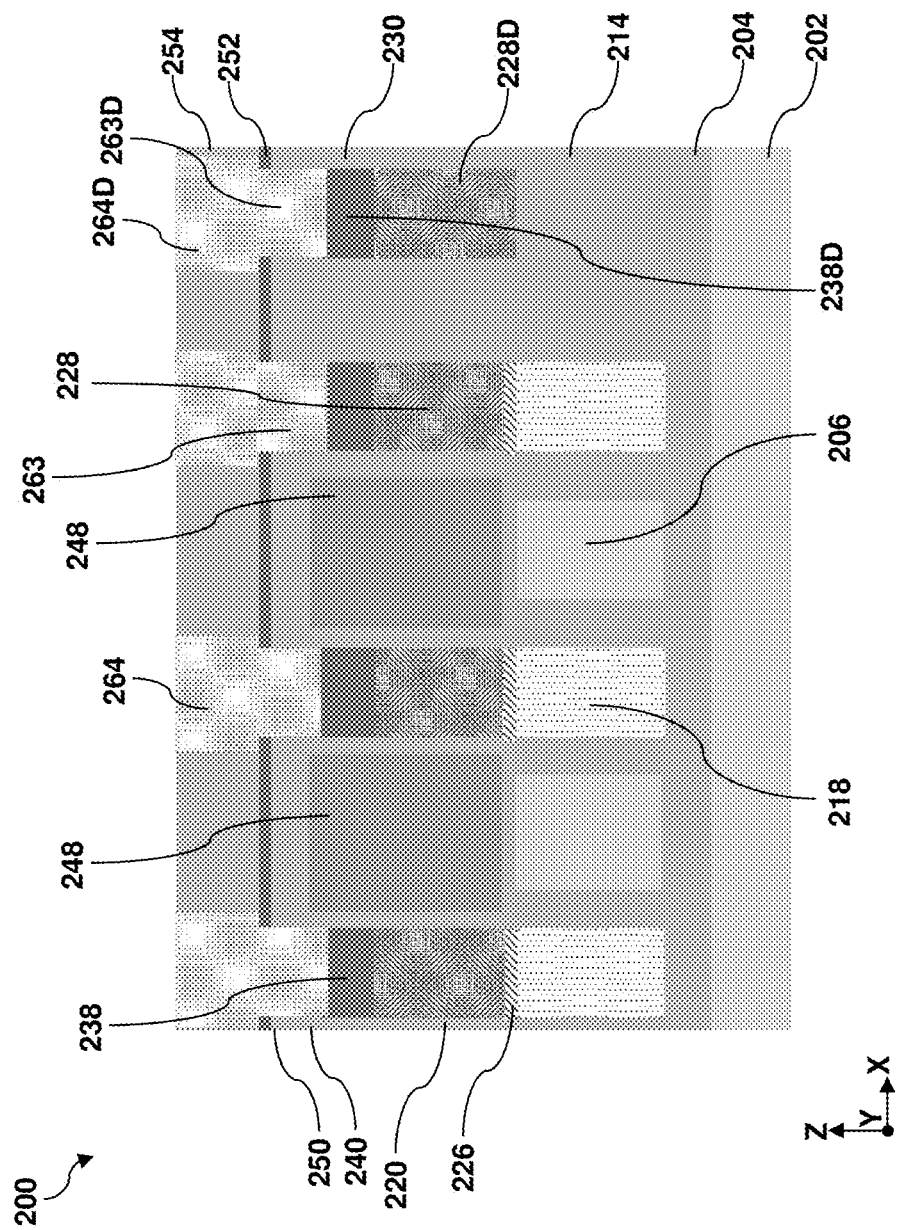

(shown in FIG. 31), etching the fourth IMD layer 254 (shown in FIG. 32), depositing a metal fill layer 262 (shown in FIG. 33), and planarization of the workpiece 200 to form upper metal features 263 and via features 264 (shown in FIG. 34).

Figure 27:
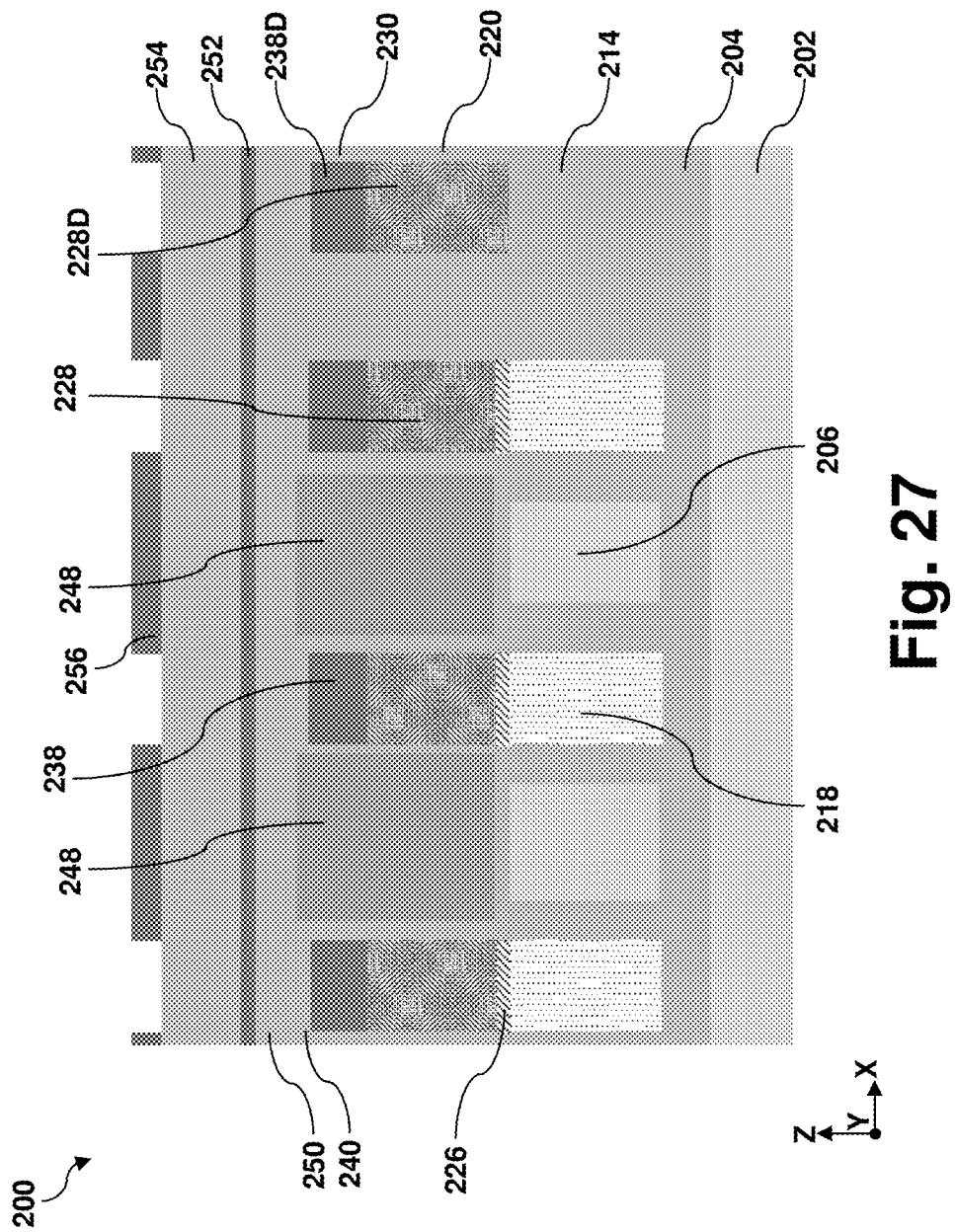
Figure 28:
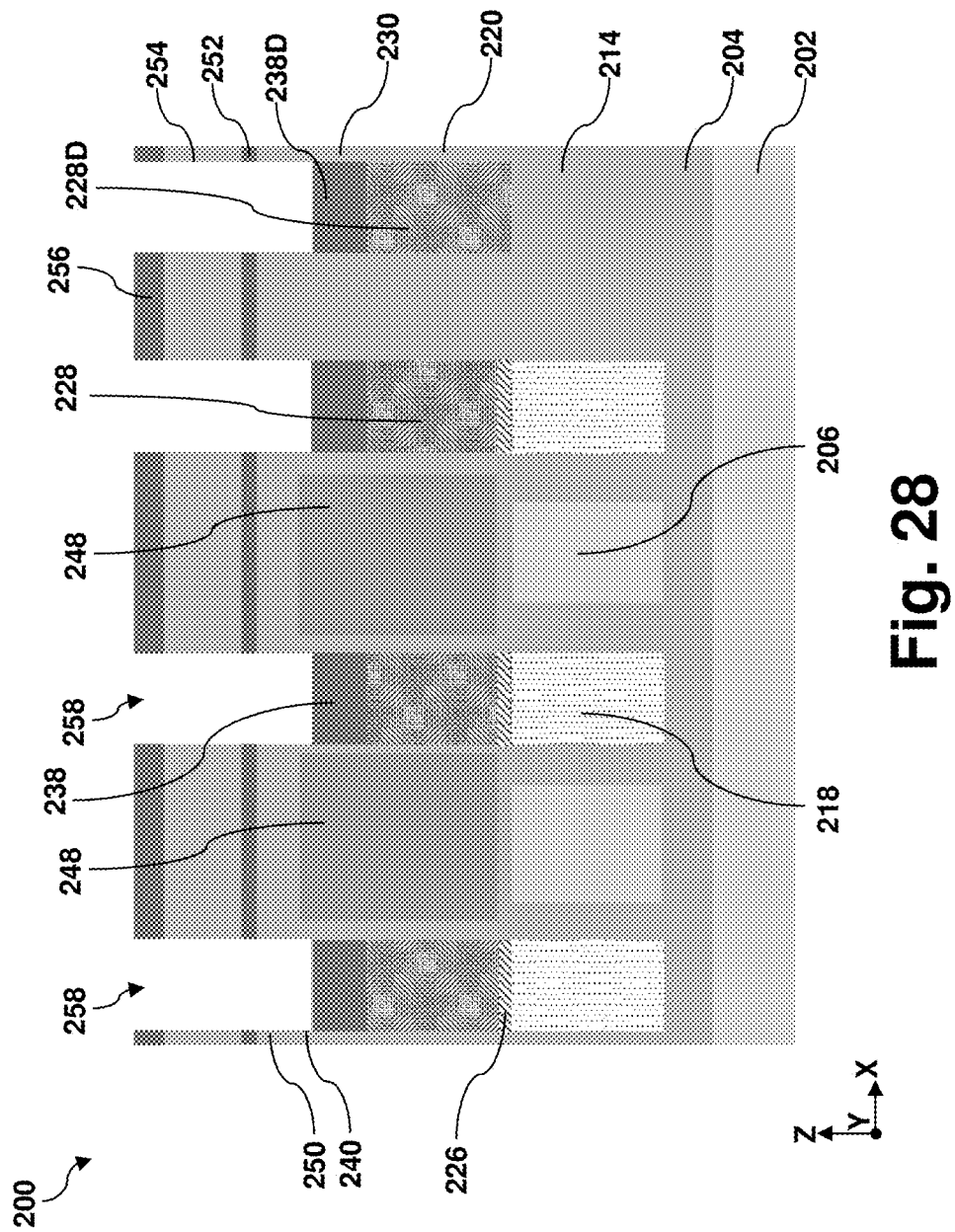
Figure 29:
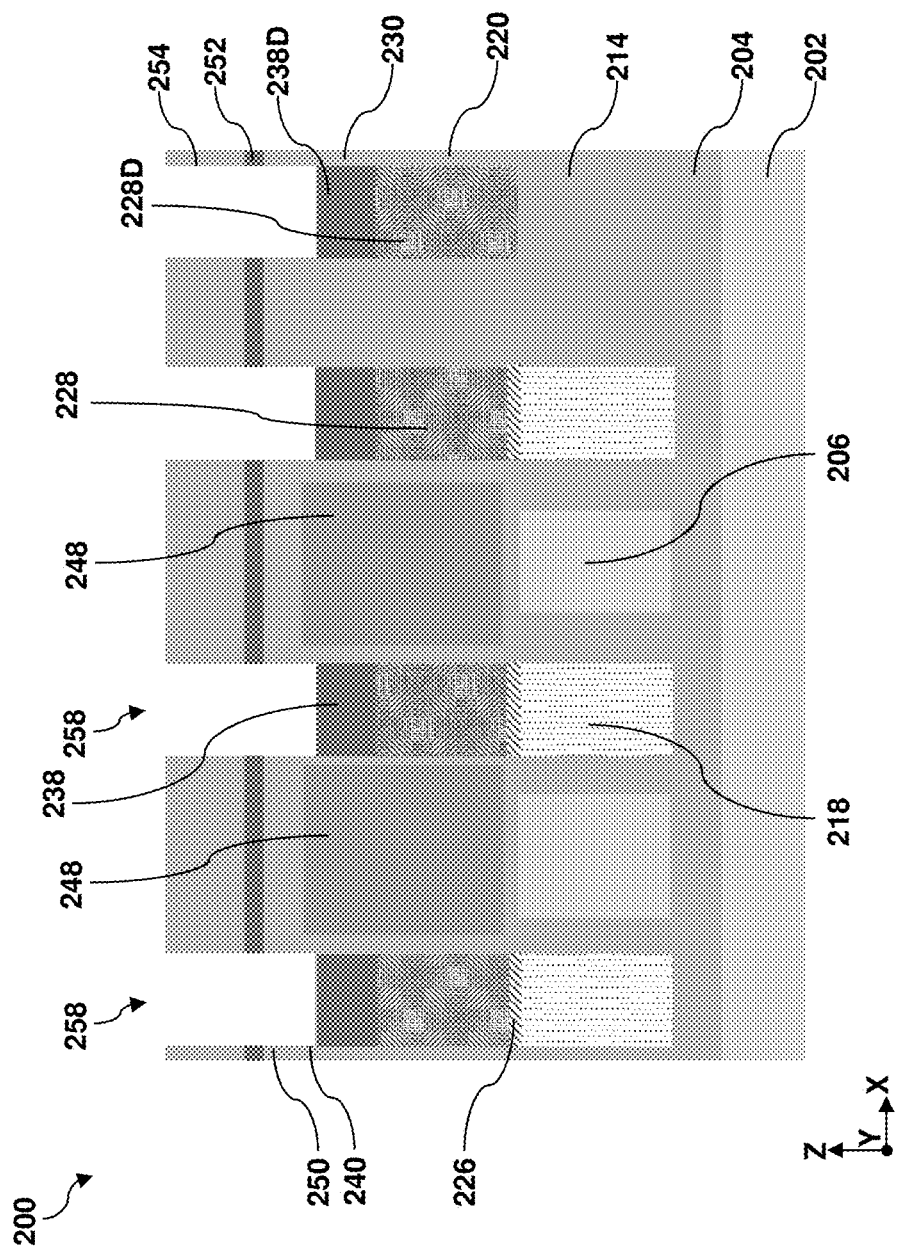
Figure 30:
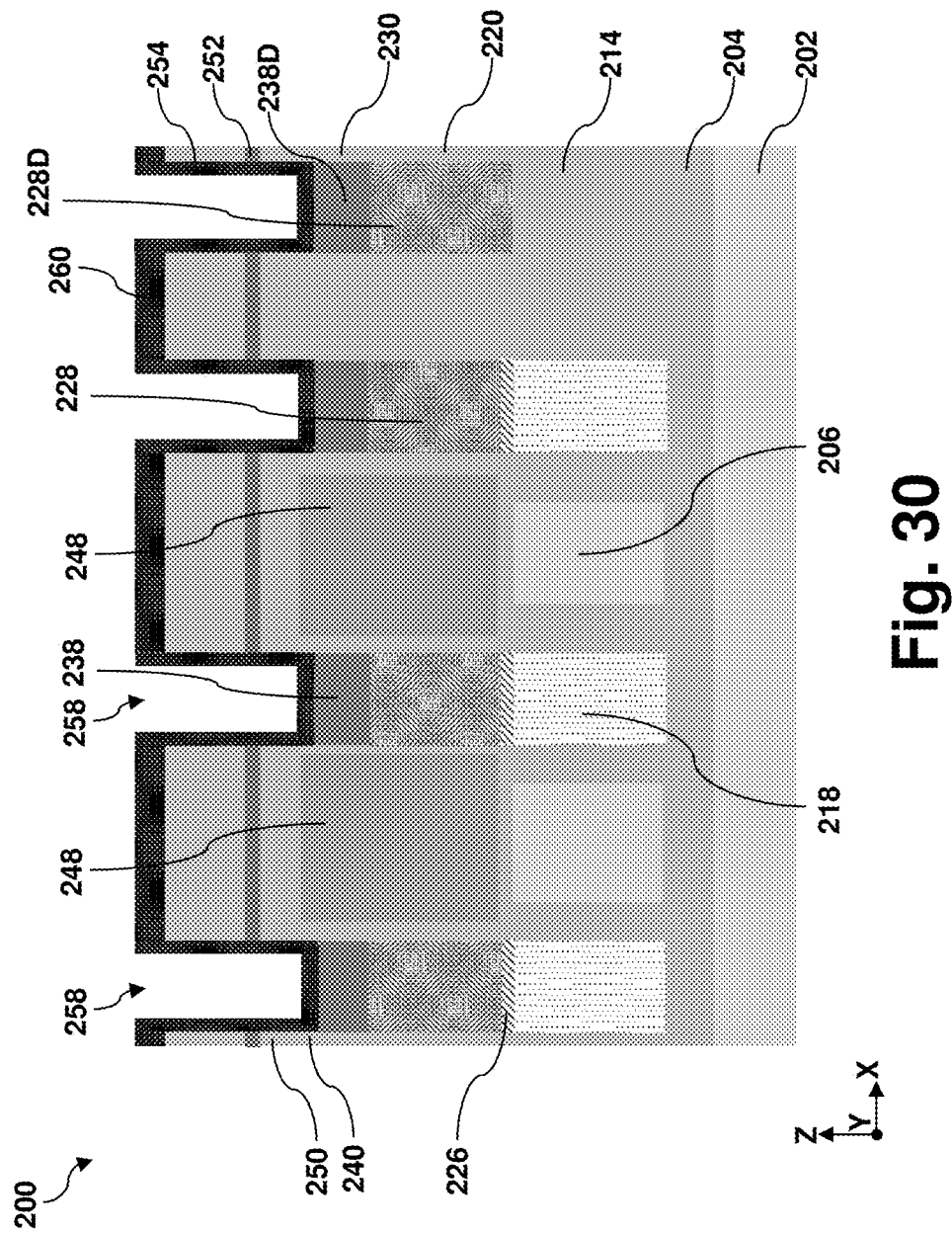
Figure 31:
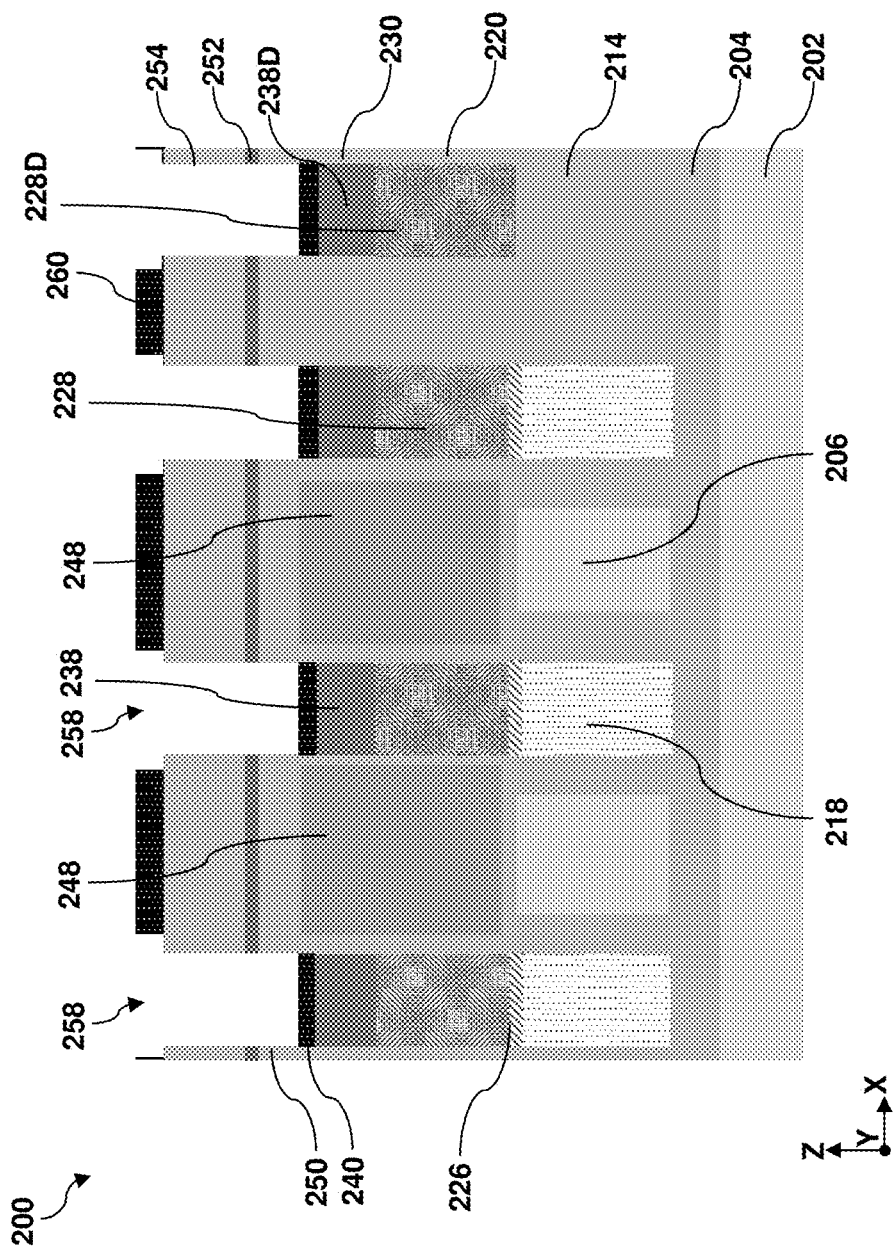

Referring to FIG. 27, the fifth patterned hard mask 256 is deposited over the fourth IMD layer 254. The formation and composition of the fifth patterned hard mask 256 may be similar to those of the first patterned hard mask 208. Detailed description of the fifth patterned hard mask 256 is therefore omitted for brevity. The fifth patterned hard mask 256 covers areas over the second waveguide features 248 but exposes areas over the lower metal features 238. With the fifth patterned hard mask 256 serving as the etch mask, the fourth IMD layer 254, the ESL 252, and the third IMD layer 250, and the second IMD layer 240 are etched using a dry etch process to expose the lower metal features 238 in openings 258, as shown in FIG. 28. Referring to FIG. 29, the fifth patterned hard mask 256 is removed by a dry etch process that etches the lower metal features 238 at a slower rate than it does the fifth patterned hard mask 256. Reference is then made to FIG. 30, which illustrates that the sixth hard mask 260 is conformally deposited over the workpiece 200, including over the openings 258. Then, as shown in FIG. 31, the sixth hard mask 260 is patterned to form sixth patterned hard mask 260. The formation and composition of the sixth patterned hard mask 260 may be similar to those of the first patterned hard mask 208. Detailed description of the sixth patterned hard mask 260 is therefore omitted for brevity. As shown in FIG. 31, the sixth patterned hard mask 260 includes upper portions on top surfaces of the fourth IMD layer 254 and lower portions on the lower metal features 238. Widths of the upper portions are smaller than widths of the top surfaces of the fourth IMD layer 254. That is, the upper portions are not coterminous with the top surfaces of the fourth IMD layer 254 and edge portions of the fourth IMD layer 254 are not covered by the sixth patterned hard mask 260.

Figure 32:
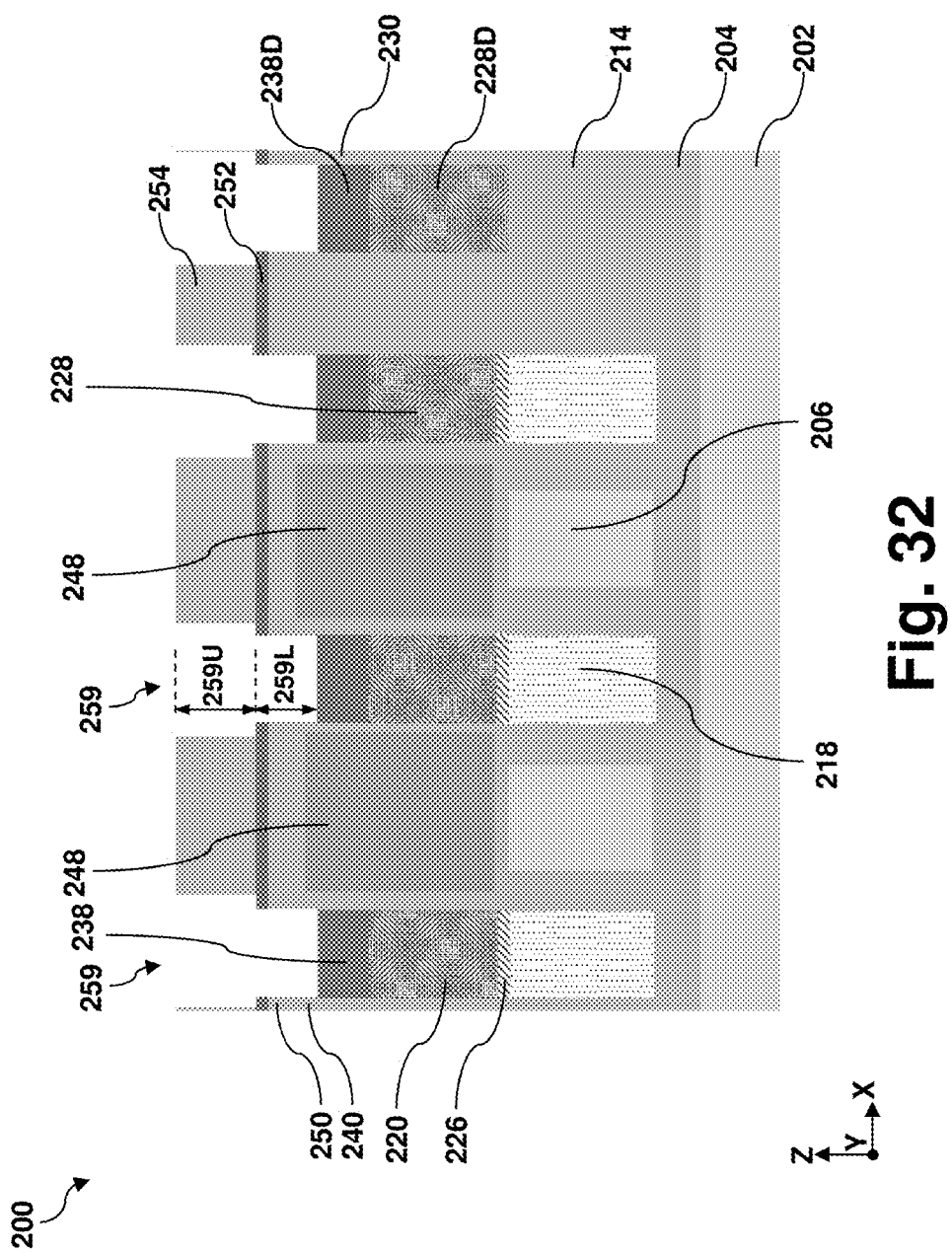

Referring to FIG. 32, with the sixth patterned hard mask 260 serving as an etch mask, the fourth IMD layer 254 is etched to trim the edge portions until the ESL 252 is exposed. As a result, along the X direction, a width of the fourth IMD layer 254 is smaller than a width of the ESL 252. As shown in FIG. 32, at this point, hybrid contact openings 259 are formed through the fourth IMD layer 254, the ESL 252, the third IMD layer 250, and the second IMD layer 240. Each of the hybrid contact openings 259 includes a lower portion 259L and an upper portion 259U over the lower portion 259L. Because of the removal of the edge portions of the fourth IMD layer 254, the upper portion 259U is wider than the lower portion 259L along the X direction. Reference is made to FIG. 33. A metal fill layer 262 is deposited over the workpiece 200, including over the hybrid contact openings 259. The metal fill layer 262 may include titanium nitride (TiN), titanium (Ti), ruthenium (Ru), nickel (Ni), cobalt (Co), copper (Cu), molybdenum (Mo), tungsten (W), tantalum (Ta), or tantalum nitride (TaN) and may be deposited using PVD. Referring to FIG. 34, a planarization process is then performed to remove excess metal fill layer 262 over the fourth IMD layer 254 to form upper metal features 263 in the lower portions 259L and via features 264 in the upper portions 259U.

An upper metal feature 263 disposed over and coupled to a dummy lower metal feature 238D does not serve any circuit function and may be referred to as a dummy upper metal feature 263D. Similarly, a via feature 264 disposed over and coupled to a dummy upper metal feature 263D does not serve any circuit function and may be referred to as a dummy via feature 264D. The upper metal features 263 and dummy upper metal features 263D are situated in a third interconnect layer over the second interconnect layer where the lower metal features 238 are situated. The via features 264 and dummy via features 264D are situated in a fourth interconnect layer over the third interconnect layer where the upper metal features 263 are situated. The dummy via features 264D are either inserted into isolated areas (where there are less via features) to reduce process loading effect or are inserted as isolation structures. The dummy via features 264D do not perform any circuit functions and may be electrically floating.

Figure 35:
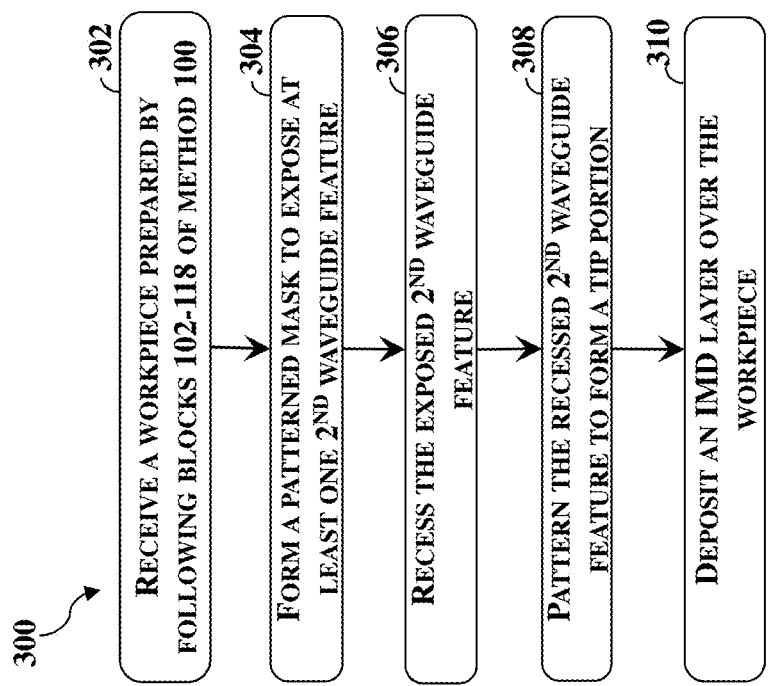
FIG. 35 illustrates a flow chart of a method for forming a tip portion of a waveguide feature, according to one or more aspects of the present disclosure.

In some embodiments, second waveguide features 248 may be patterned using the method 300 in FIG. 35 to form tip portions. Such tip portions allow the second waveguide features 248 to efficiently coupled to the firm waveguide feature. Embodiments of method 300 are described below in conjunction with FIGS. 37-44.

Figure 36:
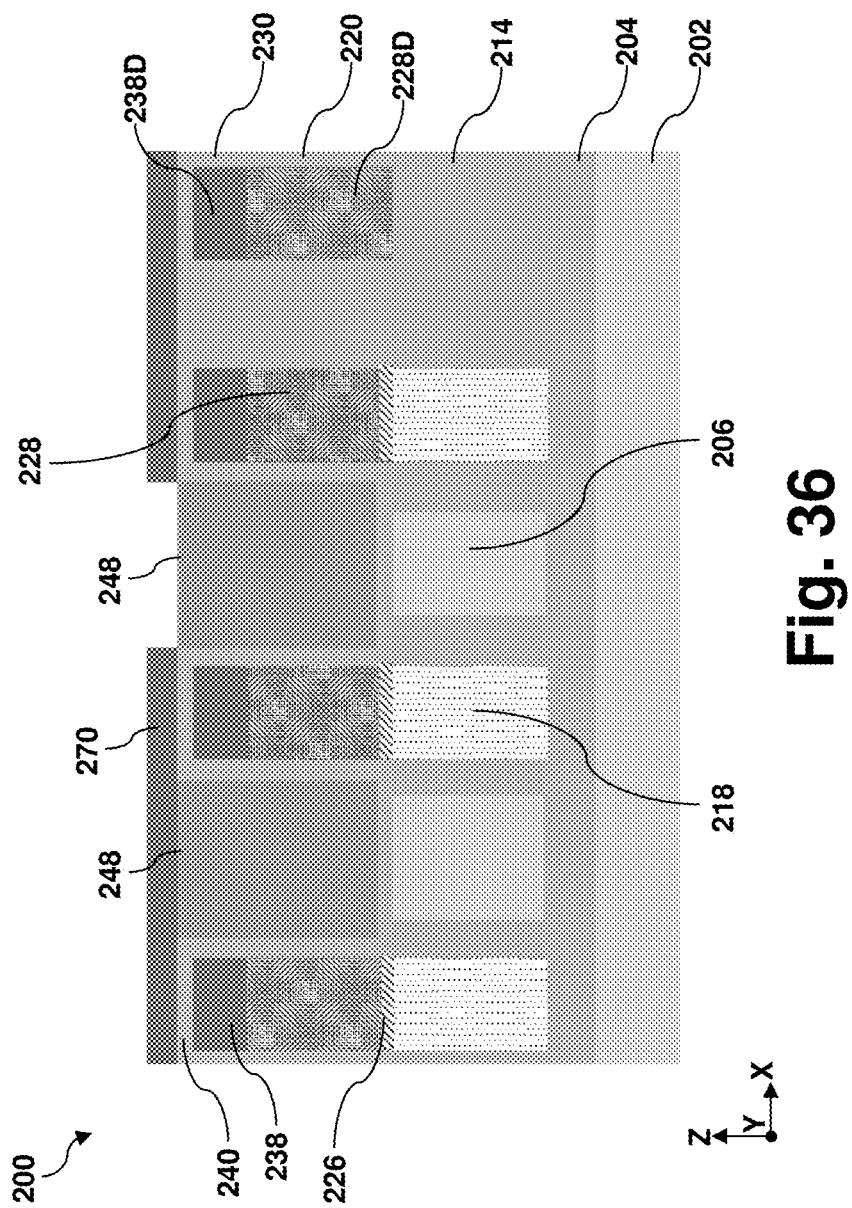
FIGS. 36-43 illustrate fragmentary cross-sectional views of a workpiece during a fabrication process according to the method of FIG. 35, according to one or more aspects of the present disclosure.

Referring to FIGS. 35 and 36, method 300 includes a block 302 where a workpiece 200 prepared by following blocks 102-118 of method 100 is received. At block 302, method 300 may begin with a workpiece 200 that has gone through operations in blocks 102-118. As shown the FIG. 36, the workpiece 200 received at block 302 includes the substrate 202, the BOX layer 204, doped silicon features 218 disposed on the BOX layer 204, and first waveguide features 206 on the BOX layer 204. The workpiece 200 includes contact features 228 coupled to the doped silicon features 218 by way of the silicide layer 226. Lower metal features 238, which are disposed in the first IMD layer 230 and the second IMD layer 240, are formed on the contact features 228. Second waveguide features 248 are disposed between two adjacent contact features 228 as well as between two adjacent lower metal features 238. Each of the second waveguide features 248 is spaced apart from adjacent contact features 228 by the ILD layer 220 and is spaced part from adjacent lower metal features 238 by the first IMD layer 230.

Referring to FIGS. 35 and 36, method 300 includes a block 304 where a seventh patterned hard mask 270 is formed to expose a second waveguide feature 248. Like the first patterned hard mask 208, the seventh patterned hard mask 270 may be a single layer or a multi-layer and may include silicon oxide, silicon nitride, or a combination thereof. In an example process, a hard mask layer is blanketly deposited on the second IMD layer 240 and the second waveguide features 248 and is then patterned using photolithography and etch processes to form the seventh patterned hard mask 270. As shown in FIG. 36, the seventh patterned hard mask 270 exposes at least one of the second waveguide features 248 and covers the rest of the workpiece 200.

Figure 37:
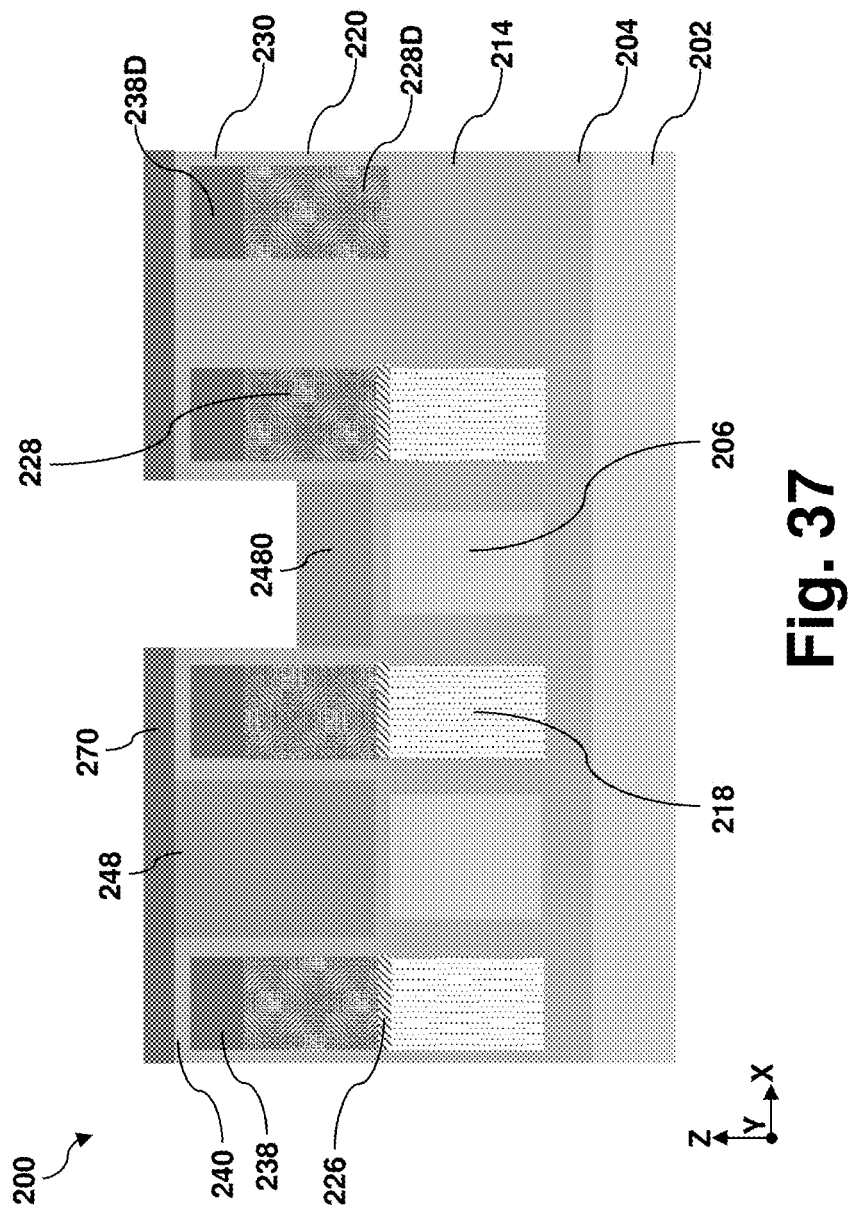
Figure 38:
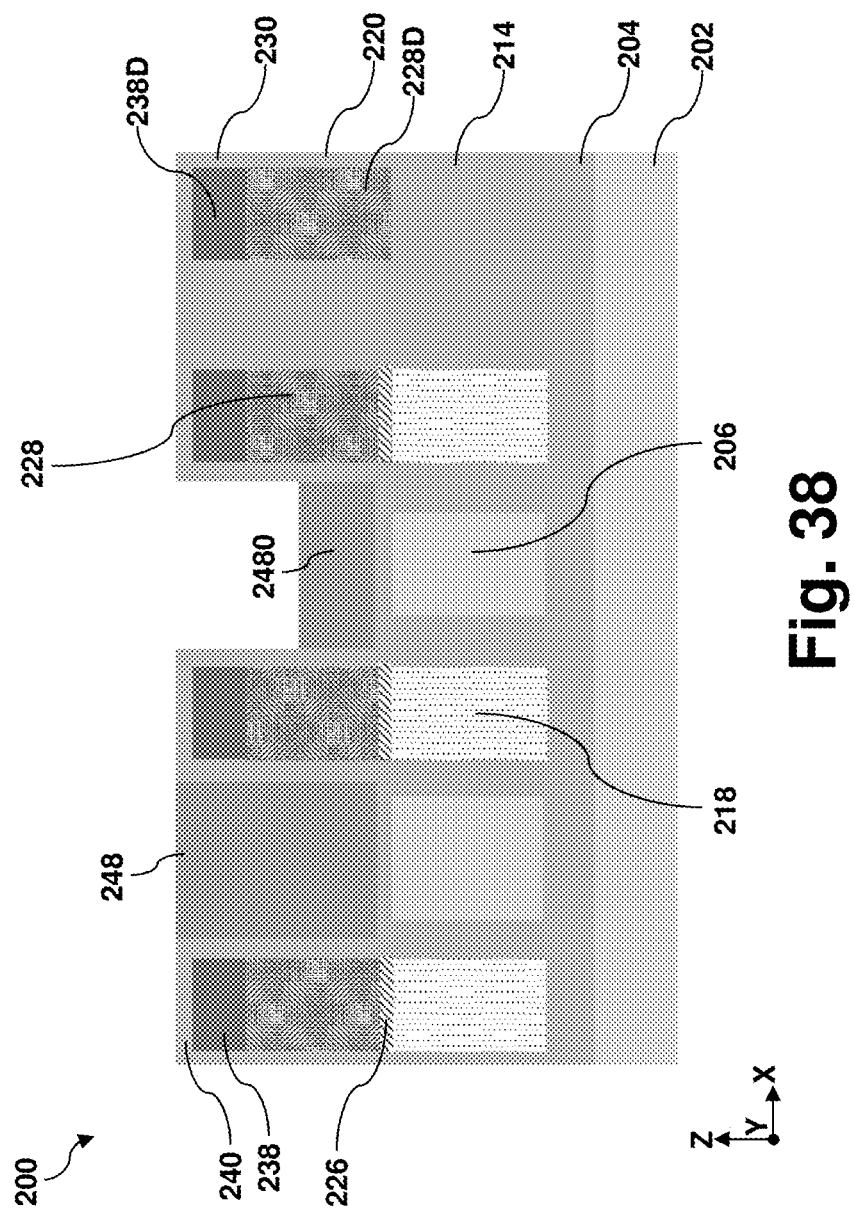

Referring to FIGS. 35, 37 and 38, method 300 includes a block 306 where the exposed second waveguide feature 2480 is recessed. With the seventh patterned hard mask 270 serving as an etch mask, the at least one of the second waveguide features 2480 exposed in the seventh patterned hard mask 270 is recessed, as shown in FIG. 37. In embodiments where the second waveguide features 2480 are formed of silicon nitride, the recess at block 306 may be selective to silicon nitride. The recess at block 306 may reduce the thickness of the second waveguide feature 2480 to between about 100 nm and about 300 nm, thereby forming the recessed second waveguide feature 2480. As shown in FIG. 38, after the formation of the recessed second waveguide feature 2480, the seventh patterned hard mask 270 is removed by etching.

Figure 39:
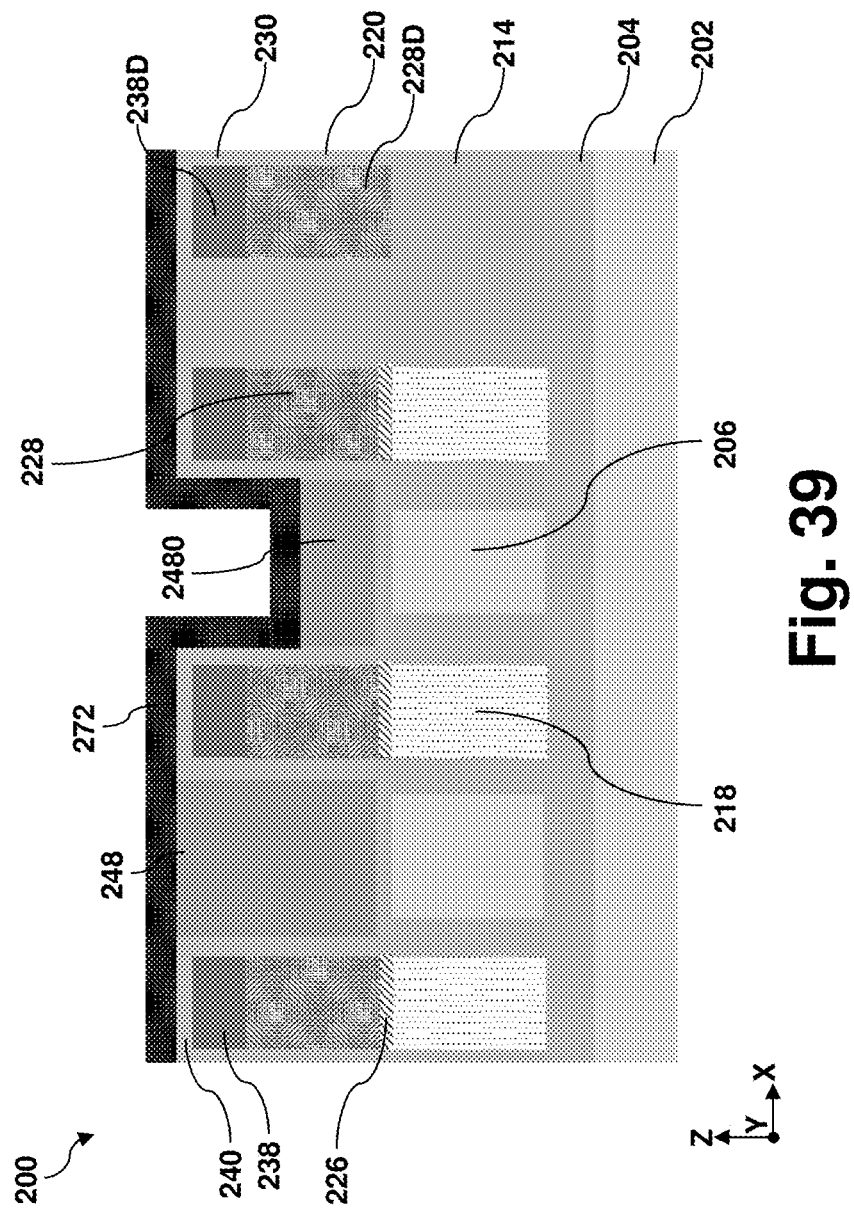
Figure 40:
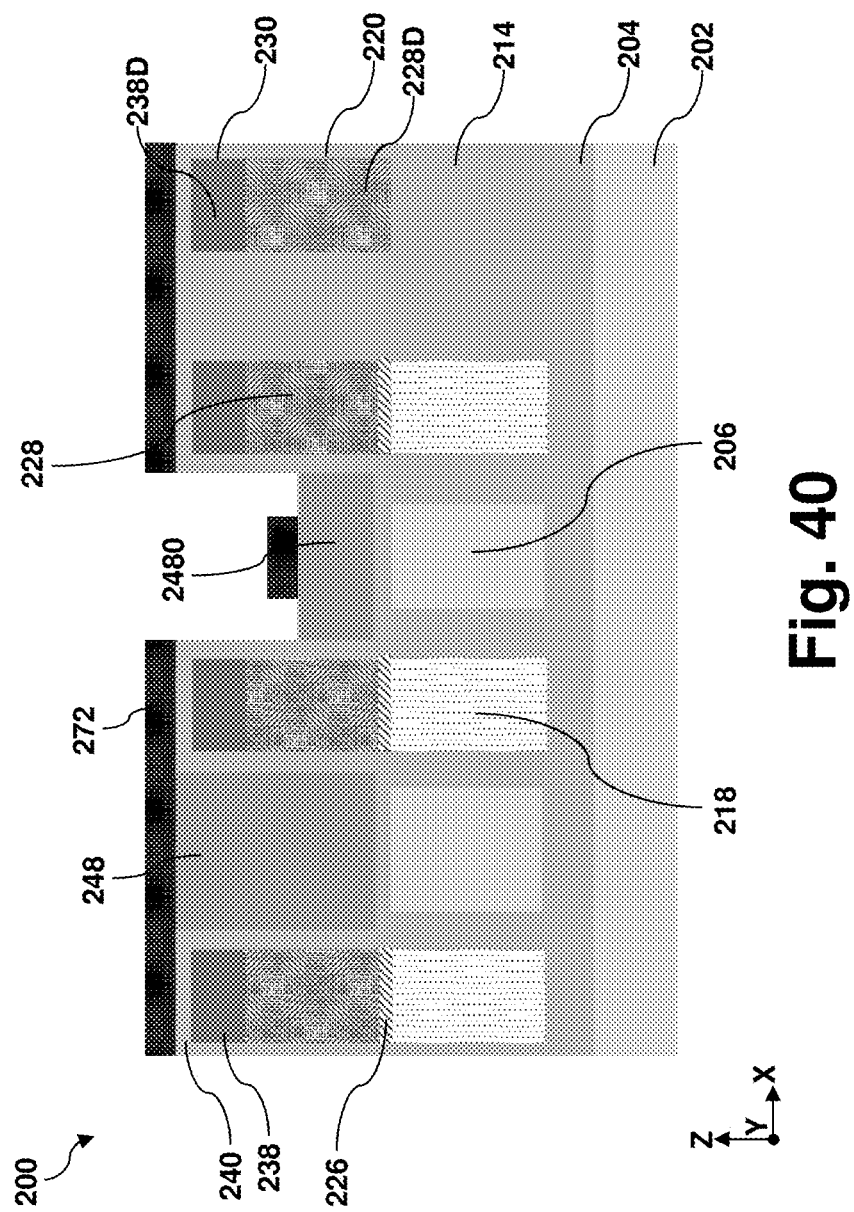
Figure 41:
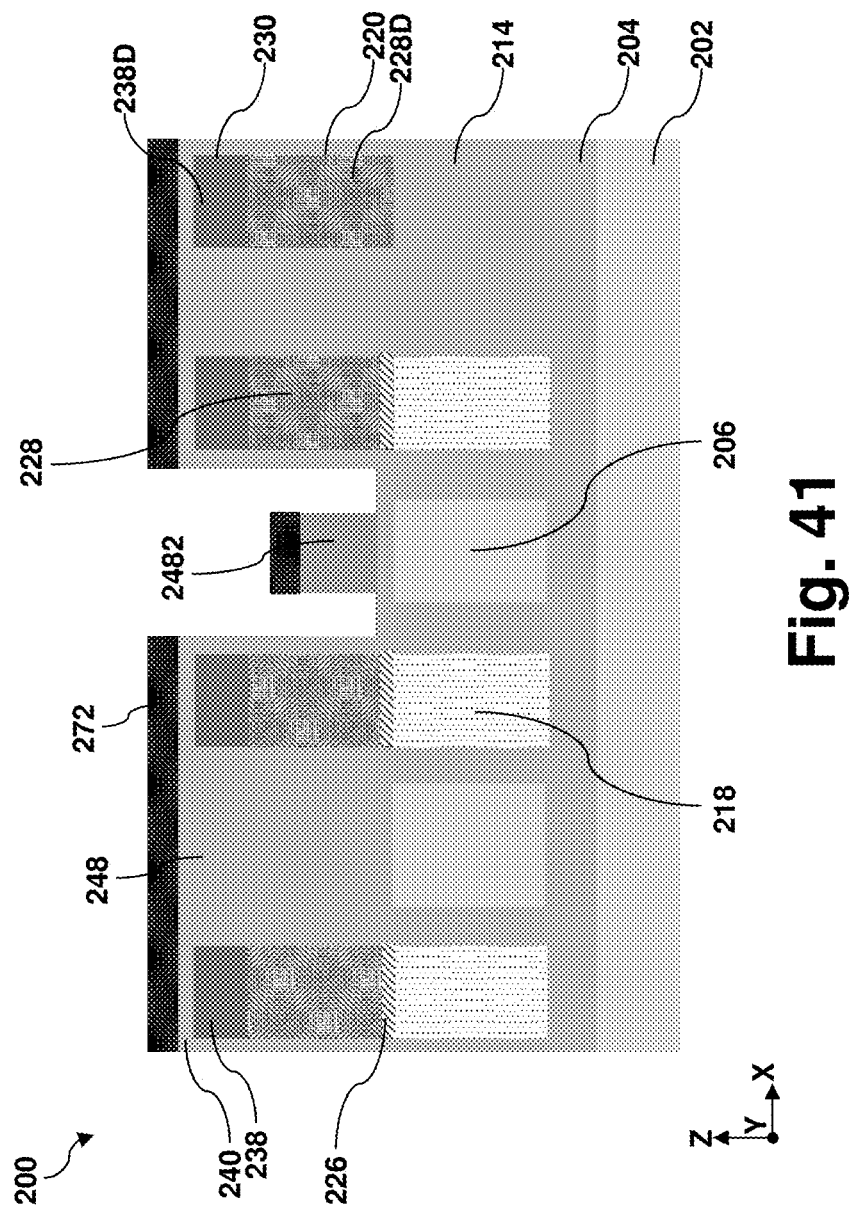
Figure 42:
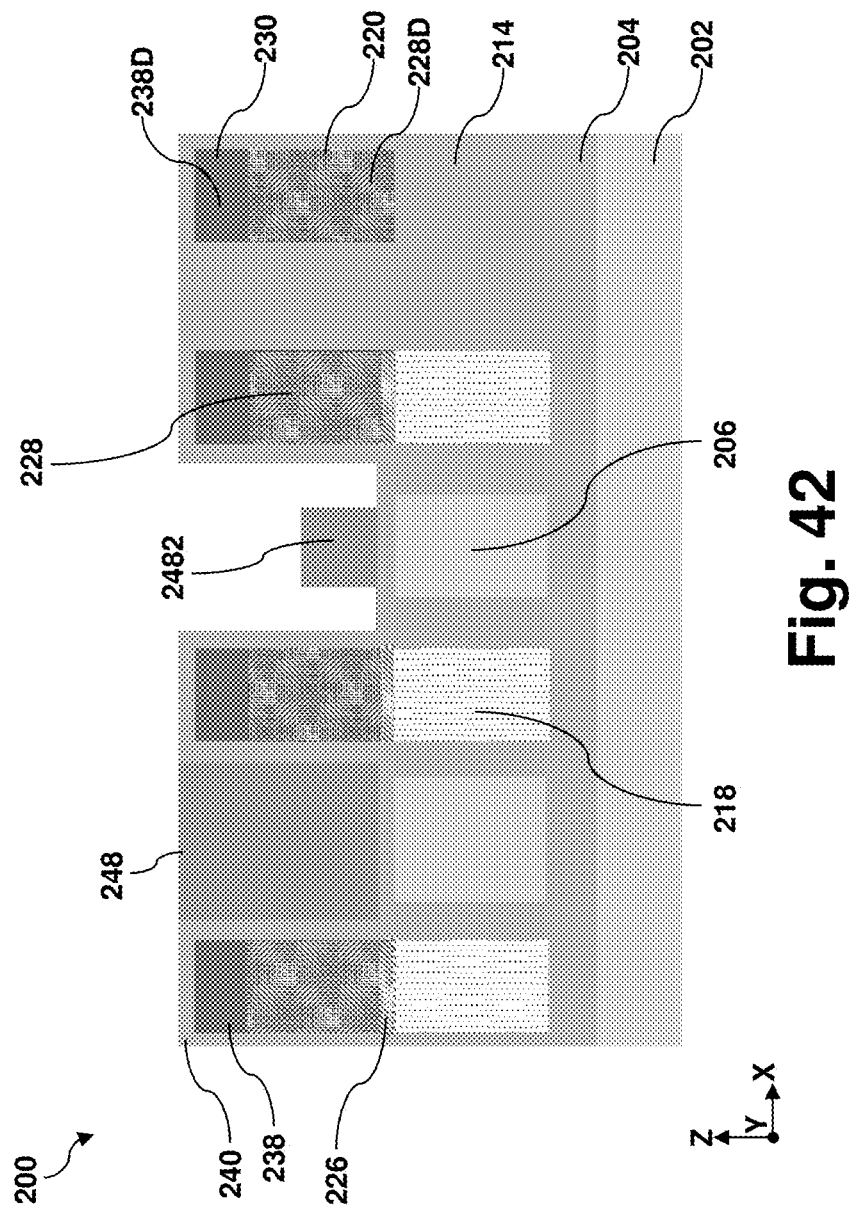

Referring to FIGS. 35 and 39-42, method 300 includes a block 308 where the recessed second waveguide feature 2480 is patterned to form a tip portion 2482. Operations at block 308 include formation of an eighth patterned hard mask 272 (shown in FIGS. 39 and 40), etching of the recessed second waveguide feature 2480 to form a tip portion (shown in FIGS. 41 and 42). Referring to FIG. 39, an eighth hard mask layer 272 is conformally deposited over the workpiece 200, including over the second IMD layer 240 and the recessed second waveguide feature 2480. The eighth hard mask layer 272 is then patterned to form the eighth patterned hard mask 272, as shown in FIG. 40. The formation and composition of the eighth patterned hard mask 272 may be similar to those of the seventh patterned hard mask 270. Detailed description of the eighth patterned hard mask 272 is therefore omitted for brevity. Using the eighth patterned hard mask 272 as an etch mask, the recessed second waveguide feature 2480 is trimmed to form the tip portion 2482, as shown in FIG. 41. While the tip portion 2482 remains disposed over the underlying first waveguide feature 206, the tip portion 2482 is narrower than the second waveguide feature 2480 and is farther away from adjacent contact features 228. In FIG. 42, the eighth patterned hard mask 272 is removed by etching.

Figure 43:
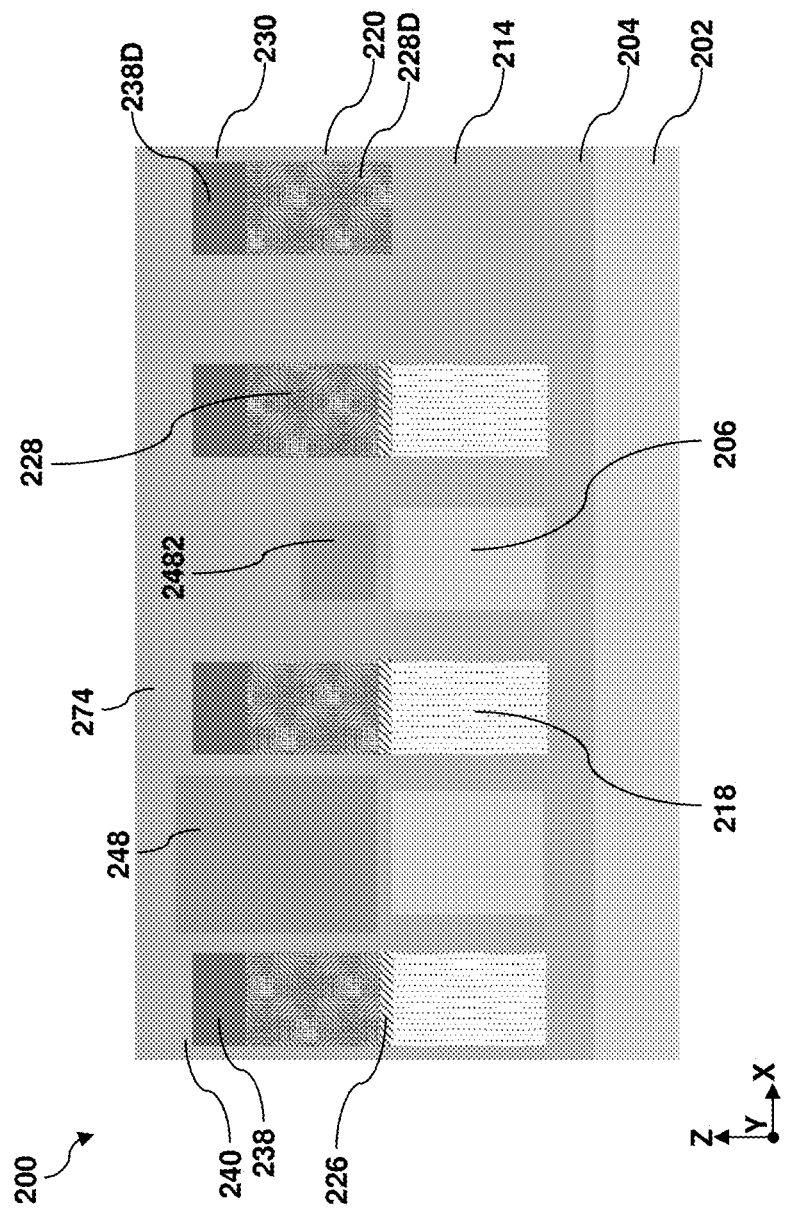

Referring to FIGS. 35 and 43, method 300 includes a block 310 where a fifth IMD layer 274 is deposited over the workpiece 200. As shown in FIG. 43, the fifth IMD layer 274 is deposited over the workpiece 200 to cover the tip portion 2482. The fifth IMD layer 274 may include silicon oxide or silicon-oxide-containing dielectric material. In some embodiments, the fifth IMD layer 274 may include tetraethylorthosilicate (TEOS) oxide, un-doped silicate glass, or doped silicon oxide such as borophosphosilicate glass (BPSG), fused silica glass (FSG), phosphosilicate glass (PSG), boron doped silicate glass (BSG), and/or other suitable dielectric materials and may be deposited using spin-on coating or flowable chemical vapor deposition (FCVD). In some other embodiments, the fifth IMD layer 274 may include silicon oxide and may be deposited using CVD, plasma-enhanced CVD (PECVD), or other suitable process.

Figure 44:
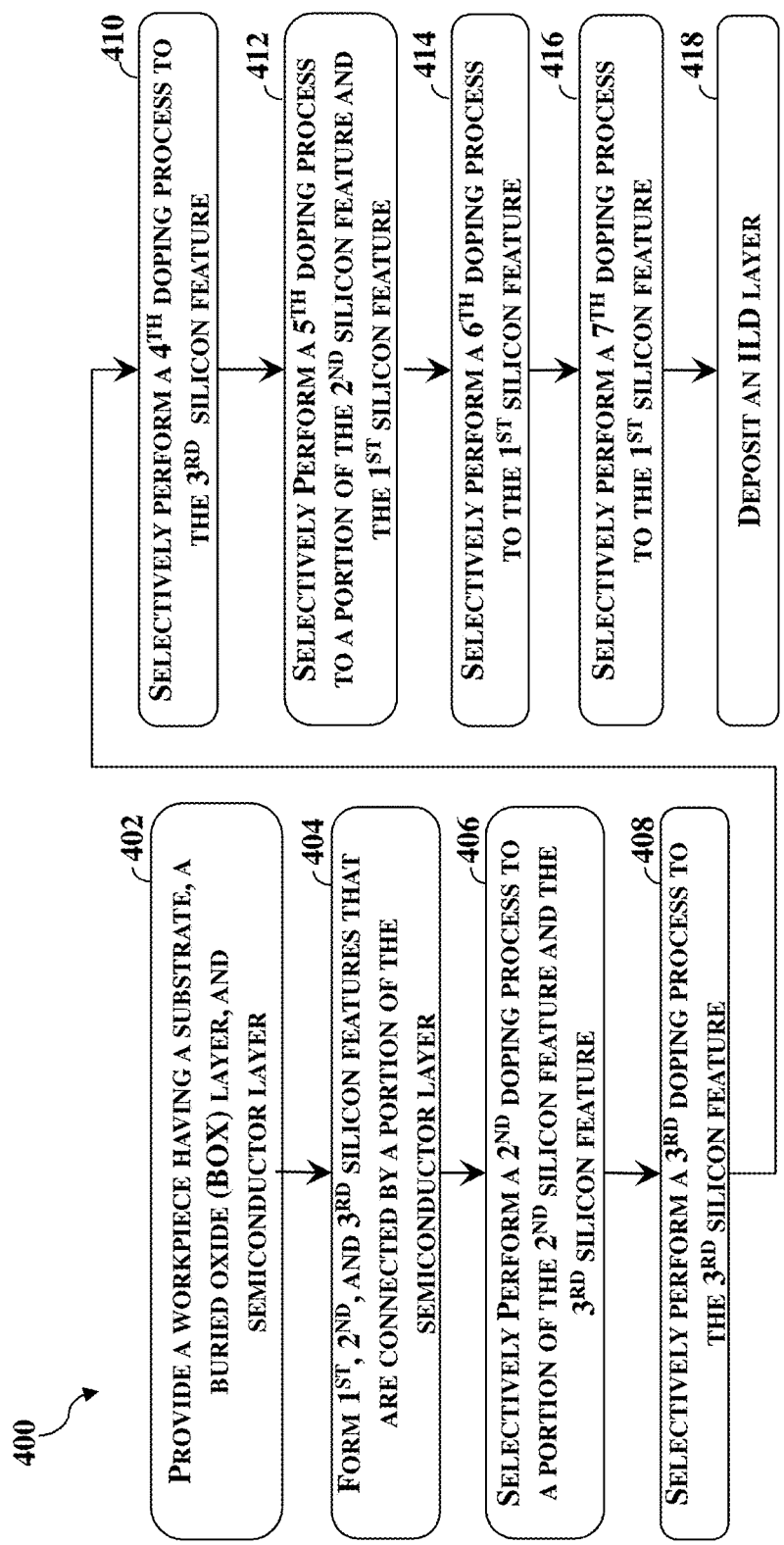
FIG. 44 illustrates a flow chart of a method for forming active waveguide features, according to one or more aspects of the present disclosure.

In some embodiments, the first waveguide feature 206 may be coupled to an active device using the method 400 in FIG. 44. Embodiments of method 400 are described below in conjunction with FIGS. 45-65.

Figure 45:
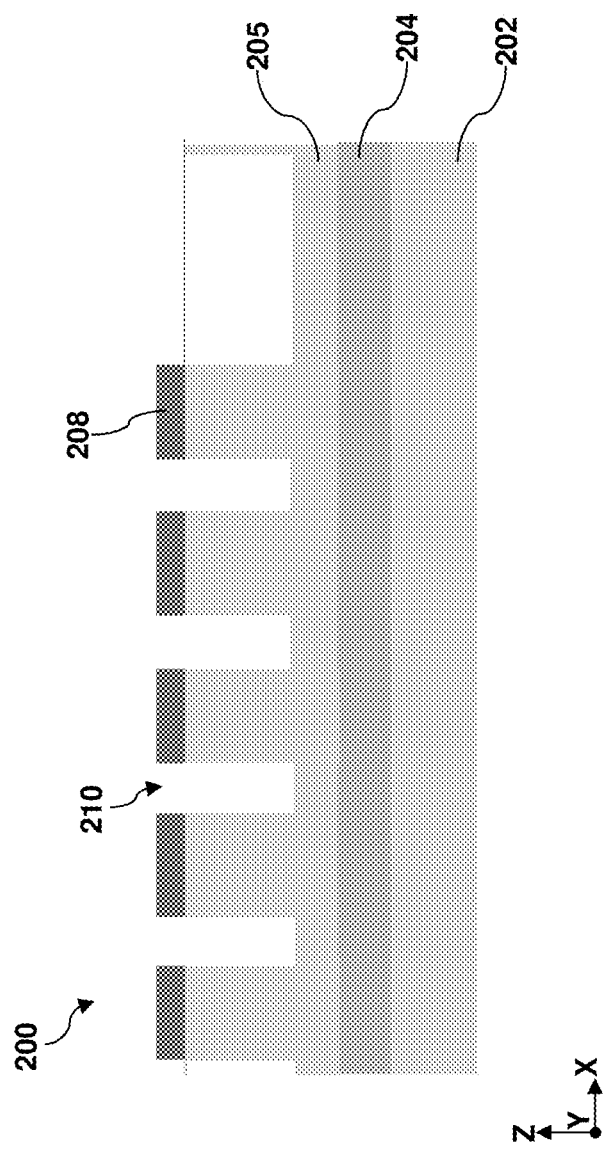
FIGS. 45-65 illustrate fragmentary cross-sectional views of a workpiece during a fabrication process according to the method of FIG. 44, according to one or more aspects of the present disclosure.

Referring to FIGS. 44 and 45, method 100 includes a block 402 where a workpiece 200 is provided. Similar to what is shown in FIG. 2, the workpiece 200 in FIG. 45 includes a substrate 202, a buried oxide (BOX) layer 204 on the substrate 202, and a semiconductor layer 205 on the buried oxide layer 204. In one embodiment, the substrate 202 may be a silicon (Si) substrate. In some other embodiments, the substrate 202 may include other semiconductors such as germanium (Ge), silicon germanium (SiGe), or a III-V semiconductor material. Example III-V semiconductor materials may include gallium arsenide (GaAs), indium phosphide (InP), gallium phosphide (GaP), gallium nitride (GaN), gallium arsenide phosphide (GaAsP), aluminum indium arsenide (AlInAs), aluminum gallium arsenide (AlGaAs), gallium indium phosphide (GaInP), and indium gallium arsenide (InGaAs). The BOX layer 204 may include silicon oxide and the semiconductor layer 205 may include silicon (Si). In some implementations where the substrate 202 and the semiconductor layer 205 are formed of silicon (Si) and the BOX layer 204 is formed of silicon oxide, the substrate 202, the BOX layer 204, and the semiconductor layer 205 may be portions of a silicon-on-insulator (SOI) substrate.

Figure 46:
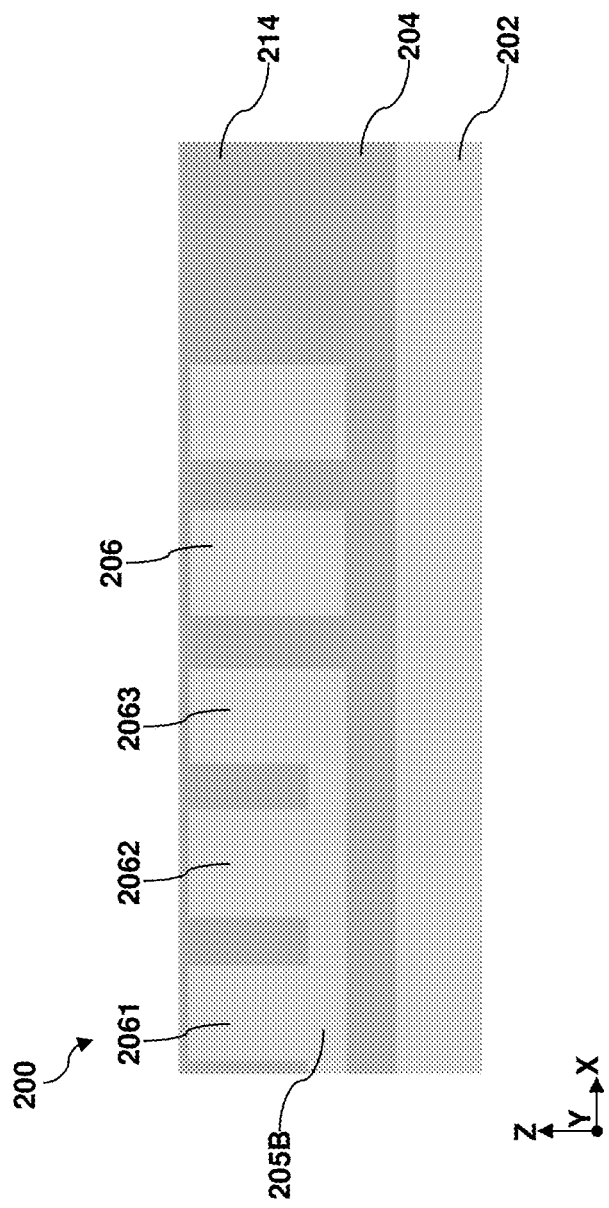

Referring to FIGS. 44 and 45-46, method 400 includes a block 404 where a first silicon feature 2061, a second silicon feature 2062, and a third silicon features 2063 are formed. Operations at block 404 include forming shallow trenches 210 that do not extend through the semiconductor layer 205 (shown in FIG. 45) and formation of the first silicon feature 2061, the second silicon feature 2062 and the third silicon feature 2063 (shown in FIG. 46). In some embodiments represented in FIG. 45, the formation of the shallow trenches 210 includes etching the semiconductor layer 205 through the first patterned hard mask 208 described above with respect to method 100. While a similar etch process is performed to etch the semiconductor layer 205 at block 404, the etch process lasts a shorter period of time such that the shallow trenches 210 does not extend through the semiconductor layer 205 to expose the BOX layer 204. While not explicitly shown in the figures, another patterned hard mask may be formed for further patterning the semiconductor layer 205 to form the first silicon feature 2061, the second silicon feature 2062, and the third silicon feature 2063 that are connected by the leftover base semiconductor layer 205B. In the depicted embodiment, the patterning at block 404 may also form one or more silicon features 206. The etch process at block 404 may include dry etching, reactive ion etching (RIE), and/or other suitable processes. As shown in FIG. 46, after the formation of the first silicon feature 2061, the second silicon feature 2062, and the third silicon feature 2063, the fill dielectric layer 214 is deposited over the workpiece 200 to form the shallow trenches 210 and trenches 212 (not shown in FIG. 45, but shown in FIG. 4). The fill dielectric layer 214 may be planarized to provide a planar top surface.

Figure 47:
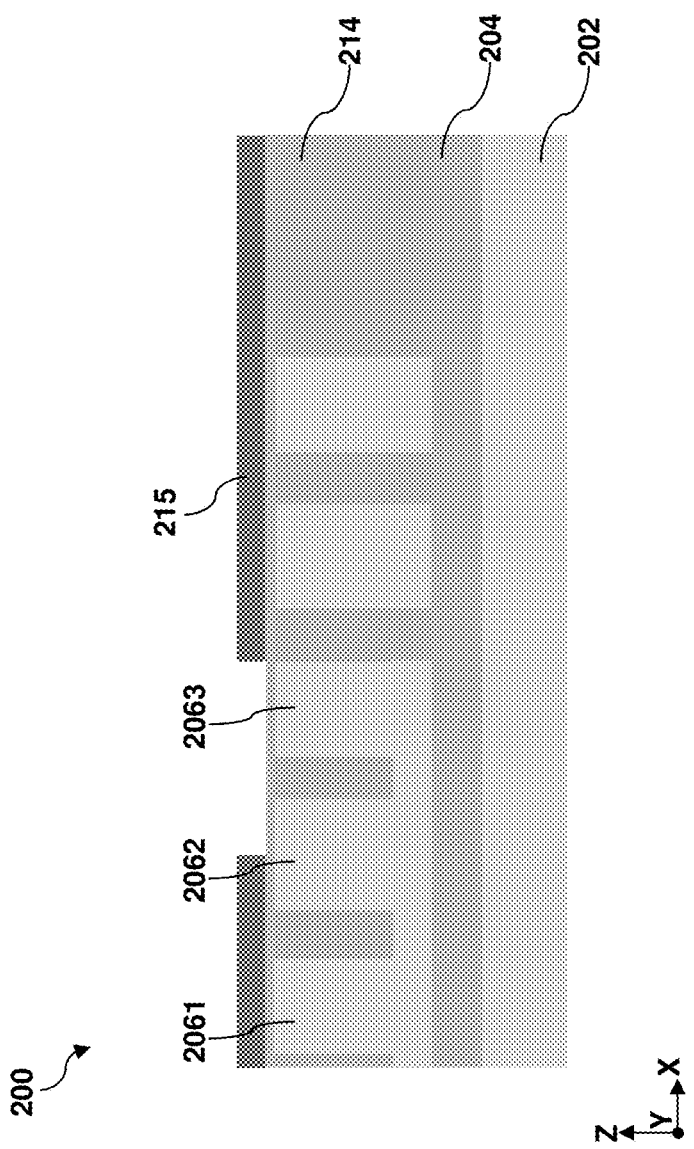
Figure 48:
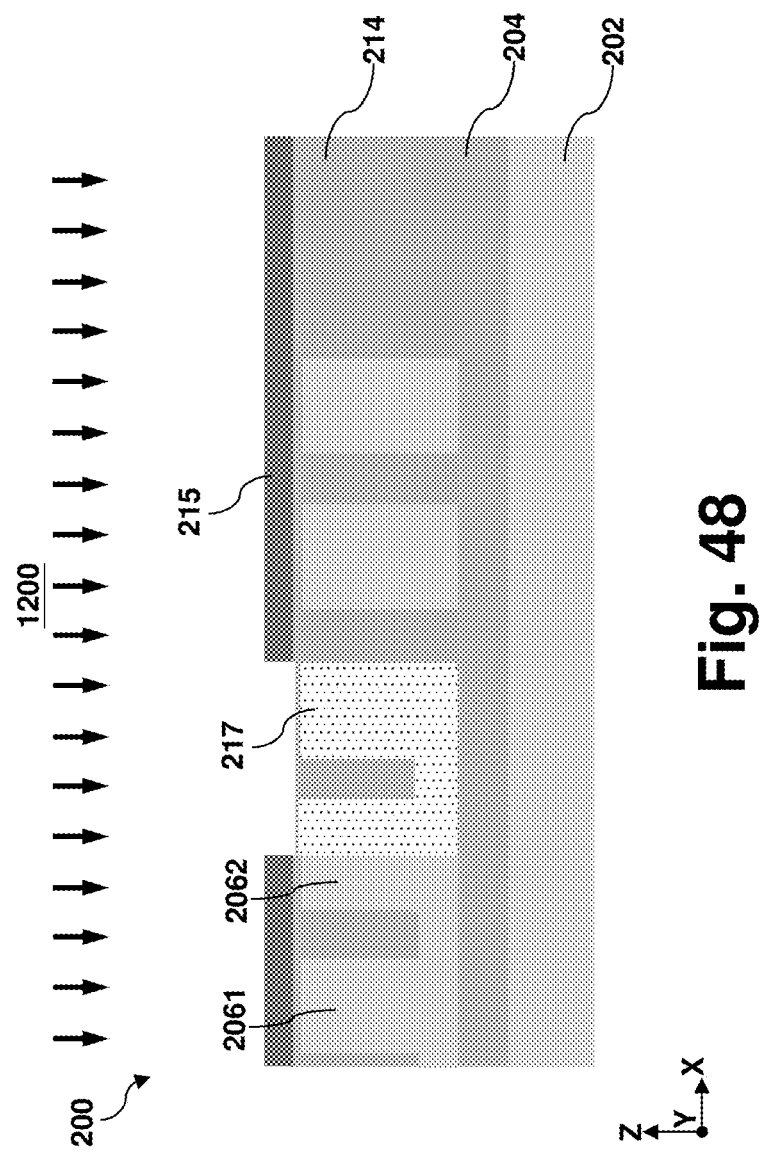
Figure 49:
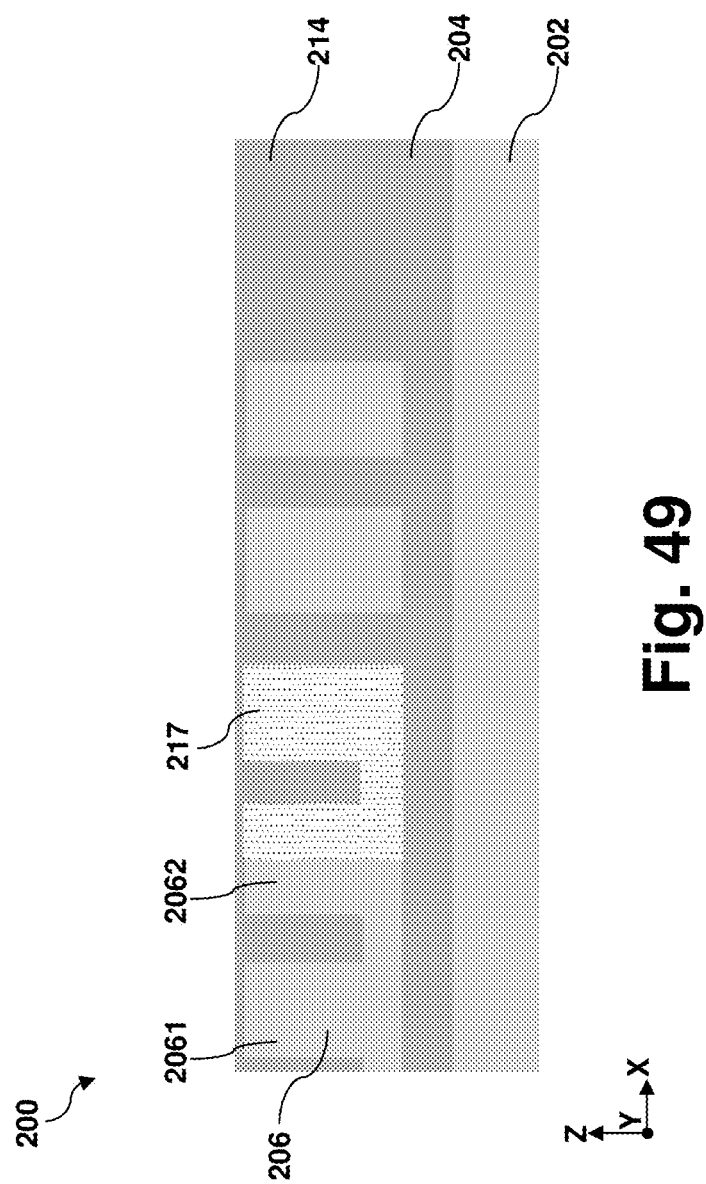

Referring to FIGS. 44 and 47-49, method 400 includes a block 406 where a second doping process 1200 is selectively performed to a portion of the second silicon feature 2062 and the third silicon feature 2063. At block 406, a second implantation mask 215 is formed over the fill dielectric layer 214 to expose a portion of the second silicon feature 2062 and the third silicon feature 2063, while another portion of the second silicon feature 2062 and the first silicon feature 2061 remain protected by the second implantation mask 215, as shown in FIG. 47. Thereafter, with the second implantation mask 215 in place, the second doping process 1200 is performed to the workpiece 200 to selectively implant the exposed portion of the second silicon feature 2062 and the exposed third silicon features 2063, as illustrated in FIG. 48. In some embodiments, the second doping process 1200 implants an n-type dopant, such as phosphorus (P) or arsenic (As) at a first dose. The second implantation mask 215 may be similar to the first implantation mask 216 in terms of formation and composition. After the second doping process 1200, the second implantation mask 215 is removed. As shown in FIG. 49, the second doping process 1200 forms a first n-doped region 217.

Figure 50:
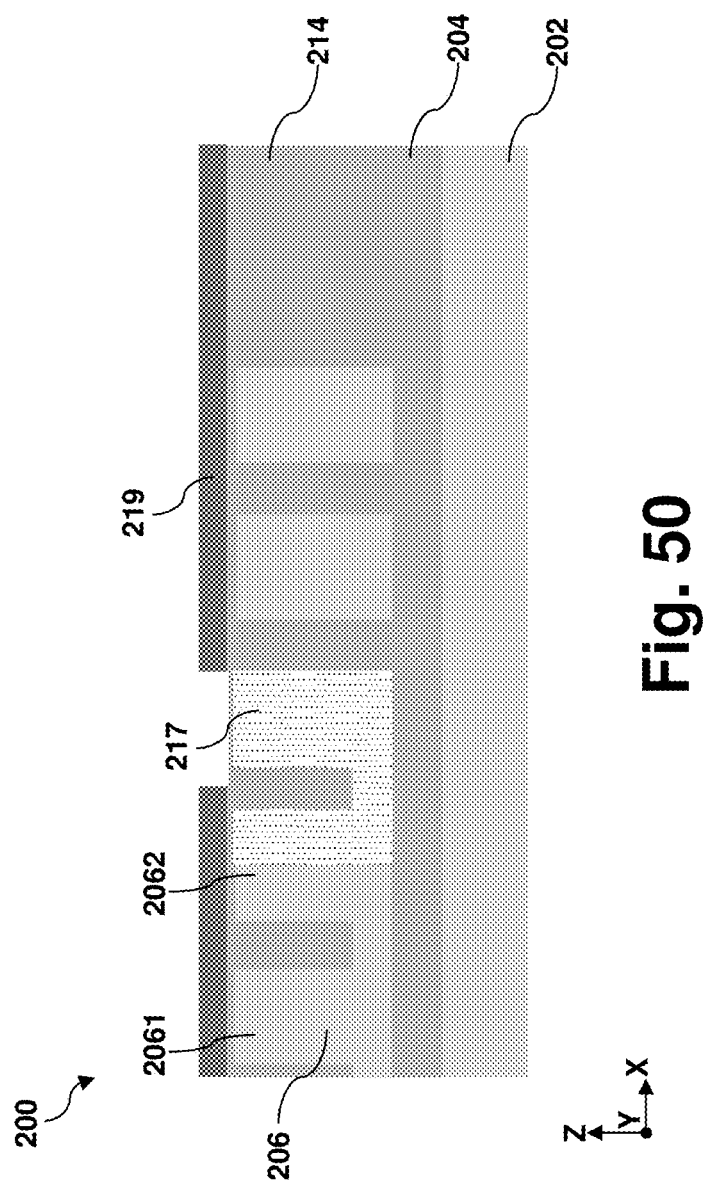
Figure 51:
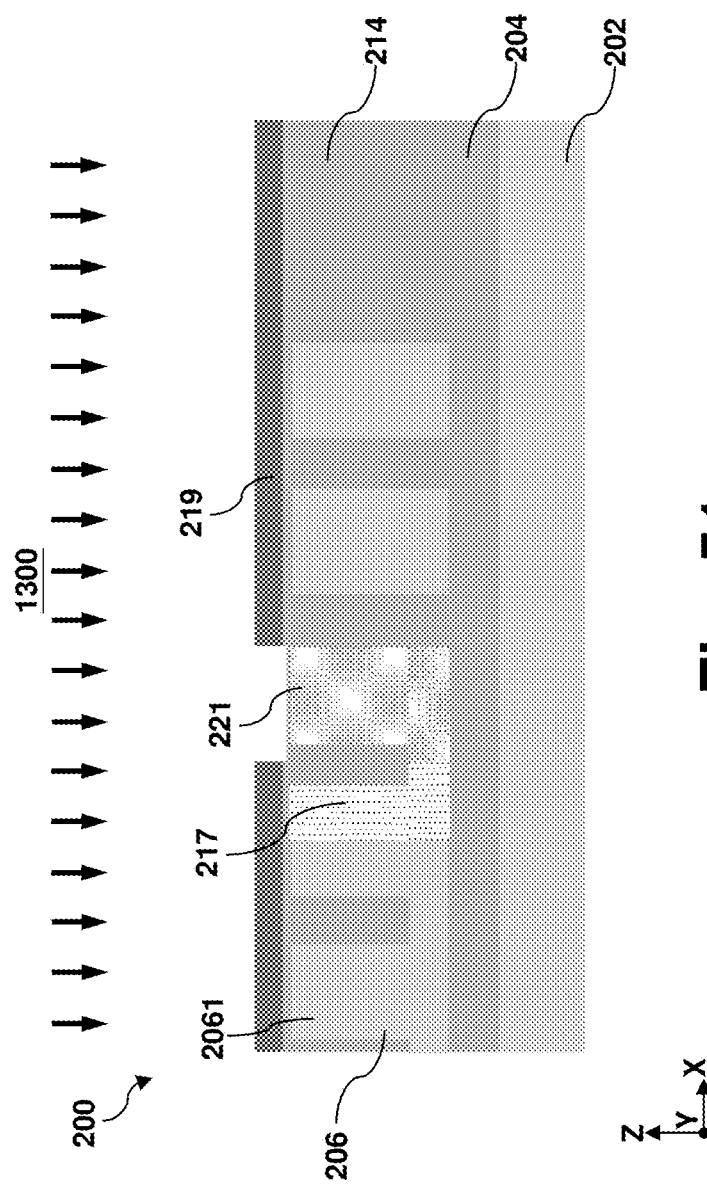
Figure 52:
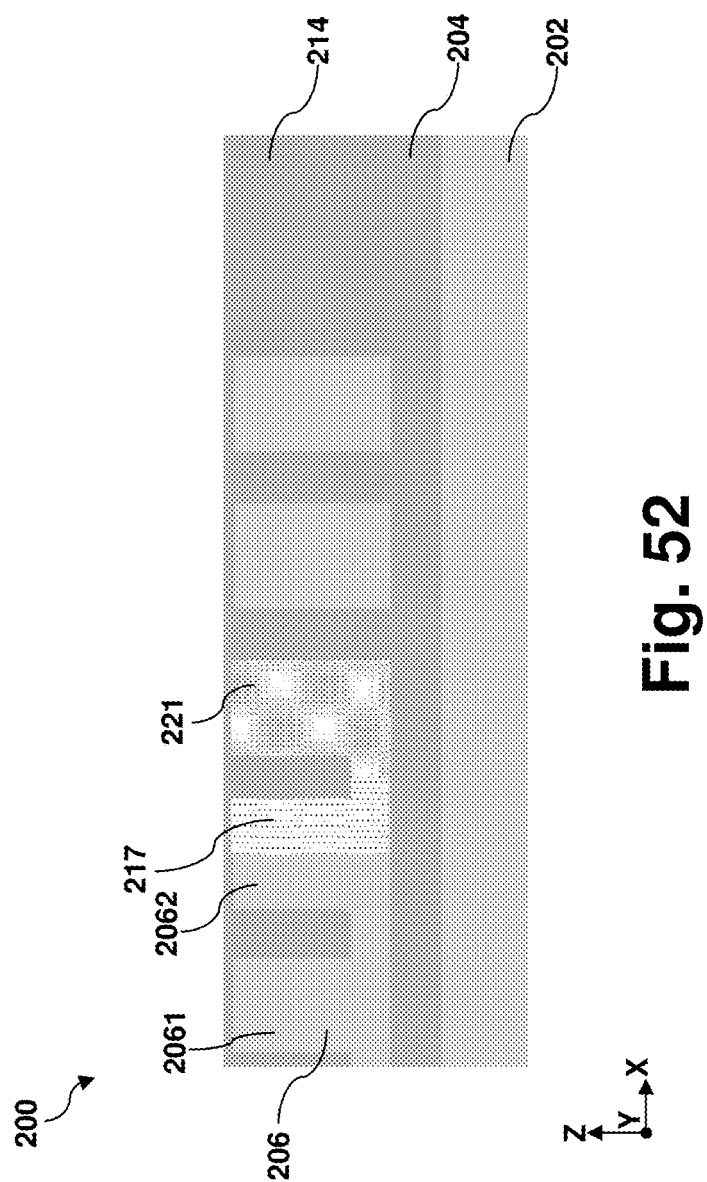

Referring to FIGS. 44 and 50-52, method 400 includes a block 408 where a third doping process 1300 is selectively performed to the third silicon feature 2063. At block 408, a third implantation mask 219 is formed over the fill dielectric layer 214 to expose the third silicon feature 2063 and a portion of the fill dielectric layer 214 between the second silicon feature 2062 and the third silicon feature 2063. The second silicon feature 2062 and the first silicon feature 2061 remain protected by the third implantation mask 219, as shown in FIG. 50. Thereafter, with the third implantation mask 219 in place, the third doping process 1300 is performed to the workpiece 200 to selectively implant the exposed third silicon features 2063, as illustrated in FIG. 51. In some embodiments, the third doping process 1300 implants an n-type dopant, such as phosphorus (P) or arsenic (As) at a second dose greater than the first dose. The third implantation mask 219 may be similar to the first implantation mask 216 in terms of formation and composition. After the third doping process 1300, the third implantation mask 219 is removed, as shown in FIG. 52. As shown in FIG. 52, the third doping process 1300 transform a portion of the first n-doped region 217 into a second n-doped region 221. The n-type dopant concentration in the second n-doped region 221 is greater than that in the first n-doped region 217.

Figure 53:
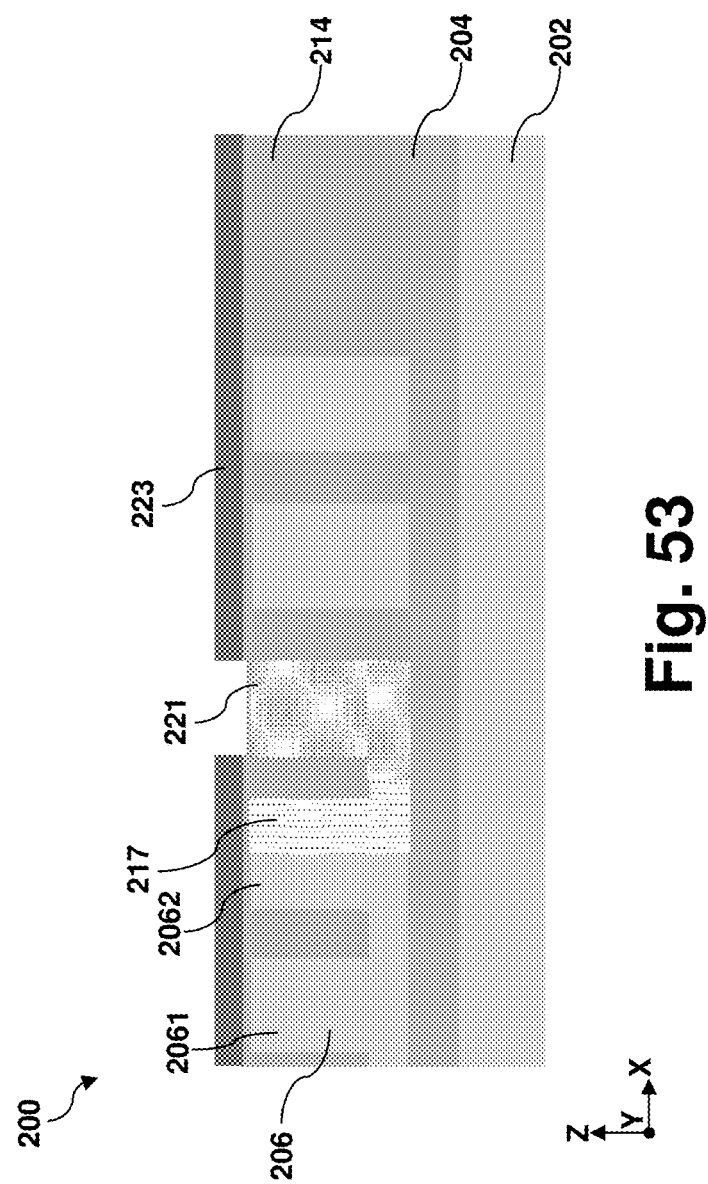
Figure 54:
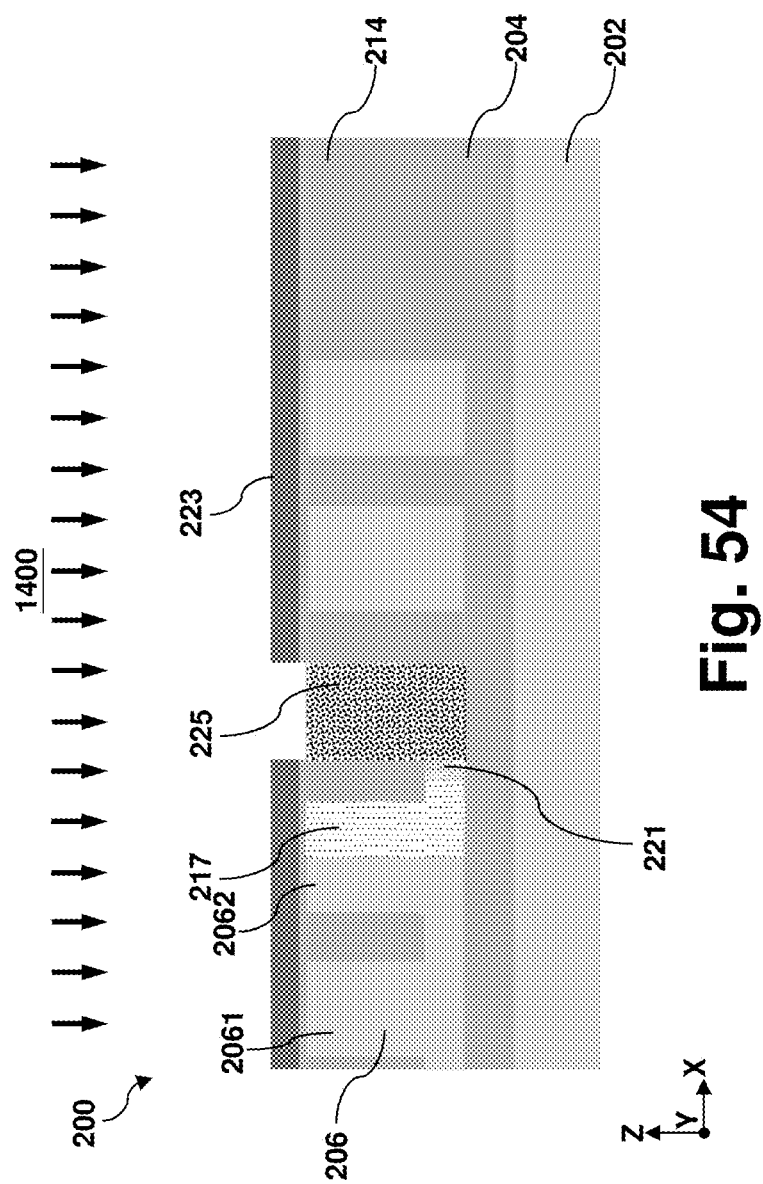
Figure 55:
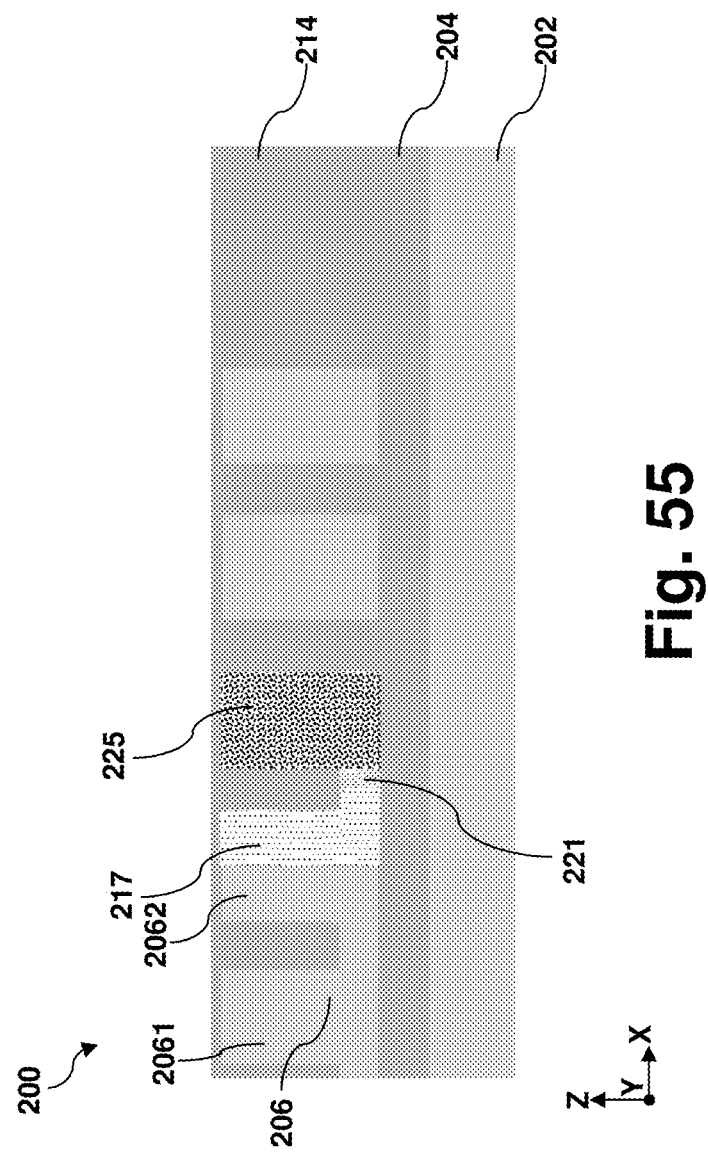

Referring to FIGS. 44 and 53-55, method 400 includes a block 410 where a fourth doping process 1400 is selectively performed to the third silicon feature 2063. At block 410, a fourth implantation mask 223 is formed over the fill dielectric layer 214 to expose the third silicon feature 2063 alone. The second silicon feature 2062, the first silicon feature 2061, and the fill dielectric layer 214 remain protected by the fourth implantation mask 223, as shown in FIG. 53. Thereafter, with the fourth implantation mask 223 in place, the fourth doping process 1400 is performed to the workpiece 200 to selectively implant the exposed third silicon features 2063, as illustrated in FIG. 54. In some embodiments, the fourth doping process 1400 implants an n-type dopant, such as phosphorus (P) or arsenic (As) at a third dose greater than the second dose. The fourth implantation mask 223 may be similar to the first implantation mask 216 in terms of formation and composition. After the fourth doping process 1400, the fourth implantation mask 223 is removed, as shown in FIG. 55. As shown in FIG. 55, the fourth doping process 1400 transform a portion of the second n-doped region 221 into a third n-doped region 225. The n-type dopant concentration in the third n-doped region 225 is greater than that in the second n-doped region 221.

Figure 56:
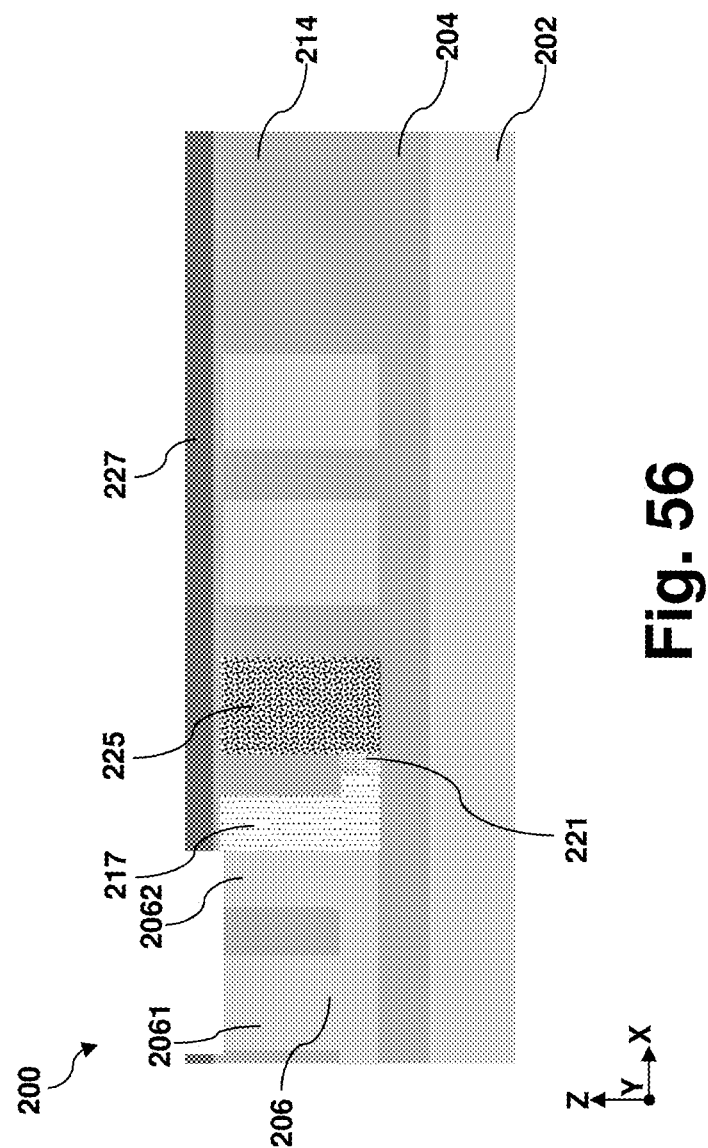
Figure 57:
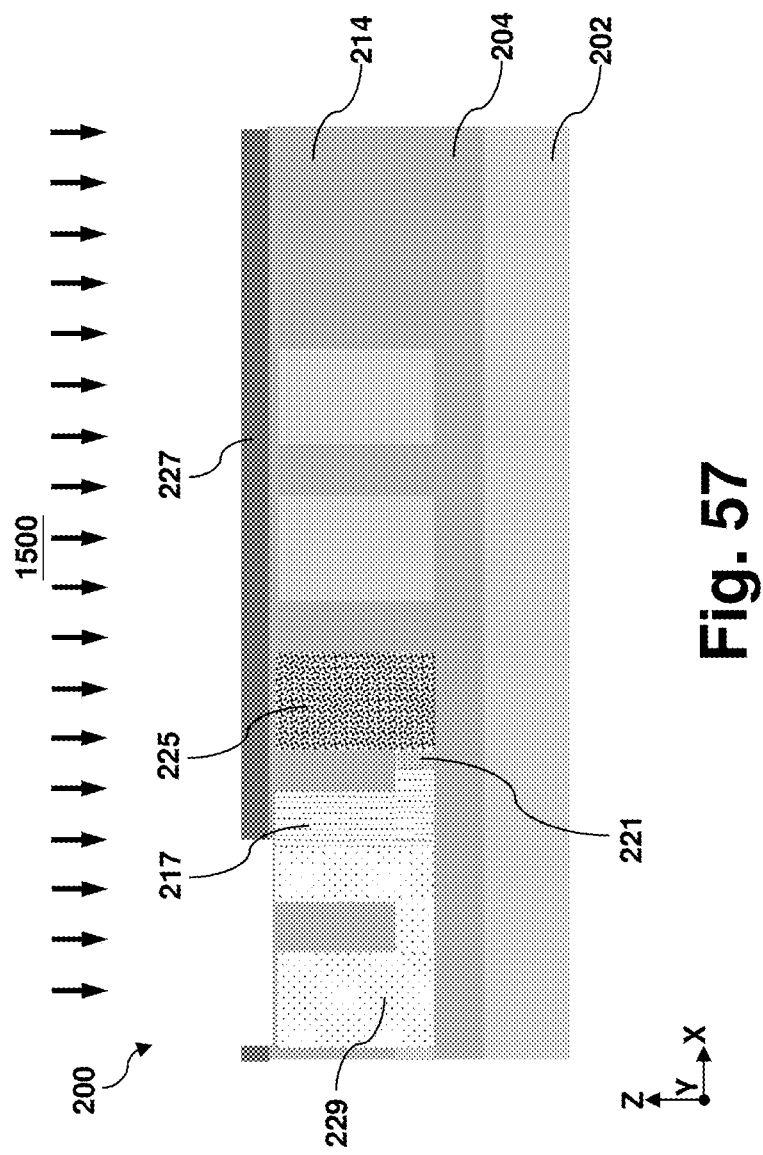
Figure 58:
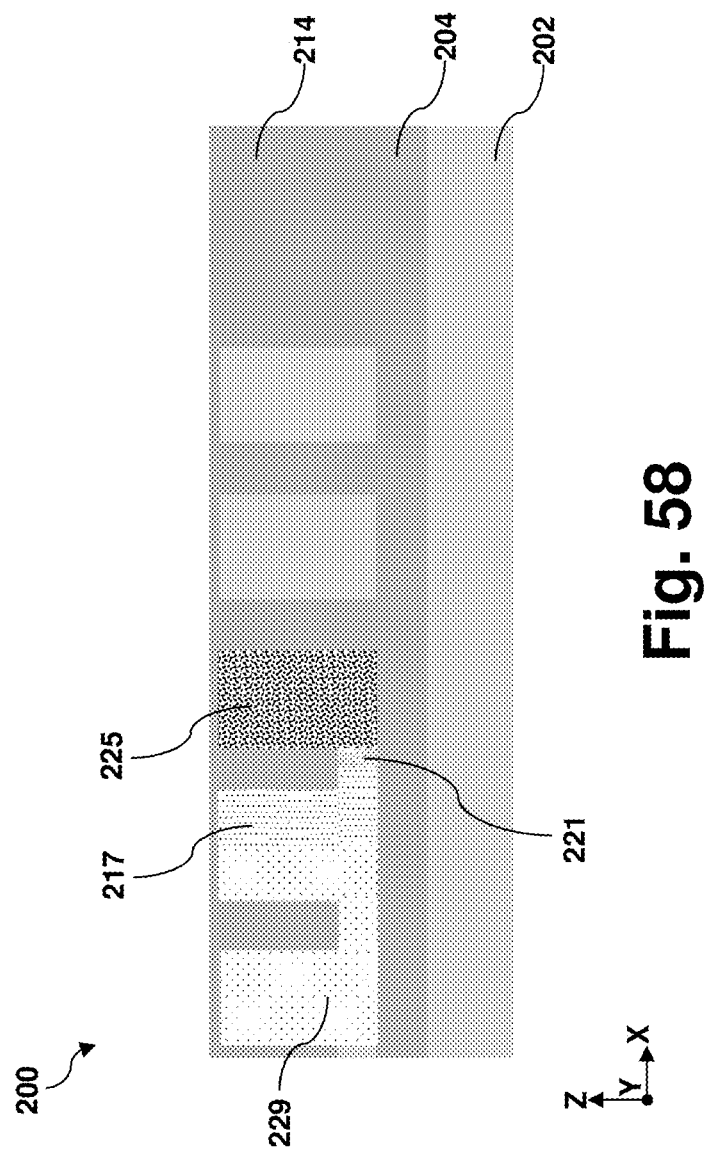

Referring to FIGS. 44 and 56-58, method 400 includes a block 412 where a fifth doping process 1500 is selectively performed to a portion of the second silicon feature 2062 and the first silicon feature 2061. At block 412, a fifth implantation mask 227 is formed over the fill dielectric layer 214 to expose the first silicon feature 2061 and another portion of the second silicon feature 2062. The doped portion of the second silicon feature 2062 and the third silicon feature 2063 remain protected by the fifth implantation mask 227, as shown in FIG. 56. Thereafter, with the fifth implantation mask 227 in place, the fifth doping process 1500 is performed to the workpiece 200 to selectively implant the exposed first silicon features 2061 and the exposed portion of the second silicon feature 2062, as illustrated in FIG. 57. In some embodiments, the fifth doping process 1500 implants a p-type dopant, such as boron (B) or boron difluoride ($BF_2$) at a fourth dose. The fifth implantation mask 227 may be similar to the first implantation mask 216 in terms of formation and composition. After the fifth doping process 1500, the fifth implantation mask 227 is removed, as shown in FIG. 58. As shown in FIG. 58, the fifth doping process 1500 forms a first p-doped region 229.

Figure 59:
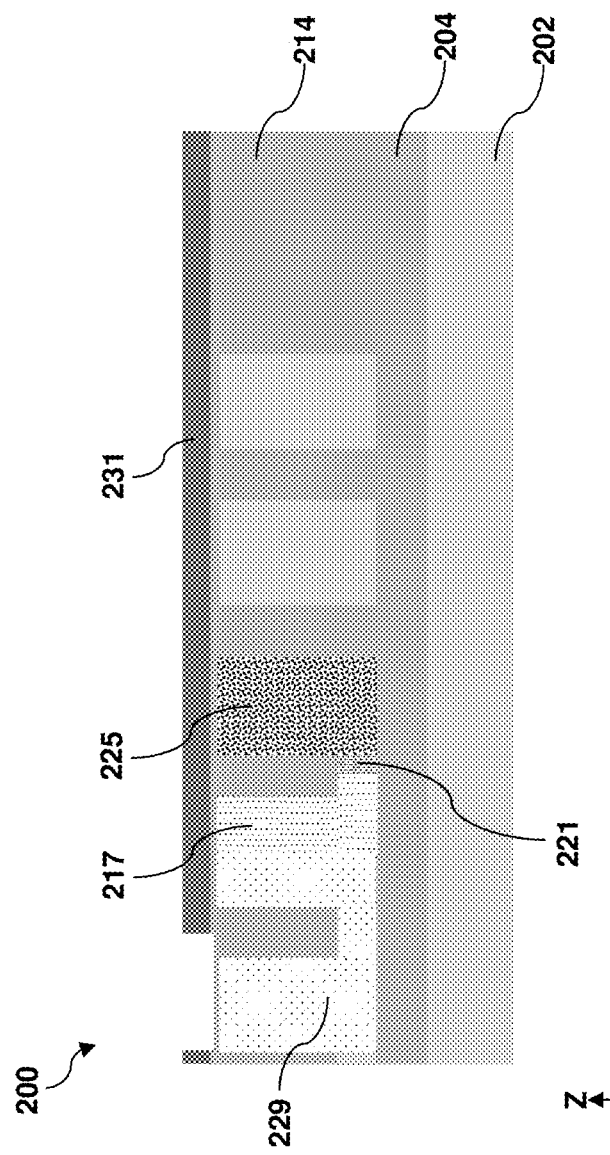
Figure 60:
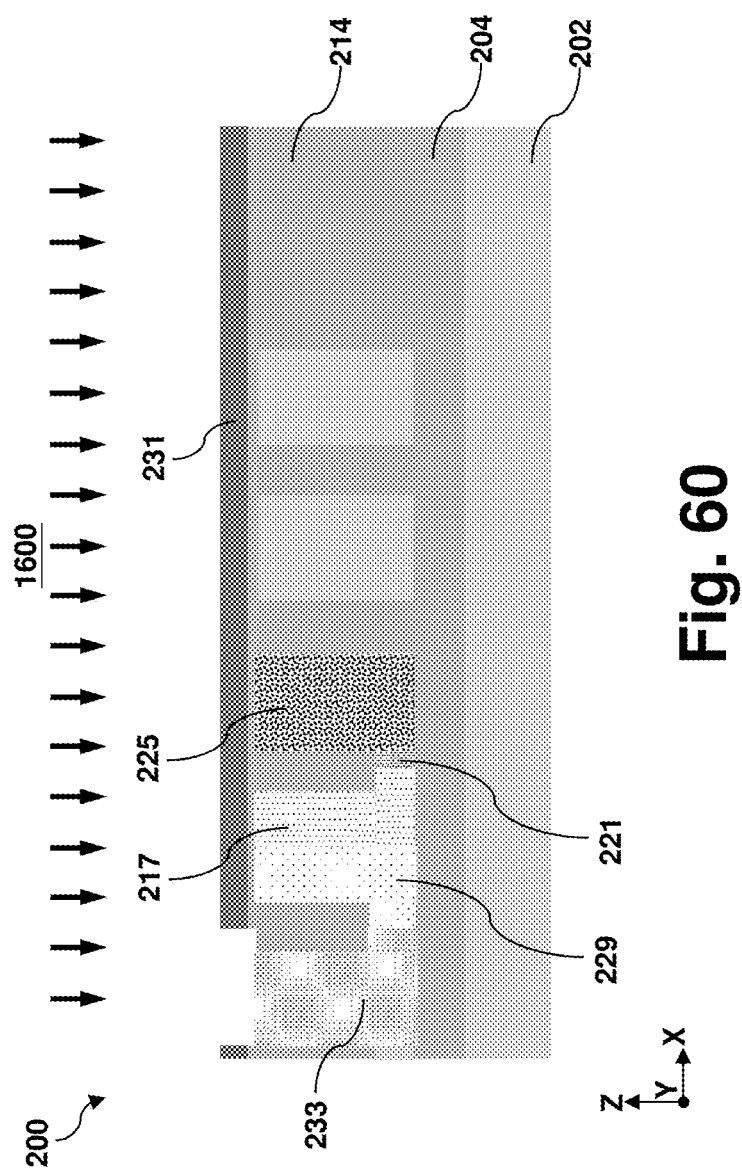
Figure 61:
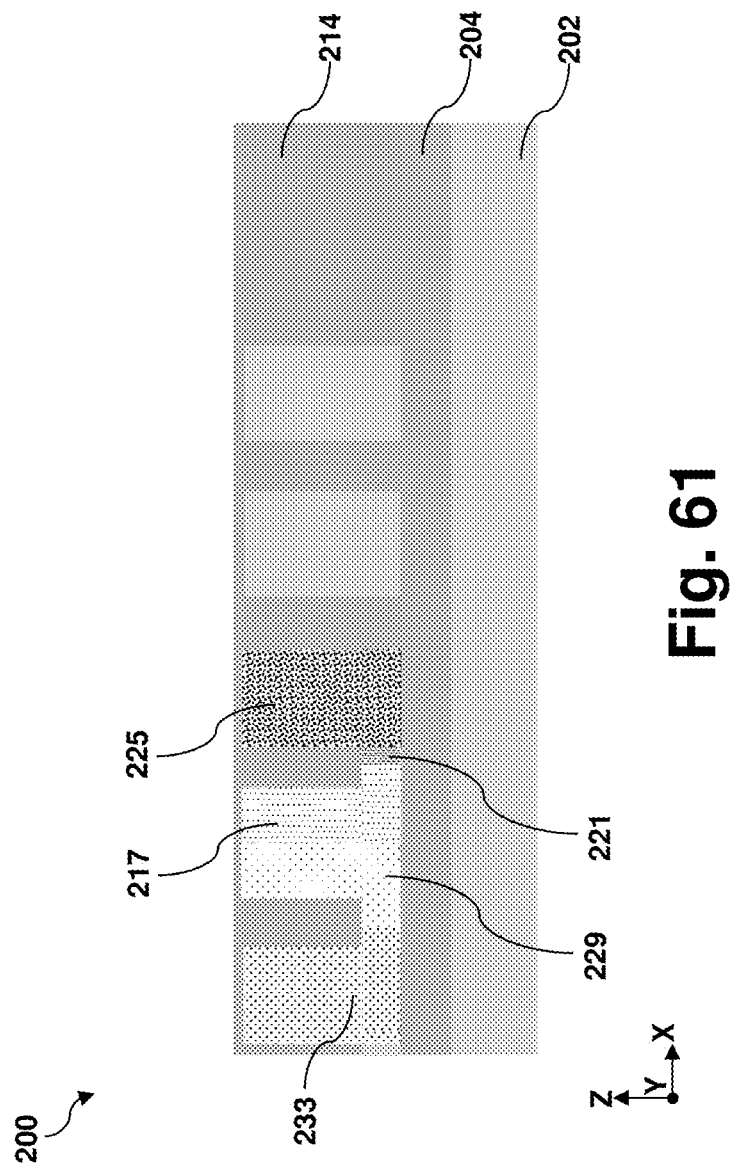

Referring to FIGS. 44 and 59-61, method 400 includes a block 414 where a sixth doping process 1600 is selectively performed to the first silicon feature 2061. At block 414, a sixth implantation mask 231 is formed over the fill dielectric layer 214 to expose the first silicon feature 2061 and a portion of the fill dielectric layer 214 between the first silicon feature 2061 and the second silicon feature 2062. The second silicon feature 2062 and the third silicon feature 2063 remain protected by the sixth implantation mask 231, as shown in FIG. 59. Thereafter, with the sixth implantation mask 231 in place, the sixth doping process 1600 is performed to the workpiece 200 to selectively implant the exposed first silicon features 2061, as illustrated in FIG. 60. In some embodiments, the sixth doping process 1600 implants a p-type dopant, such as boron (B) or boron difluoride ($BF_2$) at a fifth dose greater than the fourth dose. The sixth implantation mask 231 may be similar to the first implantation mask 216 in terms of formation and composition. After the sixth doping process 1600, the sixth implantation mask 231 is removed, as shown in FIG. 61. As shown in FIG. 61, the sixth doping process 1600 transforms a portion of the first p-doped region 229 into a second p-doped region 233. The p-type dopant concentration in the second p-doped region 233 is greater than that in the first p-doped region 229.

Figure 62:
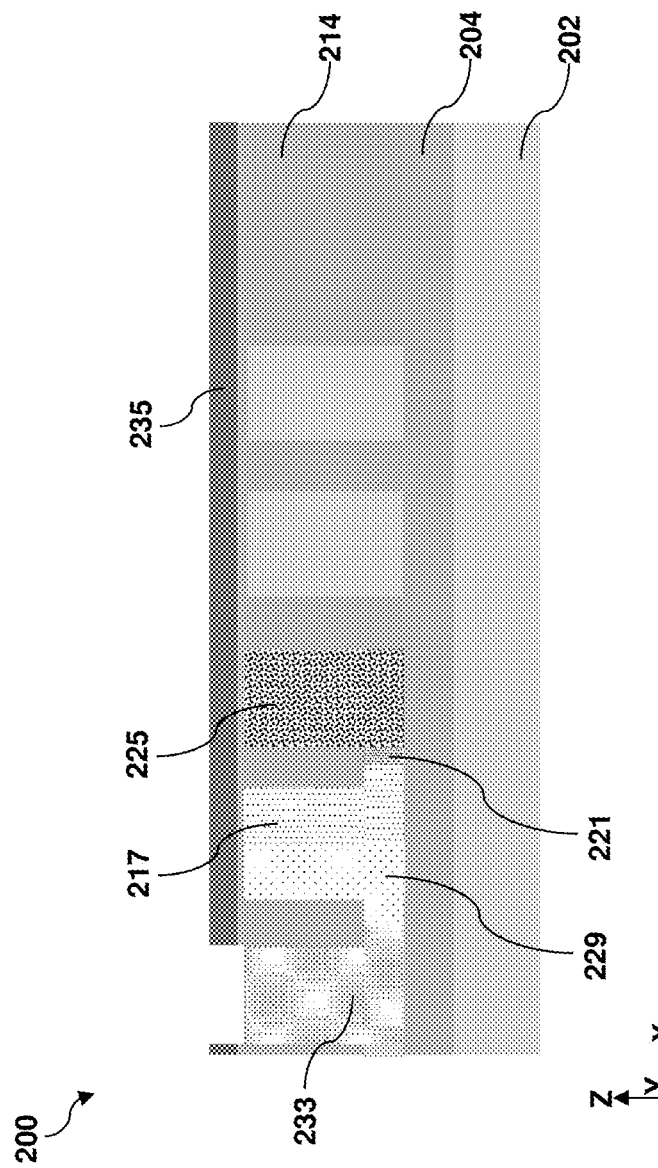
Figure 63:
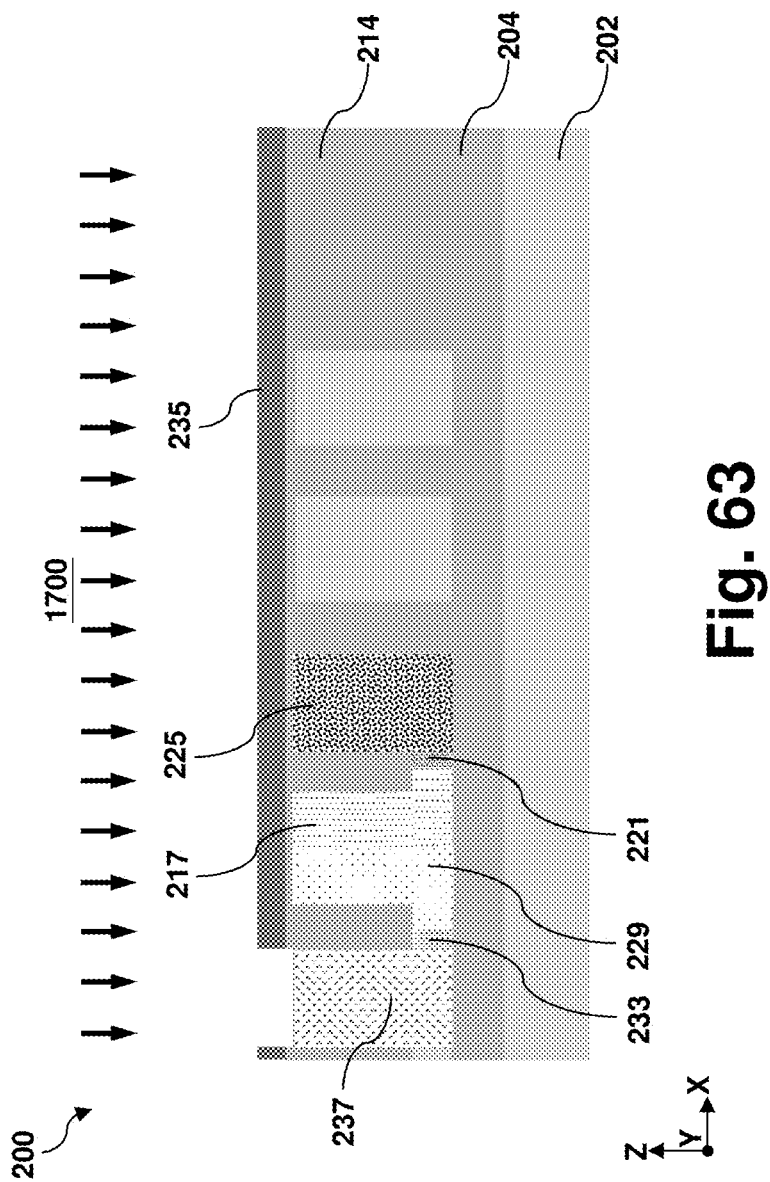
Figure 64:
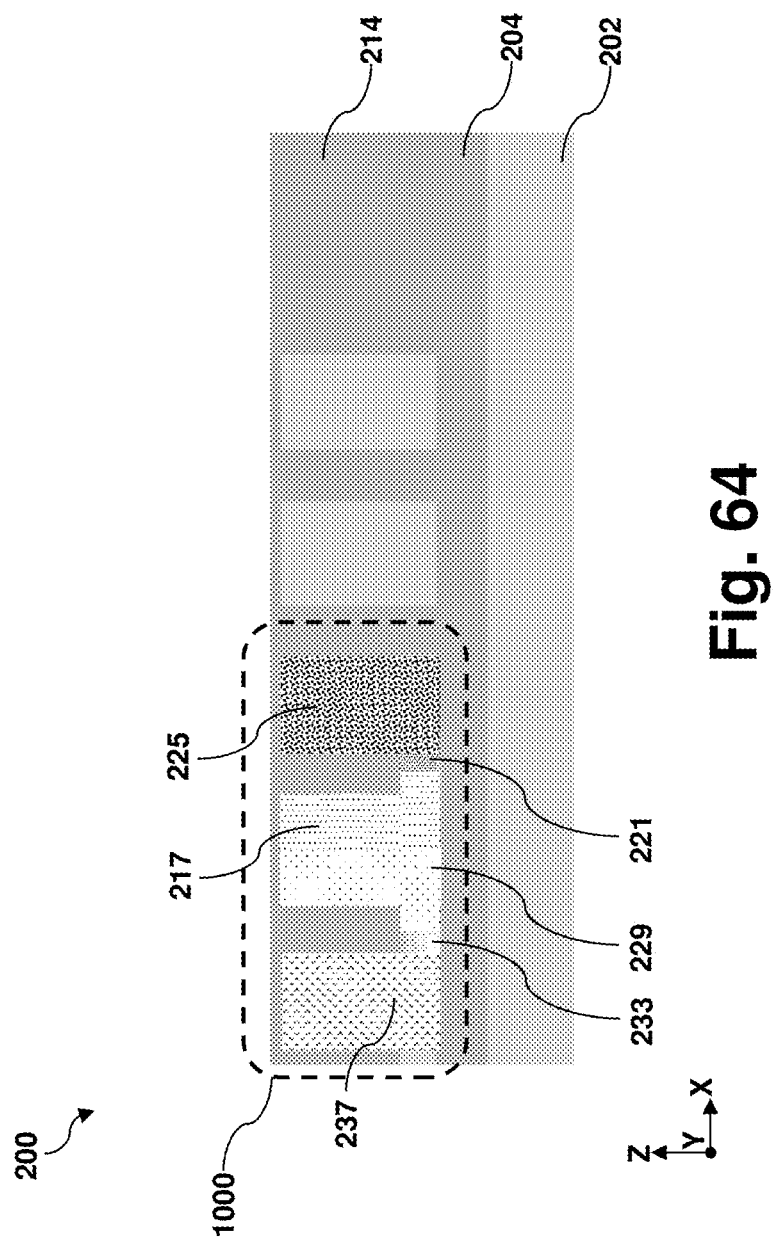

Referring to FIGS. 44 and 62-64, method 400 includes a block 416 where a seventh doping process 1700 is selectively performed to the first silicon feature 2061. At block 416, a seventh implantation mask 235 is formed over the fill dielectric layer 214 to expose the first silicon feature 2061 alone. The second silicon feature 2062 and the third silicon feature 2063 remain protected by the seventh implantation mask 235, as shown in FIG. 62. Thereafter, with the seventh implantation mask 235 in place, the seventh doping process 1700 is performed to the workpiece 200 to selectively implant the exposed first silicon features 2061, as illustrated in FIG. 63. In some embodiments, the seventh doping process 1700 implants a p-type dopant, such as boron (B) or boron difluoride ($BF_2$) at a sixth dose greater than the fifth dose. The seventh implantation mask 235 may be similar to the first implantation mask 216 in terms of formation and composition. After the seventh doping process 1700, the seventh implantation mask 235 is removed, as shown in FIG. 64. As shown in FIG. 64, the seventh doping process 1700 transforms a portion of the second p-doped region 233 into a third p-doped region 237. The p-type dopant concentration in the third p-doped region 237 is greater than that in the second p-doped region 233.

Figure 75:
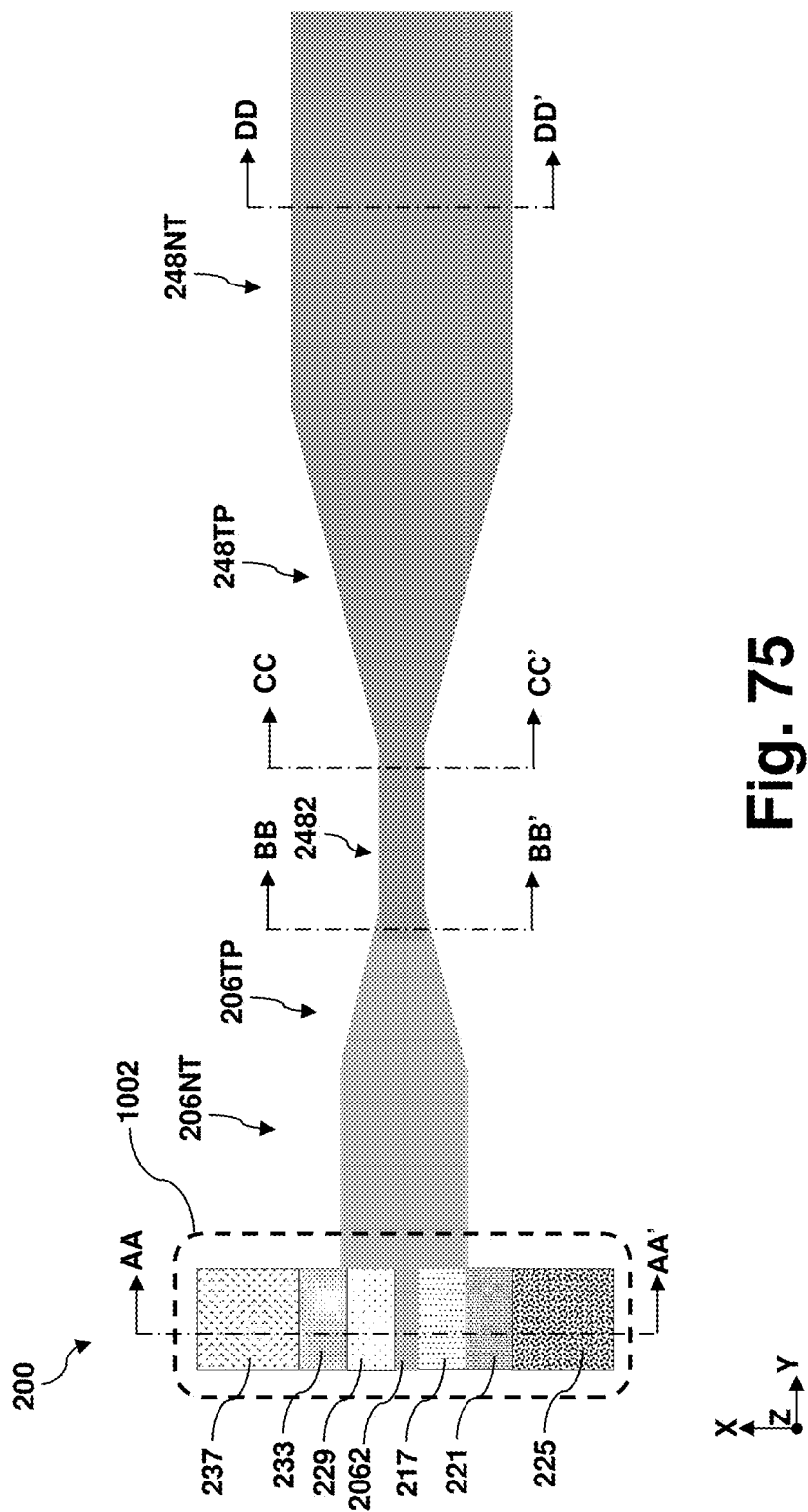
FIGS. 75-79 illustrate a top view and fragmentary cross-sectional views of a semiconductor device including active waveguide features, according to one or more aspects of the present disclosure.
Figure 76:
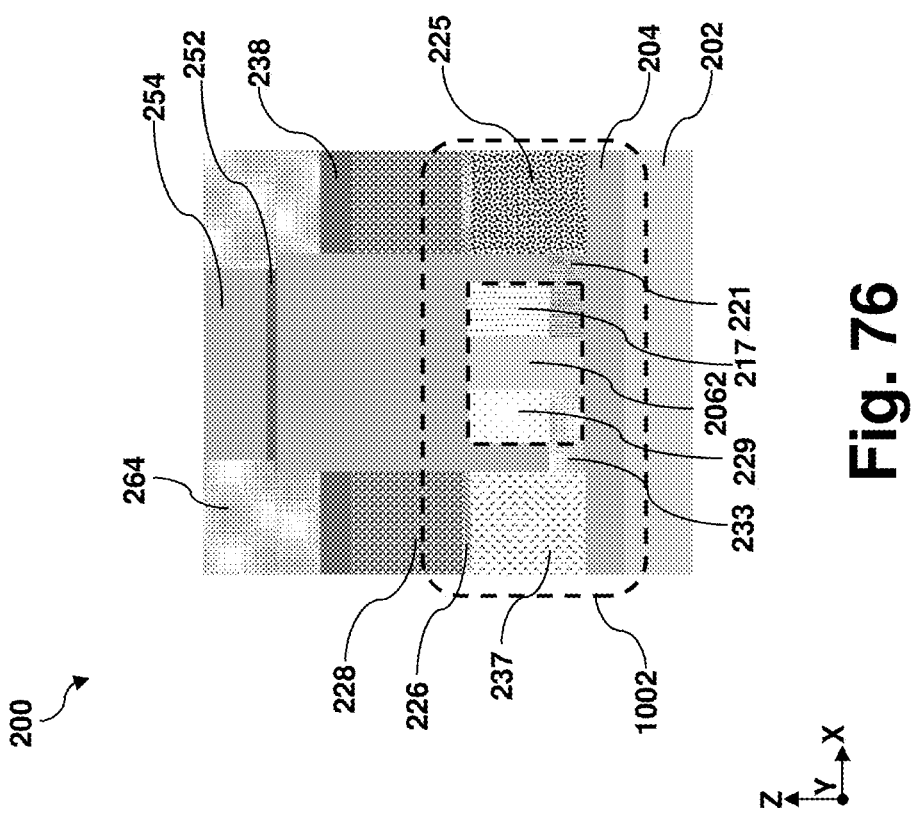

Upon conclusion of the operations at block 416, an active device 1000 is formed. The active device 1000 includes the first n-doped region 217, the first p-doped region 229, the second n-doped region 221, the second p-doped region 233, third n-doped region 225, and the third p-doped region 237. The active device 1000 serves as a phase modulator to control a bias voltage applied across a first waveguide feature 206 coupled to the active device 1000. In that regard, the active device 1000 may also be referred to as a phase modulator 1000. The third n-doped region 225 and the third p-doped region 237 are heavily doped to function as low-resistance contacts of the phase modulator 1000. When activated, the phase modulator 1000 may modulate the refractive index of the first waveguide feature 206 coupled thereto. An alternative phase modulator 1002 is illustrated in FIGS. 75 and 76. Compared the phase modulator 1002, the alternative phase modulator 1002 further includes a substantially undoped region (a portion of the second silicon feature 2062) disposed between the first n-doped region 217 and the first p-doped region 229. The phase modulator 1000 includes a P-N junction and is configured to depletion mode operation where charge carriers are depleted. The alternative phase modulator 1002 includes a P-I-N (I for intrinsic) junction and is configured for accumulation mode operations where charge carriers are pooled in the undoped region. Because charge carrier densities may affect the refractive index of the waveguide, the phase modulator 1000 or the alternative phase modulator 1002 may modulate the refractive index of the waveguides of the present disclosure.

Figure 65:
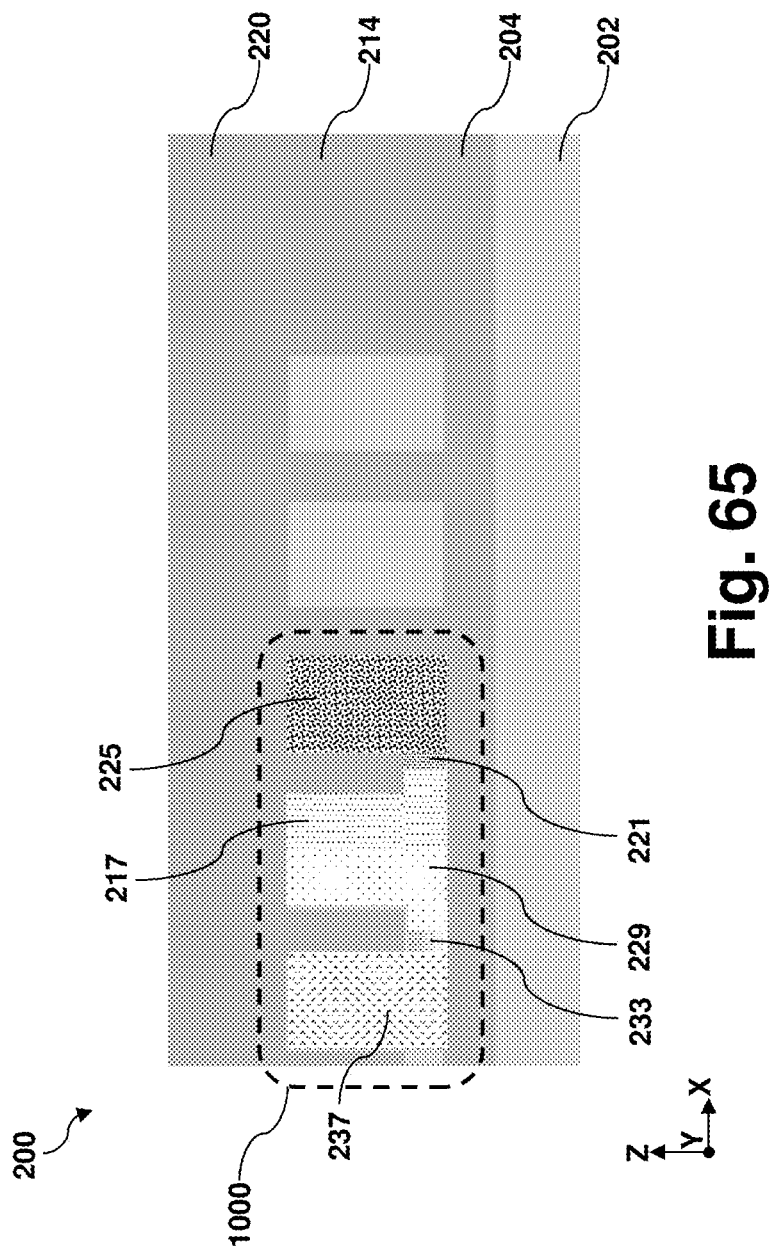

Referring to FIGS. 44 and 65, method 400 includes a block 418 where the ILD layer 220 is deposited. The ILD layer 220 may include silicon oxide or silicon-oxide-containing dielectric material. In some embodiments, the ILD layer 220 may include tetraethylorthosilicate (TEOS) oxide, un-doped silicate glass, or doped silicon oxide such as borophosphosilicate glass (BPSG), fused silica glass (FSG), phosphosilicate glass (PSG), boron doped silicate glass (BSG), and/or other suitable dielectric materials and may be deposited using spin-on coating or flowable chemical vapor deposition (FCVD). In some other embodiments, the ILD layer 220 may include silicon oxide and may be deposited using CVD, plasma-enhanced CVD (PECVD), or other suitable process. In some instances, the ILD layer 220 may have a thickness (along the Z direction) between about 250 nm and about 350 nm.

Figure 66:
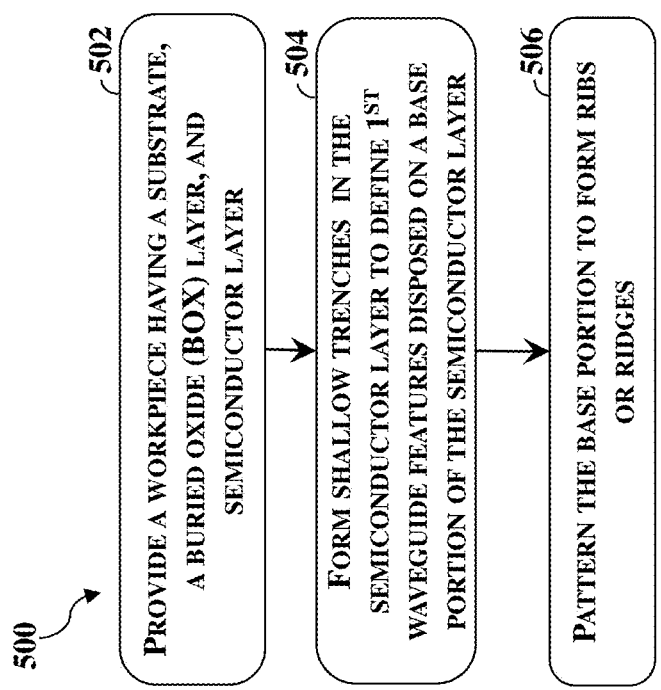
FIG. 66 illustrates a flow chart of a method for forming a waveguide feature with ribs, according to one or more aspects of the present disclosure.
Figure 67:
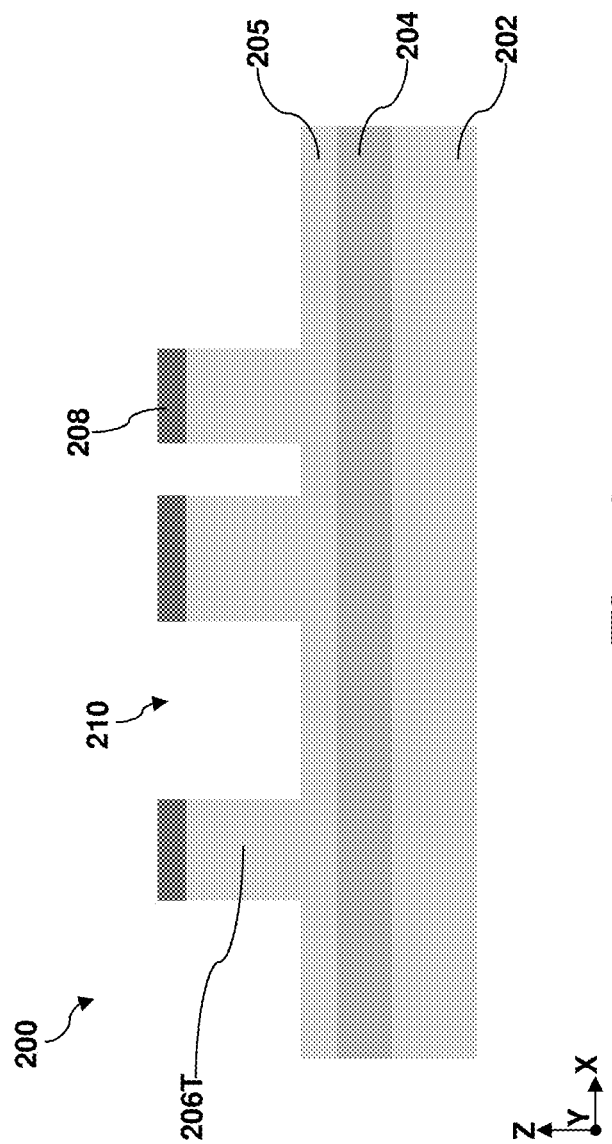
FIGS. 67-68 illustrate fragmentary cross-sectional view of a workpiece at various stages in the method in FIG. 66, according to one or more aspects of the present disclosure.
Figure 68:
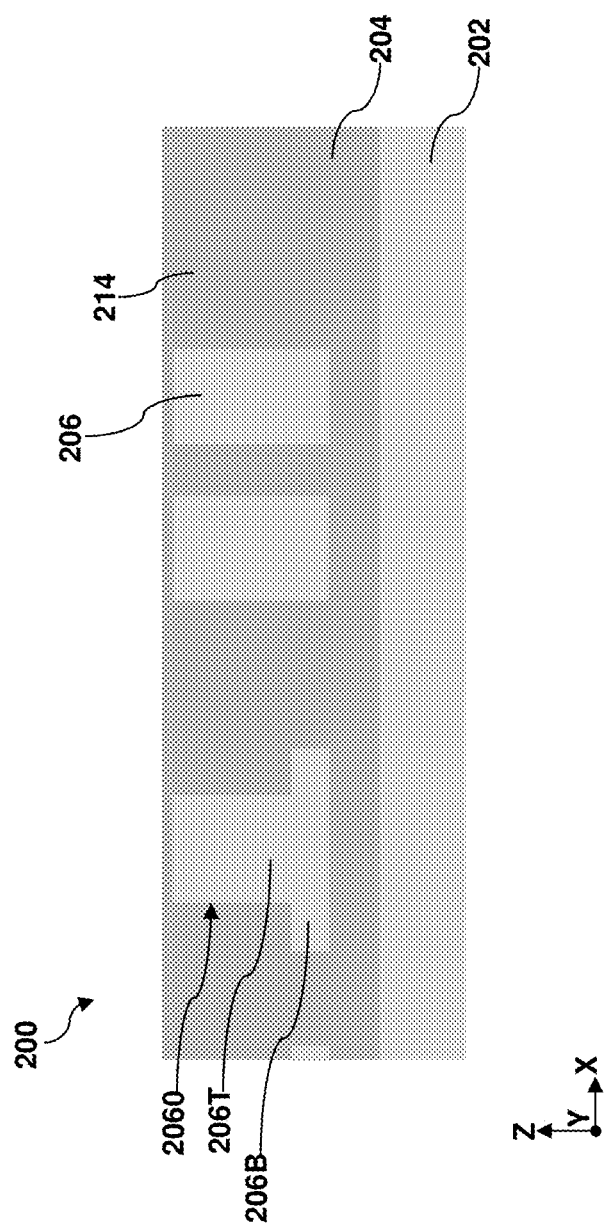

In some embodiments, method 500 in FIG. 66 may be performed to form ridge-type or rib-type waveguide feature 2060 that includes wider bottom portion 206B and a narrow top portion 206T, illustrated in FIG. 68. Embodiments of method 500 are described below in conjunction with FIGS. 67-68.

Referring to FIGS. 66 and 67, method 500 includes a block 502 where a workpiece 200 is provided. At block 502, method 500 may begin with a workpiece 200. Similar to what is shown in FIG. 2, the workpiece 200 in FIG. 67 includes a substrate 202, a buried oxide (BOX) layer 204 on the substrate 202, and a semiconductor layer 205 on the buried oxide layer 204. In one embodiment, the substrate 202 may be a silicon (Si) substrate. In some other embodiments, the substrate 202 may include other semiconductors such as germanium (Ge), silicon germanium (SiGe), or a III-V semiconductor material. Example III-V semiconductor materials may include gallium arsenide (GaAs), indium phosphide (InP), gallium phosphide (GaP), gallium nitride (GaN), gallium arsenide phosphide (GaAsP), aluminum indium arsenide (AlInAs), aluminum gallium arsenide (AlGaAs), gallium indium phosphide (GaInP), and indium gallium arsenide (InGaAs). The BOX layer 204 may include silicon oxide and the semiconductor layer 205 may include silicon (Si). In some implementations where the substrate 202 and the semiconductor layer 205 are formed of silicon (Si) and the BOX layer 204 is formed of silicon oxide, the substrate 202, the BOX layer 204, and the semiconductor layer 205 may be portions of a silicon-on-insulator (SOI) substrate.

Referring to FIGS. 66 and 67, method 500 includes a block 504 where shallow trenches 210 are formed in the semiconductor layer 205 to define a top portion 206T on a base portion of the semiconductor layer 205. Operations at block 504 include forming shallow trenches 210 that do not extend through the semiconductor layer 205. In some embodiments represented in FIG. 67, the formation of the shallow trenches 210 includes etching the semiconductor layer 205 through the first patterned hard mask 208 described above with respect to method 100. While a similar etch process is performed to etch the semiconductor layer 205 at block 504, the etch process lasts a shorter period of time such that the shallow trenches 210 does not extend through the semiconductor layer 205 to expose the BOX layer 204. The formation of the shallow trenches 210 define the top portion 206T, which is disposed on the based portion of the semiconductor layer 205, not on the BOX layer 204.

Referring to FIGS. 66 and 68, method 500 includes a block 506 where the base portion of the semiconductor layer 205 is patterned to form ridge-type silicon features 2060. While not explicitly shown in the figures, another patterned hard mask may be formed for further patterning the base portion of the semiconductor layer 205 to form the ridge-type silicon feature 2060. The ridge-type silicon feature 2060 may be referred to as ridge-type waveguide feature 2060 due to its shapes or as a ridge-type first waveguide feature 2060 due to its relative location with the second waveguide feature 248. As shown in FIG. 68, the ridge-type waveguide feature 2060 includes a bottom portion 206B and a top portion 206T disposed on the bottom portion 206B. Along the X direction, the bottom portion 206B is wider than the top portion. This profile gives the name-ridge-type silicon feature 2060. After the ridge-type silicon feature 2060 is formed, the fill dielectric layer 214 is deposited over the workpiece 200. The fill dielectric layer 214 may be planarized to provide a planar top surface, as shown in FIG. 68.

Methods 100, 300, 400, and 500 may be performed to the same workpiece 200 to form various waveguide structures. For example, FIGS. 69-74 include a first example structure and FIGS. 75-79 illustrate a second example structure.

Figure 69:
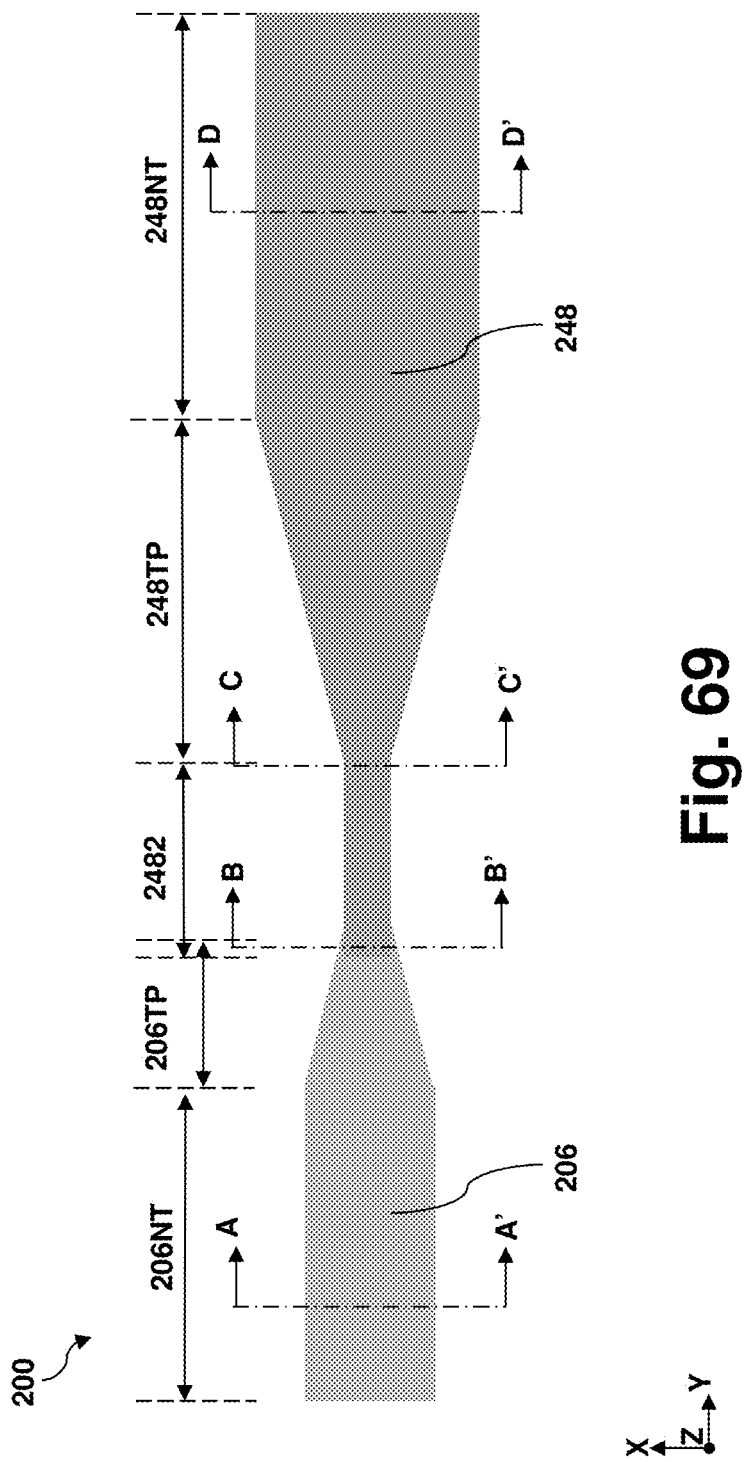
FIGS. 69-74 illustrate a top view and fragmentary cross-sectional views of a semiconductor device including a first waveguide feature and a second waveguide feature, according to one or more aspects of the present disclosure.

Reference is first made to FIG. 69, which illustrates a top view of a semiconductor structure 200 that includes a first waveguide feature 206 and a second waveguide feature 248 that are aligned along the Y direction and partially overlapped. For ease of illustration, FIG. 69 is simplified to remove all structures surrounding the first waveguide feature 206 and the second waveguide feature 248. Along the Y direction, the first waveguide feature 206 may be divided into a non-tapered portion 206NT and a tapered portion 206TP and the second waveguide feature 248 may be divided into a non-taper portion 248NT, a tapered portion 248TP, and a tip portion 2482. The tip portion 2482 partially overlaps the tapered portion 206TP to form a spot size converter or an optical edge coupler to optically couple the first waveguide feature 206 and the second waveguide feature 248. Along the X direction, a width of the tapered portion 206TP decreases from a width of the non-tapered portion 206NT as the tapered portion 206TP tapers away from the non-tapered portion 206NT. Along the X direction, a width of the non-tapered portion 248NT is greater than a width of the tip portion 2482. The tapered portion 248TP serves as a transition between the non-tapered portion 248NT and the tip portion 2482. In some embodiments described above, the first waveguide feature 206 may be formed of silicon and the second waveguide feature 248 may be formed of silicon nitride. Method 300 in FIG. 35 or variation thereof may be used to form the tip portion 2482 or the tapered portions 206TP and 248TP.

Figure 70:
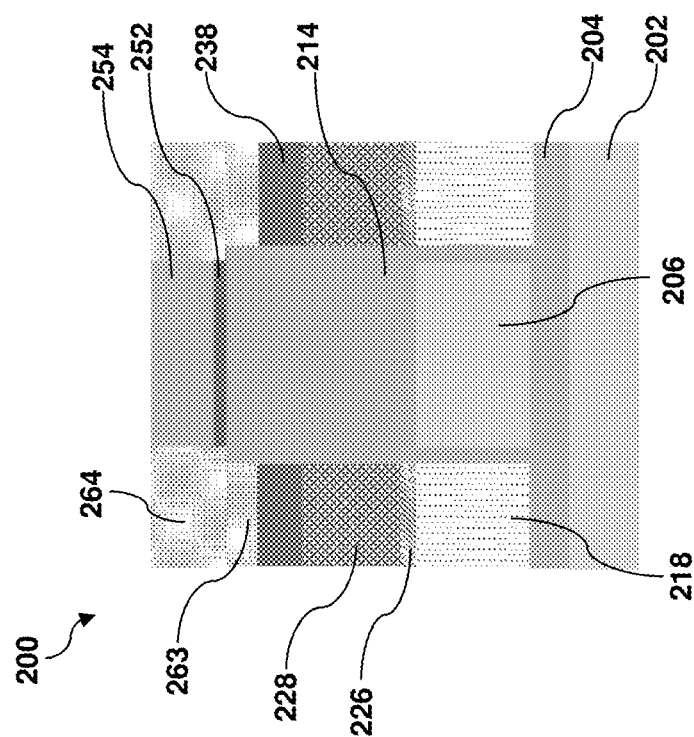
Figure 71:
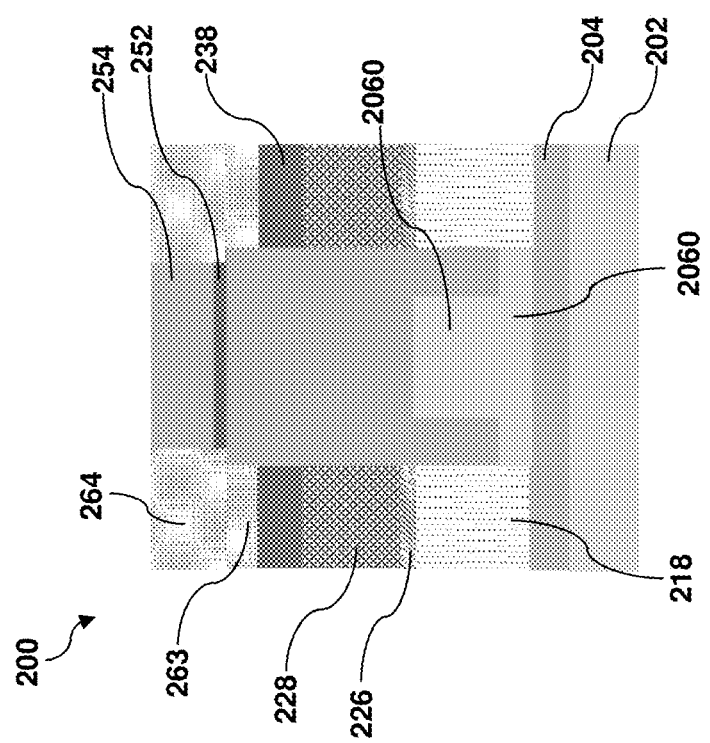

Fragmentary cross-sectional views along section A-A', B-B', C-C' and D-D' in FIG. 69 are provided to illustrate structures surrounding the first waveguide feature 206 and the second waveguide feature 248. FIG. 70 and FIG. 71 illustrate a fragmentary cross-sectional view along section A-A' in two example embodiments. In FIG. 70, the first waveguide feature 206 is not ridge-type while the FIG. 71 illustrates an embodiment where the ridge-type first waveguide feature 2060 is employed. In both FIGS. 70 and 71, the first waveguide feature 206 (or the ridge-type first waveguide feature 2060) is disposed between two doped silicon features 218. By way of the silicide layer 226, the two doped silicon features 218 are coupled to contact features 228, which are in turn coupled to the lower metal features 238, the upper metal features 263, and the via features 264. Along section A-A', no second waveguide features 248 are present over the first waveguide feature 206 (or the ridge-type first waveguide feature 2060). The first waveguide feature 206 may be fabricated using method 100 while the ridge-type first waveguide feature 2060 may be fabricated using method 500.

Figure 72:
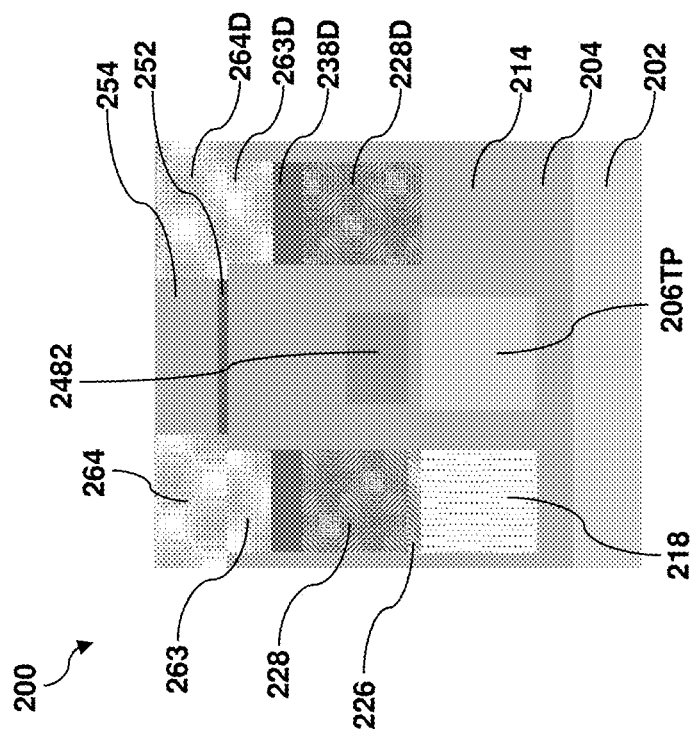
Figure 73:
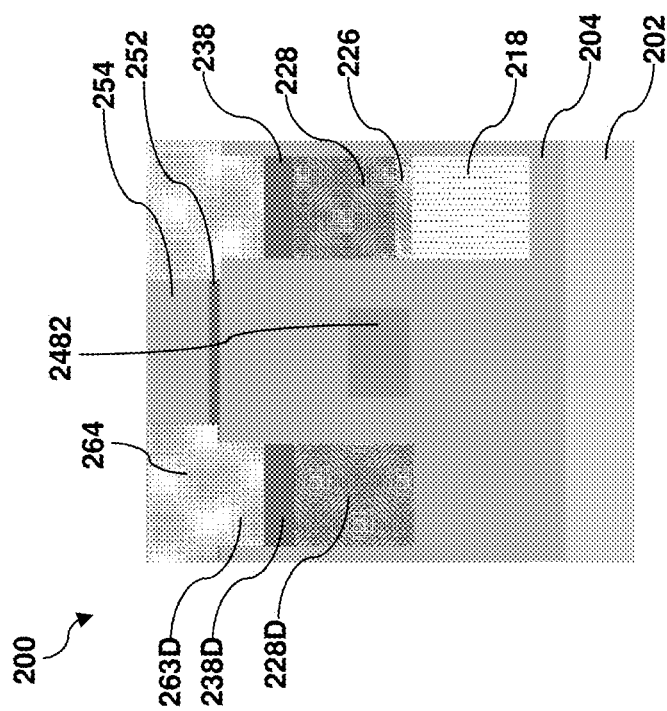

FIG. 72 illustrates a fragmentary cross-sectional view along section B-B'. At section B-B', the tip portion 2482 vertically overlaps the tapered portion 206TP. In the depicted embodiment, the tapered portion 206TP is not disposed between two doped silicon features 218 but is disposed alongside a single doped silicon feature 218. The first waveguide feature 206 is embedded in the fill dielectric layer 214. As it is not coupled to any doped silicon feature below, the dummy contact feature 228D is disposed over the fill dielectric layer 214. The tip portion 2482 is disposed between a contact feature 228 and the dummy contact feature 228D. Features described in conjunction with FIGS. 70 and 71 will not be repeated for brevity. FIG. 73 illustrates a fragmentary cross-sectional view along section C-C'. At section C-C', the tip portion 2482 is disposed between a dummy contact feature 228D and a contact feature 228. It is noted however, the dummy contact feature 228D in FIG. 73 is not the same dummy contact feature 228D in FIG. 72. Additionally, at cross-section C-C', the tip portion 2482 is not disposed over any portion of the first waveguide feature 206. For brevity, description of similar features will not be repeated.

Figure 74:
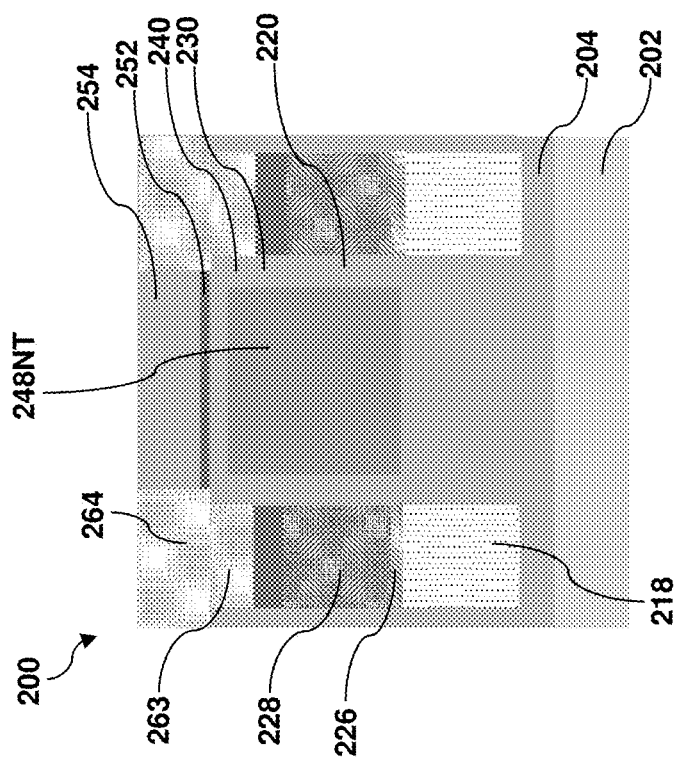

FIG. 74 illustrates a fragmentary cross-sectional view along section D-D'. In FIG. 74, the non-tapered portion 248NT of the second waveguide feature 248 is disposed between two contact features 228, between two lower metal features 238, as well as between two upper metal features 263. The non-tapered portion 248NT is spaced apart from adjacent contact features 228 by the ILD layer 220. The non-tapered portion 248NT is spaced apart from adjacent lower metal features 238 by the first IMD layer 230. The non-tapered portion 248NT is spaced apart from adjacent upper metal features 263 by the second IMD layer 240. The non-tapered portion 248NT is not disposed over any portion of the first waveguide feature 206 and may have a thickness between about 400 nm and about 600 nm. The non-tapered portion 248NT of the second waveguide feature 248 may be fabricated using method 100 in FIG. 1.

Reference is now made to FIG. 75, which illustrates a top view of a semiconductor structure 200 that includes an active waveguide construction. Similar to the semiconductor structure 200 in FIG. 69, the semiconductor structure in FIG. 75 also includes the first waveguide feature 206 and the second waveguide feature 248 that are aligned along the Y direction and partially overlap. The first waveguide feature 206 may be divided into a non-tapered portion 206NT and a tapered portion 206TP and the second waveguide feature 248 may be divided into a non-taper portion 248NT, a tapered portion 248TP, and a tip portion 2482. The tip portion 2482 and the tapered portion 206TP are spot size converters. They partially overlap to function as an optical edge coupler to optically couple the first waveguide feature 206 and the second waveguide feature 248. Different from the semiconductor structure 200 in FIG. 69, the non-tapered portion 206NT in FIG. 75 is coupled to an active region that includes the third n-doped region 225, the second n-doped region 221, and the first n-doped region 217, the third p-doped region 237, the second p-doped region 233, and the first p-doped region 229. The active region may be formed using method 400 in FIG. 44. In some embodiments, a portion of the first waveguide feature 206 (such as a portion of the second silicon feature 2062, see also FIG. 47) may remain substantially undoped and is sandwiched between the first n-doped region 217 and the first p-doped region 229.

Figure 77:
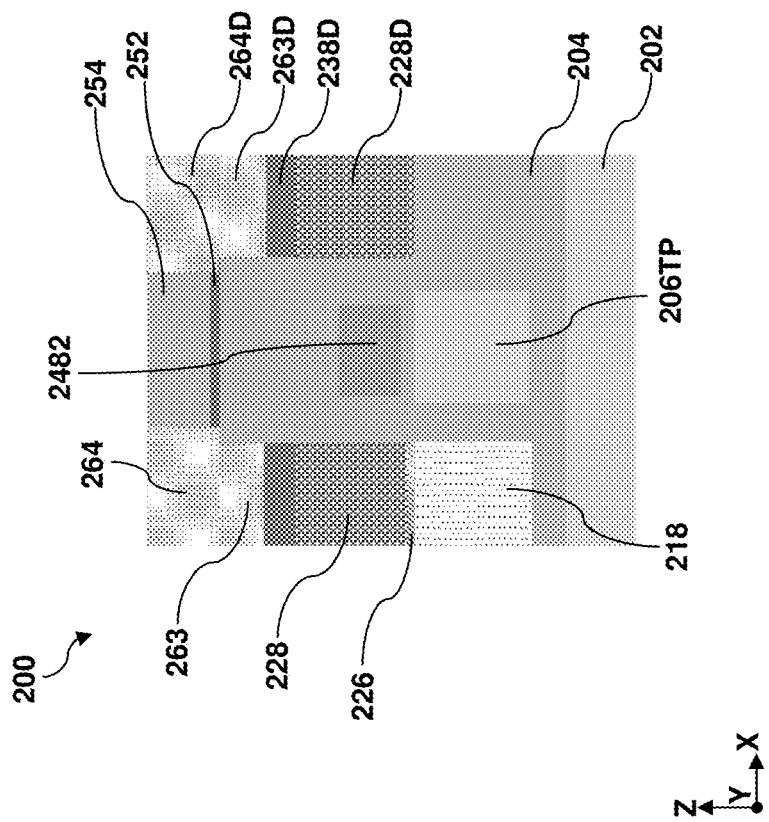
Figure 78:
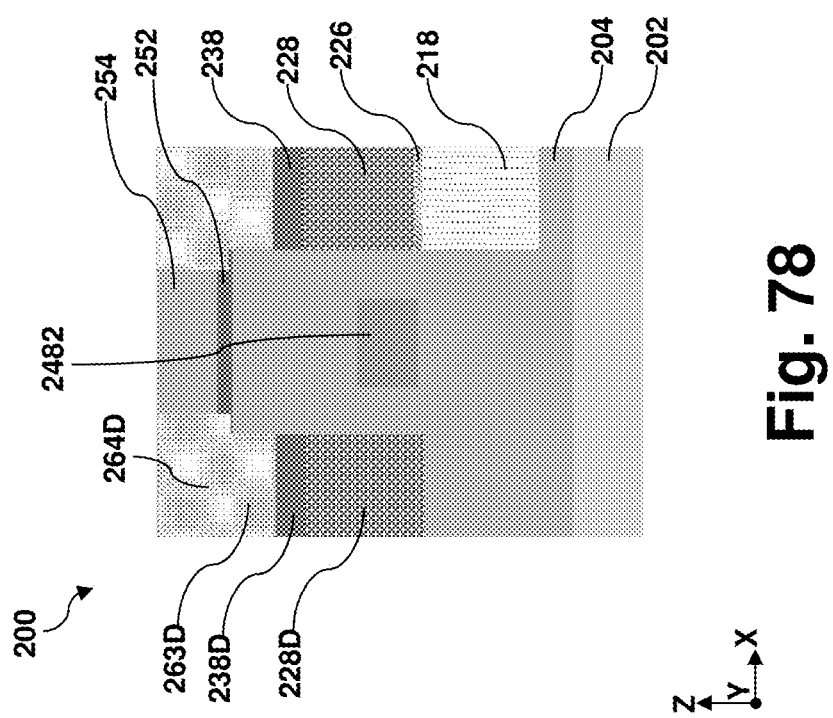
Figure 79:
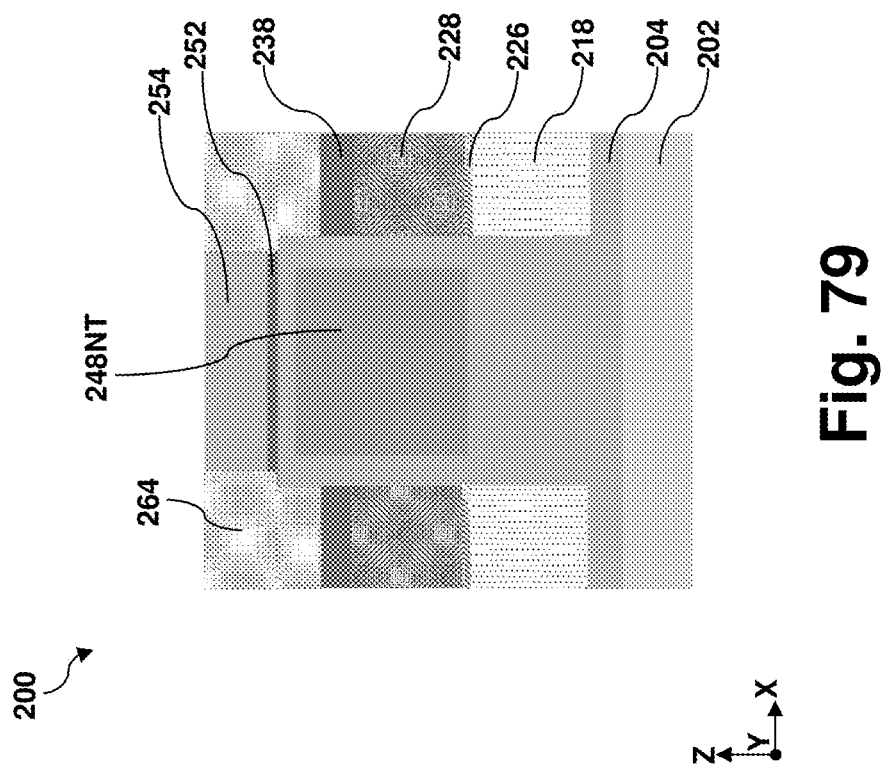

Fragmentary cross-sectional views along section AA-AA', BB-BB', CC-CC' and DD-DD' in FIG. 75 are provided to illustrate structures surrounding the first waveguide feature 206 and the second waveguide feature 248. FIG. 76 illustrates a fragmentary cross-sectional view along section AA-AA' in FIG. 75. Each of the third n-doped region 225 and the third p-doped region 237 is coupled to an overlying contact feature 228 by way of the silicide layer 226. The contact features 228 in FIG. 76 are in turn coupled to the lower metal features 238, the upper metal features 263, and the via features 264. The dotted area in FIG. 76 illustrates where the non-tapered portion 206NT is coupled to the active region. FIG. 77 illustrates a fragmentary cross-sectional view along section BB-BB' in FIG. 75, which may be similar to the fragmentary cross-sectional view shown in FIG. 72. FIG. 78 illustrates a fragmentary cross-sectional view along section CC-CC' in FIG. 75, which may be similar to the fragmentary cross-sectional view shown in FIG. 73. FIG. 79 illustrates a fragmentary cross-sectional view along section DD-DD' in FIG. 75, which may be similar to the fragmentary cross-sectional view shown in FIG. 74. Detailed descriptions of FIGS. 77-79 are therefore omitted for brevity.

Embodiments of the present disclosure provide advantages. The present disclosure provides apparatus or semiconductor structure that includes a first waveguide feature disposed between doped silicon features and a second waveguide feature disposed between contact features coupled to the doped silicon features. The second waveguide feature is also disposed between lower metal features disposed over the contact features as well as upper metal features disposed over the lower metal features. In some embodiments, the first waveguide features are formed of silicon and the second waveguide feature is formed of silicon nitride. Because the second waveguide feature is allowed to extend vertically between features in more than one interconnect layers, the second waveguide feature may have a sufficient thickness for O-Band or C-Band applications without increasing the thickness of the contact features.

In one exemplary aspect, the present disclosure is directed to an apparatus. The apparatus includes a plurality of doped silicon features over a substrate, a plurality of contact features disposed over and electrically coupled to the plurality of doped silicon features, a plurality of lower metal features disposed over and electrically coupled to the plurality of contact features, a plurality of upper metal features disposed over and electrically coupled to the plurality of lower metal features, a first waveguide feature disposed between two adjacent ones of the plurality of doped silicon features, and a second waveguide feature disposed over the first waveguide feature, wherein a top surface of the second waveguide feature is higher than top surfaces of the plurality of contact features such that the second waveguide feature is disposed between two adjacent ones of the plurality of lower metal features, and two adjacent ones of the plurality of upper metal features.

In some embodiments, the first waveguide feature has a first refractive index and the second waveguide feature has a second refractive index different from the first refractive index. In some implementations, the first waveguide feature includes silicon and the second waveguide feature includes silicon nitride. In some instances, the first waveguide feature includes a first non-tapered portion and a first tapered portion extending from the first non-tapered portion, the second waveguide feature includes a second non-tapered portion, a second tapered portion extending from the second non-tapered portion, and a tip portion extending from the second tapered portion, and the tip portion overlaps the first tapered portion of the first waveguide feature. In some embodiments, the apparatus further includes a plurality of via features disposed over and electrically coupled to the plurality of upper metal features. The first waveguide feature extends lengthwise along a first direction and, along a second direction perpendicular to the first direction, a width of each of the plurality of via features is greater than a width of each of the plurality of upper metal features. In some embodiments, the apparatus further includes a silicide layer disposed between the plurality of doped silicon features and the plurality of contact features. In some instances, the first waveguide feature and the second waveguide feature are configured to operate with infrared having a wavelength of about 1310 nm, about 1550 nm, or both. In some implementations, the plurality of contact features include a thickness between about 350 nm and about 380 nm. In some embodiments, the second waveguide feature is disposed in more than one dielectric layer and the more than one dielectric layer includes silicon oxide.

In another exemplary aspect, the present disclosure is directed to a semiconductor structure. The semiconductor structure includes a buried oxide layer, a first dielectric layer disposed over the buried oxide layer, a first waveguide feature disposed in the first dielectric layer, a second dielectric layer disposed over the first dielectric layer and the first waveguide feature, a plurality of contact features disposed in the second dielectric layer, a third dielectric layer disposed over the second dielectric layer, and a second waveguide feature disposed in the second dielectric layer and the third dielectric layer. A top surface of the second waveguide feature is higher than top surfaces of the plurality of contact features and a portion of the second waveguide feature vertically overlaps a portion of the first waveguide feature.

In some embodiments, the semiconductor structure further includes a first metal interconnect layer disposed in the second dielectric layer, the first metal interconnect layer including a first contact feature and a second contact feature, and a second metal interconnect layer disposed in the third dielectric layer, the second metal interconnect layer including a first metal feature and a second metal feature. The second waveguide feature is disposed between the first contact feature and the second contact feature as well as between the first metal feature and the second metal feature. In some embodiments, the first waveguide feature includes a first refractive index and the second waveguide feature includes a second refractive index different from the first refractive index. In some instances, the first waveguide feature includes silicon and the second waveguide feature includes silicon nitride. In some implementations, the semiconductor structure further includes a first doped silicon feature and a second doped silicon feature in the first dielectric layer. The first waveguide feature is disposed between the first doped silicon feature and the second doped silicon feature. In some instances, the first waveguide feature includes a bottom portion on the buried oxide layer and a top portion disposed on the bottom portion and a width of the bottom portion is greater than a width of the top portion. In some embodiments, a thickness of the second waveguide feature is greater than a thickness of the first waveguide feature.

In yet another exemplary aspect, the present disclosure is directed to a method. The method includes providing a workpiece including a substrate, a buried oxide layer over the substrate, and a silicon layer over the buried oxide layer, patterning the silicon layer into first silicon features and second silicon features, the first silicon features and the second silicon features being divided from one another by trenches, depositing a fill dielectric layer in the trenches, doping the second silicon features with a dopant, forming contact features over the doped second silicon features, forming lower metal features over the contact features, and forming a plurality of silicon nitride features, wherein each of the plurality of silicon nitride features is disposed between two adjacent ones of the contact features as well as two adjacent ones of the lower metal features.

In some embodiments, the method further includes before the forming of the contact features, forming a silicide layer on the doped second silicon features. In some implementations, the forming of the contact features includes depositing a first dielectric layer over the fill dielectric layer, the first silicon features, and the second silicon features. In some instances, the method further includes after the forming of the plurality of silicon nitride features, forming upper metal features over the lower metal features.

The foregoing outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor structure, comprising:
a semiconductor substrate;
an oxide layer disposed over the semiconductor substrate;
a first dielectric layer disposed on the oxide layer;
a second dielectric layer disposed over and in contact with the first dielectric layer;
a first waveguide disposed in the first dielectric layer and extending lengthwise along a first direction; and
a second waveguide disposed in the second dielectric layer and extending lengthwise along the first direction,
wherein, along the first direction, the first waveguide comprises a non-tapered portion and a tapered portion adjacent the non-tapered portion,
wherein, along the first direction, the second waveguide comprises a non-tapered portion, a tapered portion adjacent the non-tapered portion, and a tip portion adjacent the tapered portion,
wherein the tip portion of the second waveguide vertically overlaps the tapered portion of the first waveguide,
wherein a portion of the second dielectric layer is sandwiched between a top surface of the first waveguide and a bottom surface of the second waveguide,
wherein the taper portion of the second waveguide tapers from the non-tapered portion of the second waveguide toward the tip portion of the second waveguide.

2. The semiconductor structure of claim 1,
wherein the first waveguide comprises silicon,
wherein the second waveguide comprises silicon nitride.

3. The semiconductor structure of claim 2, further comprising:
a first p-type doped feature and a first n-type doped feature disposed on the oxide layer; and wherein a portion of the non-tapered portion of the first waveguide is disposed between the first p-type doped feature and the first n-type doped feature along a second direction perpendicular to the first direction.

4. A semiconductor structure, comprising:
a semiconductor substrate;
an oxide layer disposed over the semiconductor substrate;
a first dielectric layer disposed on the oxide layer;
a second dielectric layer disposed over and in contact with the first dielectric layer;
a first waveguide disposed in and in contact with the first dielectric layer and extending lengthwise along a first direction; and
a second waveguide disposed in and in contact with the second dielectric layer and extending lengthwise along the first direction,
wherein, along the first direction, the first waveguide comprises a non-tapered portion and a tapered portion adjacent the non-tapered portion,
wherein, along the first direction, the second waveguide comprises a non-tapered portion, a tapered portion adjacent the non-tapered portion, and a tip portion adjacent the tapered portion,
wherein a portion of the second dielectric layer extends between the first waveguide and the second waveguide,
wherein, along a second direction perpendicular to the first direction, a width of the non-tapered portion of the second waveguide is greater than a width of the tip portion of the second waveguide,
wherein the tip portion of the second waveguide vertically overlaps the tapered portion of the first waveguide.

5. The semiconductor structure of claim 4, wherein the tip portion of the second waveguide is spaced apart from the tapered portion of the first waveguide.

6. The semiconductor structure of claim 4, further comprising:
a first doped silicon feature and a second doped silicon feature disposed in the first dielectric layer,
wherein the non-tapered portion of the first waveguide is disposed between the first doped silicon feature and the second doped silicon feature along the second direction.

7. The semiconductor structure of claim 6,
wherein the first doped silicon feature comprises a p-type dopant,
wherein the second doped silicon feature comprises an n-type dopant.

8. The semiconductor structure of claim 6, further comprising:
a first contact feature disposed over the first doped silicon feature; and
a second contact feature disposed over the second doped silicon feature.

9. The semiconductor structure of claim 8, wherein the first contact feature and the second contact feature comprise titanium nitride (TiN), titanium (Ti), ruthenium (Ru), nickel (Ni), cobalt (Co), copper (Cu), molybdenum (Mo), tungsten (W), tantalum (Ta), or tantalum nitride (TaN).

10. The semiconductor structure of claim 8, further comprising:
a first silicide layer between the first contact feature and the first doped silicon feature; and
a second silicide layer between the second contact feature and the second doped silicon feature.

11. The semiconductor structure of claim 10, wherein the first silicide layer and the second silicide layer comprise titanium silicide (TiSi), titanium silicon nitride (TiSiN), tantalum silicide (TaSi), tungsten silicide (WSi), cobalt silicide (CoSi), or nickel silicide (NiSi).

12. The semiconductor structure of claim 4, wherein the first dielectric layer and the second dielectric layer comprise silicon oxide.

13. A semiconductor structure, comprising:
a silicon substrate;
a buried oxide layer disposed over the silicon substrate;
a first doped silicon feature and a second doped silicon feature disposed on the buried oxide layer;
a first dielectric layer over the buried oxide layer and between the first doped silicon feature and the second doped silicon feature;
a second dielectric layer disposed over the first dielectric layer;
a first waveguide disposed in the first dielectric layer and extending lengthwise along a first direction; and
a second waveguide disposed in the second dielectric layer and extending lengthwise along the first direction,
wherein, along the first direction, the first waveguide comprises a non-tapered portion and a tapered portion adjacent the non-tapered portion,
wherein, along the first direction, the second waveguide comprises a non-tapered portion, a tapered portion adjacent the non-tapered portion, and a tip portion adjacent the tapered portion,
wherein the non-tapered portion of the first waveguide is disposed between the first doped silicon feature and the second doped silicon feature along a second direction perpendicular to the first direction.

14. The semiconductor structure of claim 13, wherein a composition of the first waveguide is different from a composition of the second waveguide.

15. The semiconductor structure of claim 13,
wherein the first waveguide comprises silicon,
wherein the second waveguide comprises silicon nitride.

16. The semiconductor structure of claim 13,
wherein the first doped silicon feature comprises a p-type dopant,
wherein the second doped silicon feature comprises an n-type dopant.

17. The semiconductor structure of claim 13, further comprising:
a first contact feature disposed over the first doped silicon feature; and
a second contact feature disposed over the second doped silicon feature.

18. The semiconductor structure of claim 17, wherein the first contact feature and the second contact feature comprise titanium nitride (TiN), titanium (Ti), ruthenium (Ru), nickel (Ni), cobalt (Co), copper (Cu), molybdenum (Mo), tungsten (W), tantalum (Ta), or tantalum nitride (TaN).

19. The semiconductor structure of claim 1, wherein a width of the non-tapered portion of the second waveguide is greater than a width of the tip portion of the second waveguide.

20. The semiconductor structure of claim 4,
wherein the first waveguide comprises silicon, and
wherein the second waveguide comprises silicon nitride.

* * * * *